Oct. 11, 1949.　　　　O. S. FIELD ET AL　　　　2,484,463
AIRWAY TRAFFIC CONTROL SYSTEM
Filed June 22, 1944　　　　　　　　　　　　　　29 Sheets-Sheet 2

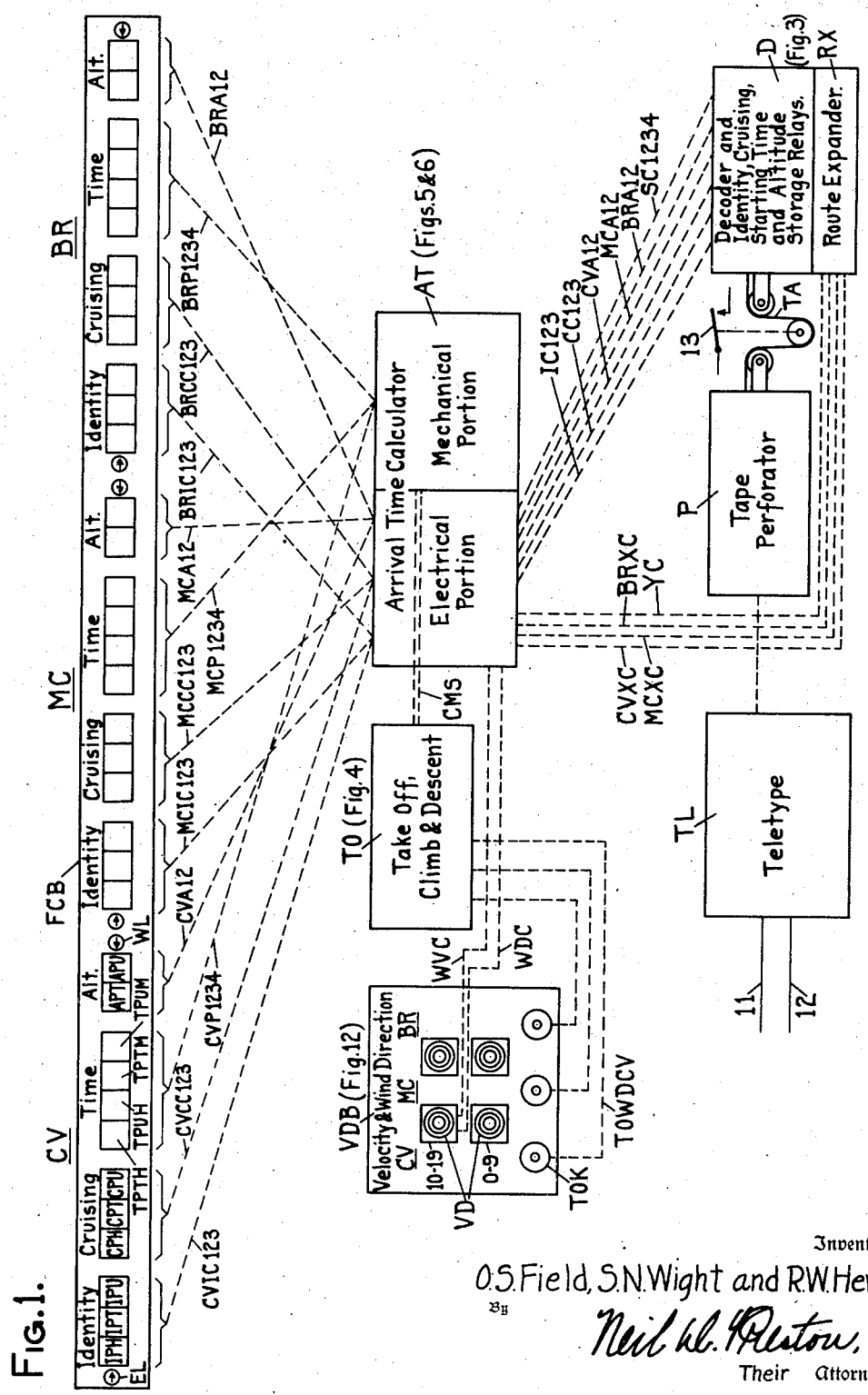

Inventors
O. S. Field, S. N. Wight and R. W. Hewes
By Neil W. Bestow,
Their Attorney Oct. 11, 1949.　　　O. S. FIELD ET AL　　　2,484,463
AIRWAY TRAFFIC CONTROL SYSTEM
Filed June 22, 1944　　　29 Sheets-Sheet 3

Inventors
O. S. Field, S. N. Wight and R. W. Hewes
By Neil W. Preston,
Their Attorney

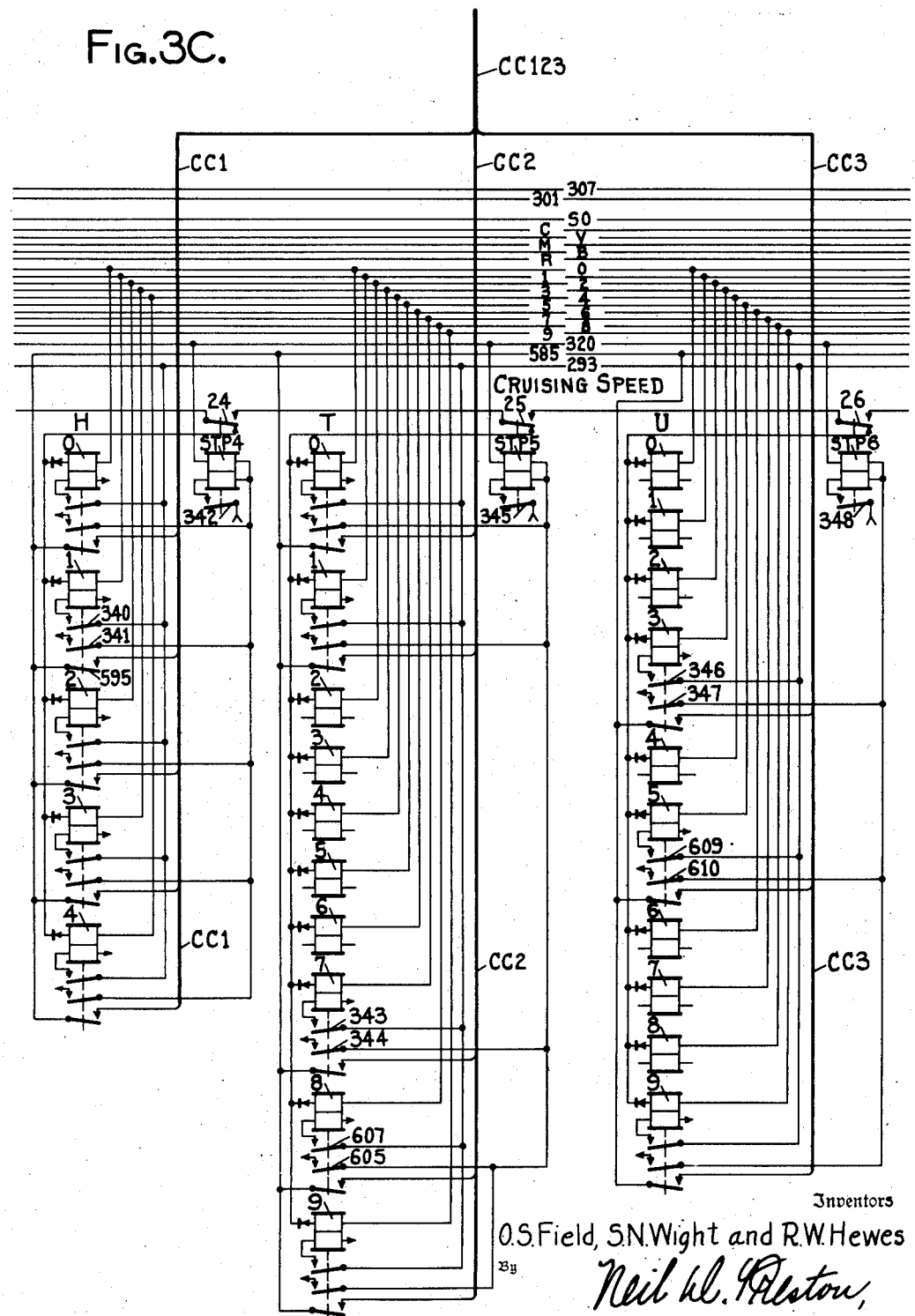

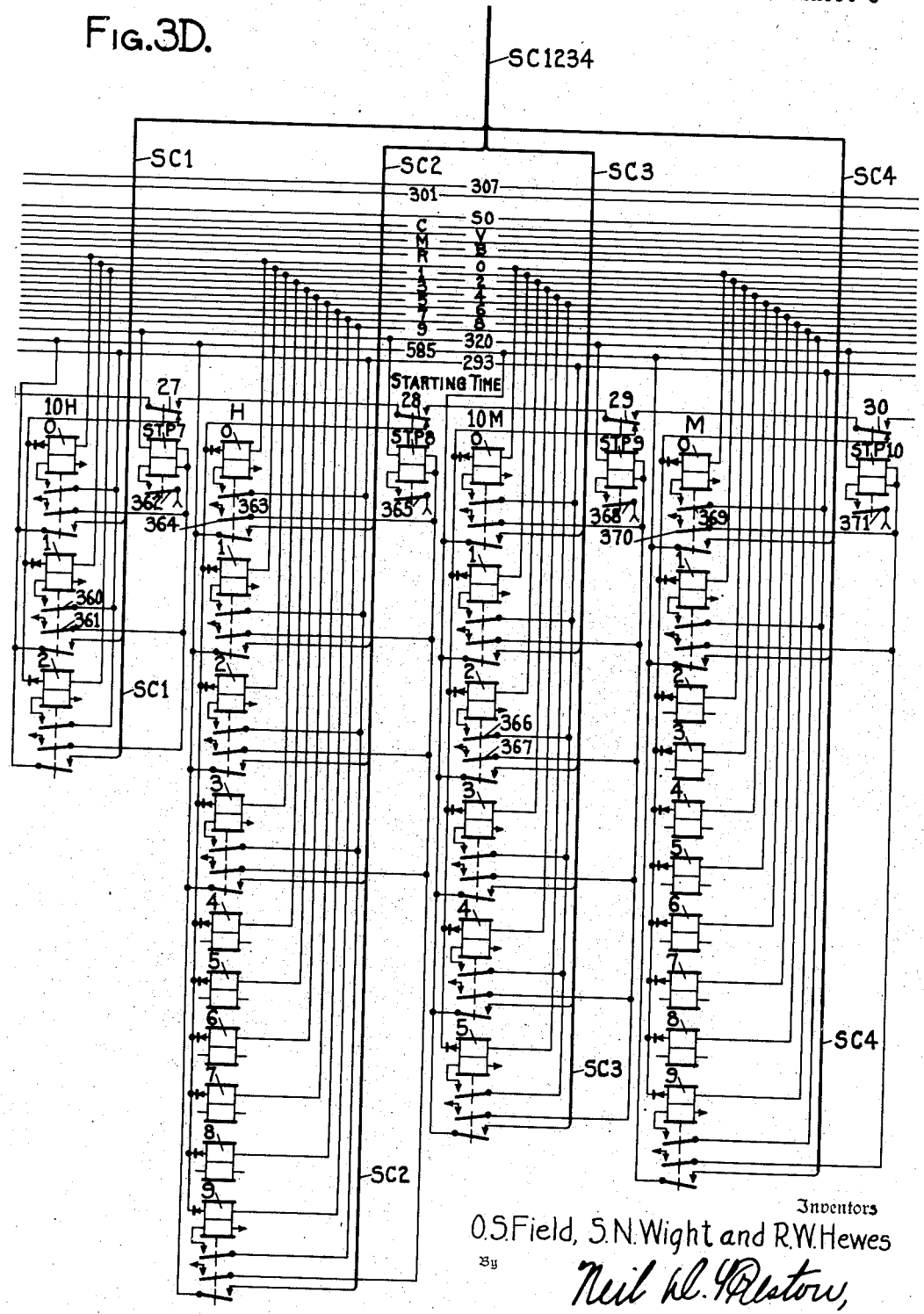

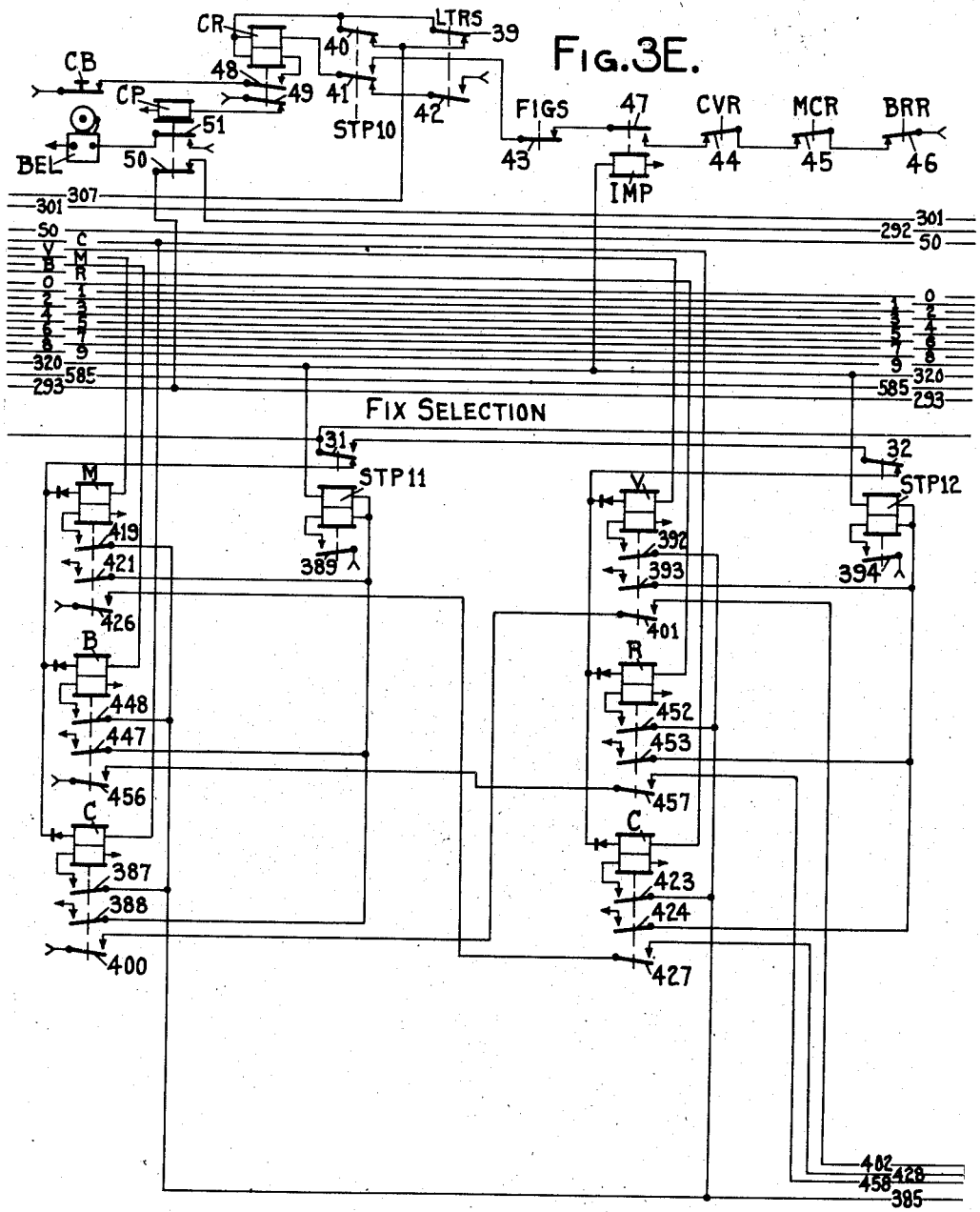

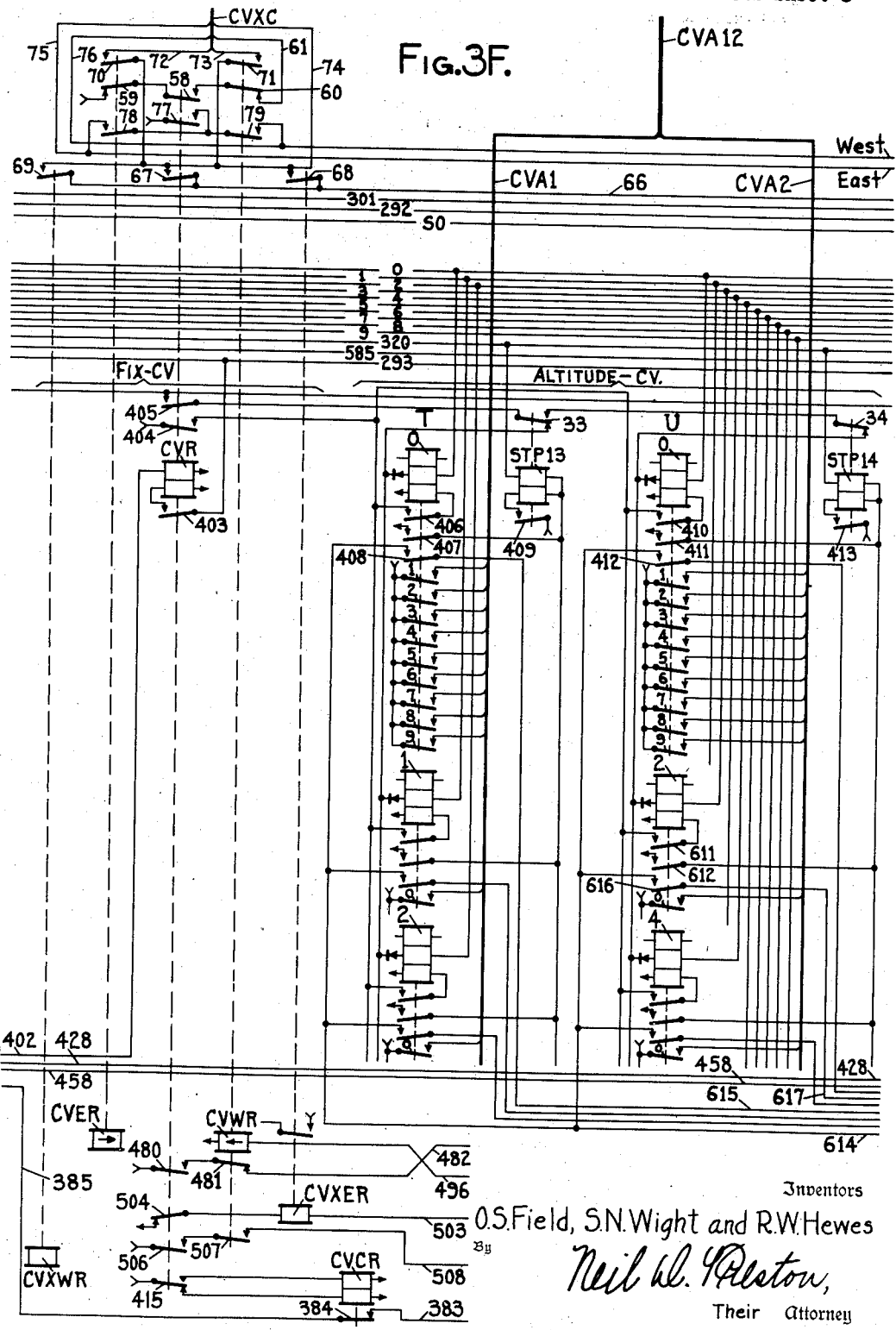

Oct. 11, 1949.  O. S. FIELD ET AL  2,484,463
AIRWAY TRAFFIC CONTROL SYSTEM
Filed June 22, 1944                     29 Sheets-Sheet 10

FIG. 3H.

Inventors
O.S. Field, S.N. Wight and R.W. Hewes
By Neil W. Preston
Their Attorney Oct. 11, 1949.  O. S. FIELD ET AL  2,484,463
AIRWAY TRAFFIC CONTROL SYSTEM
Filed June 22, 1944  29 Sheets-Sheet 11

Inventors
O.S.Field, S.N.Wight and R.W.Hewes.
By Neil W. Preston,
Their Attorney

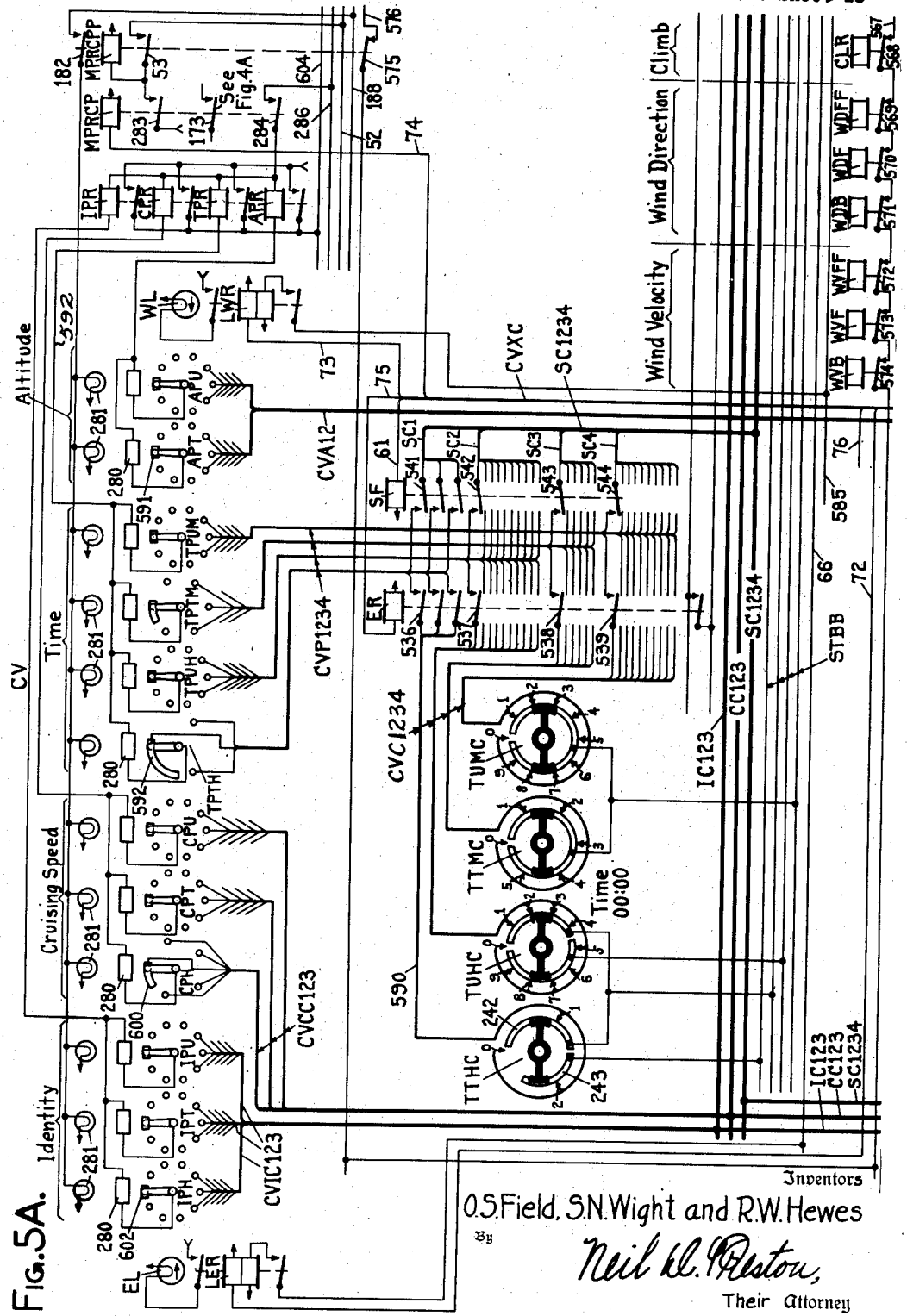

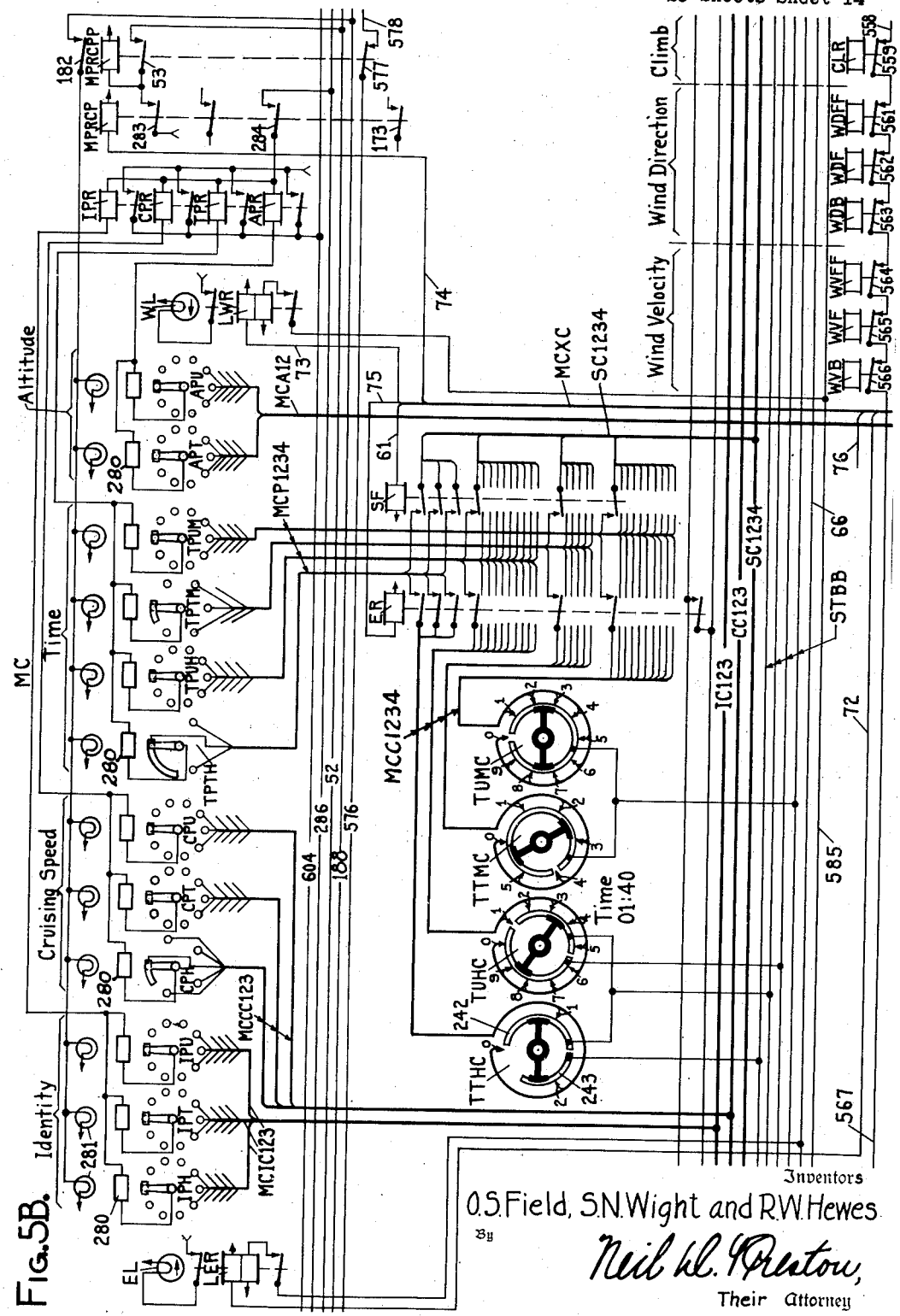

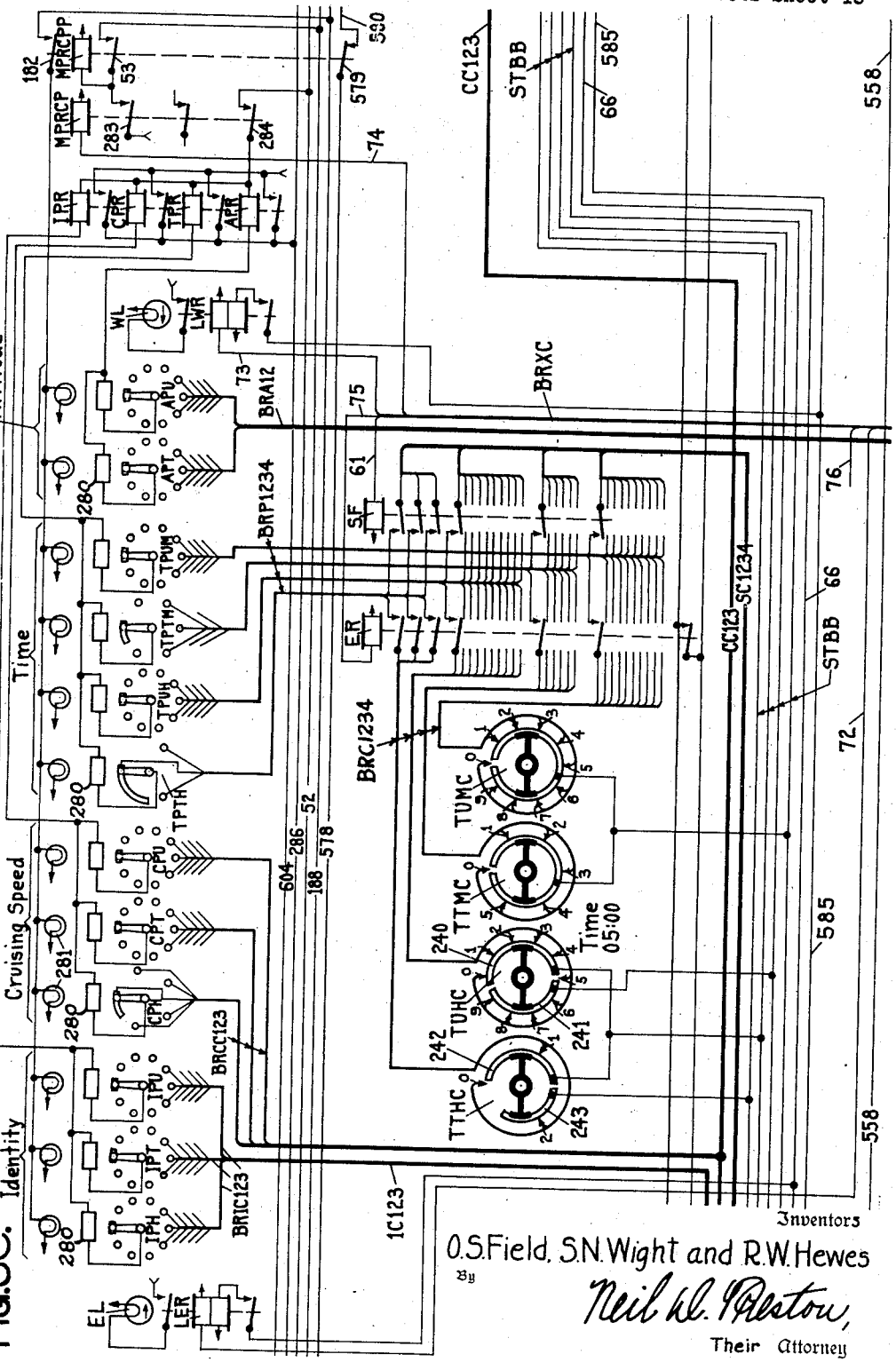

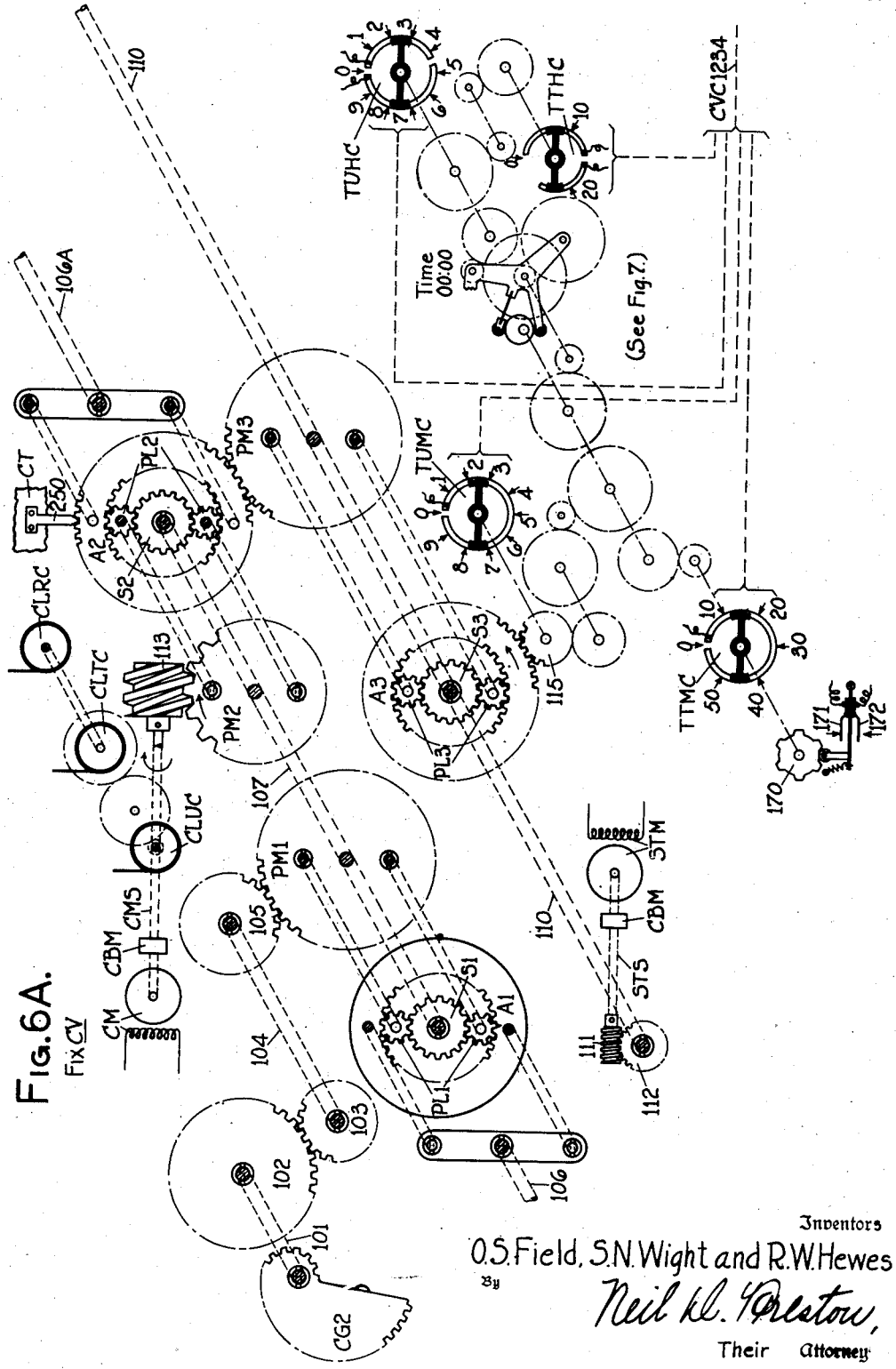

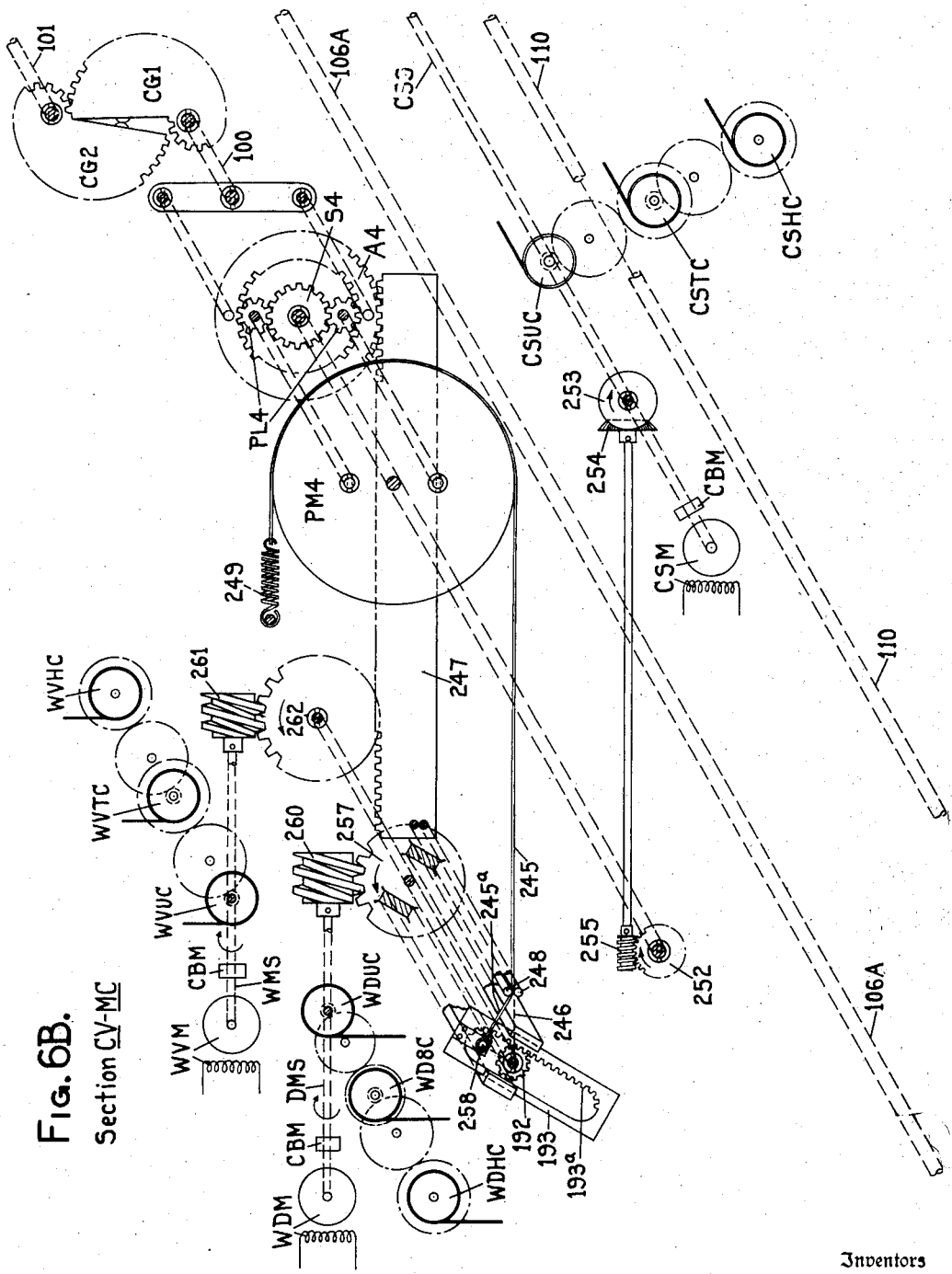
Fig. 6B. Section CV-MC

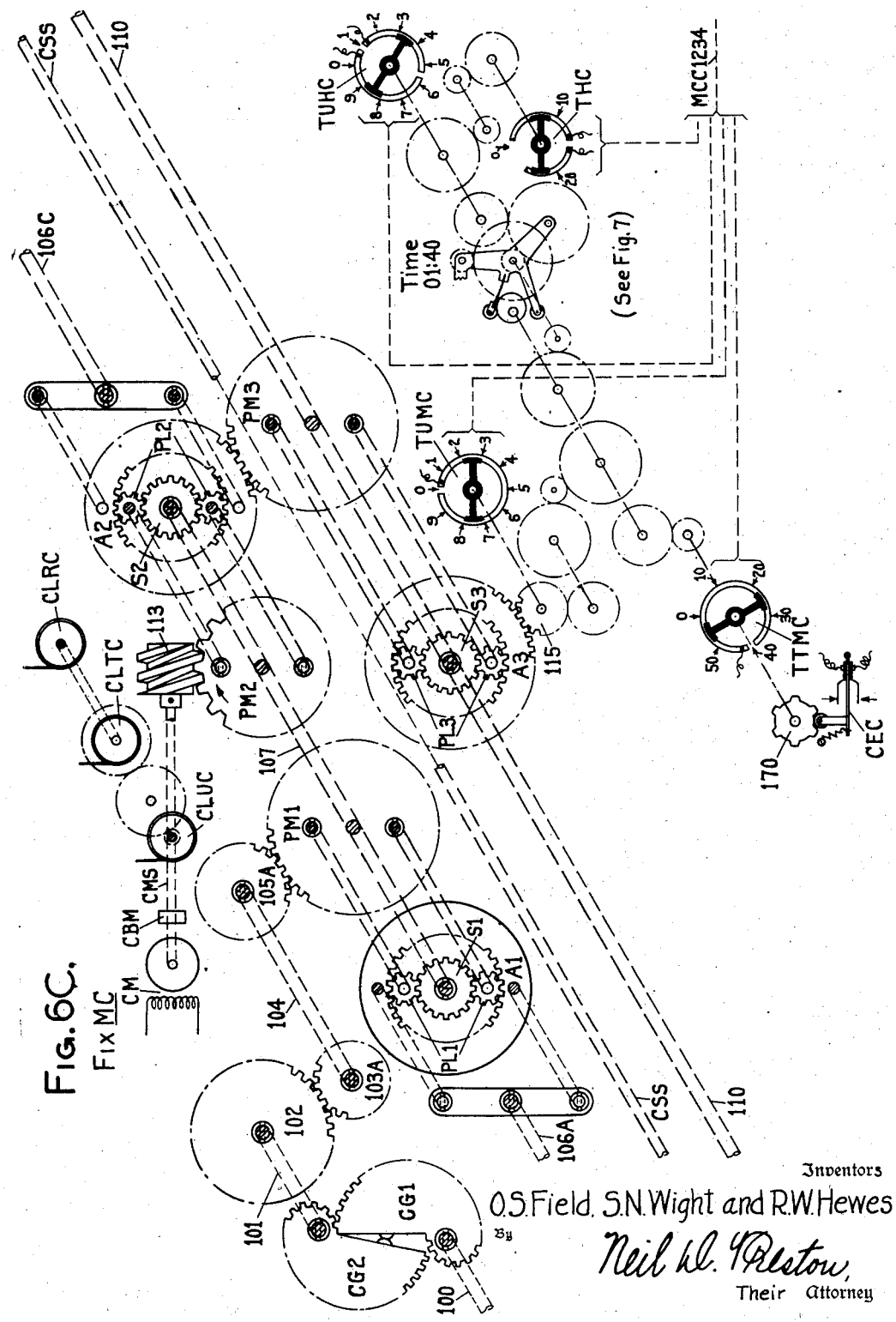

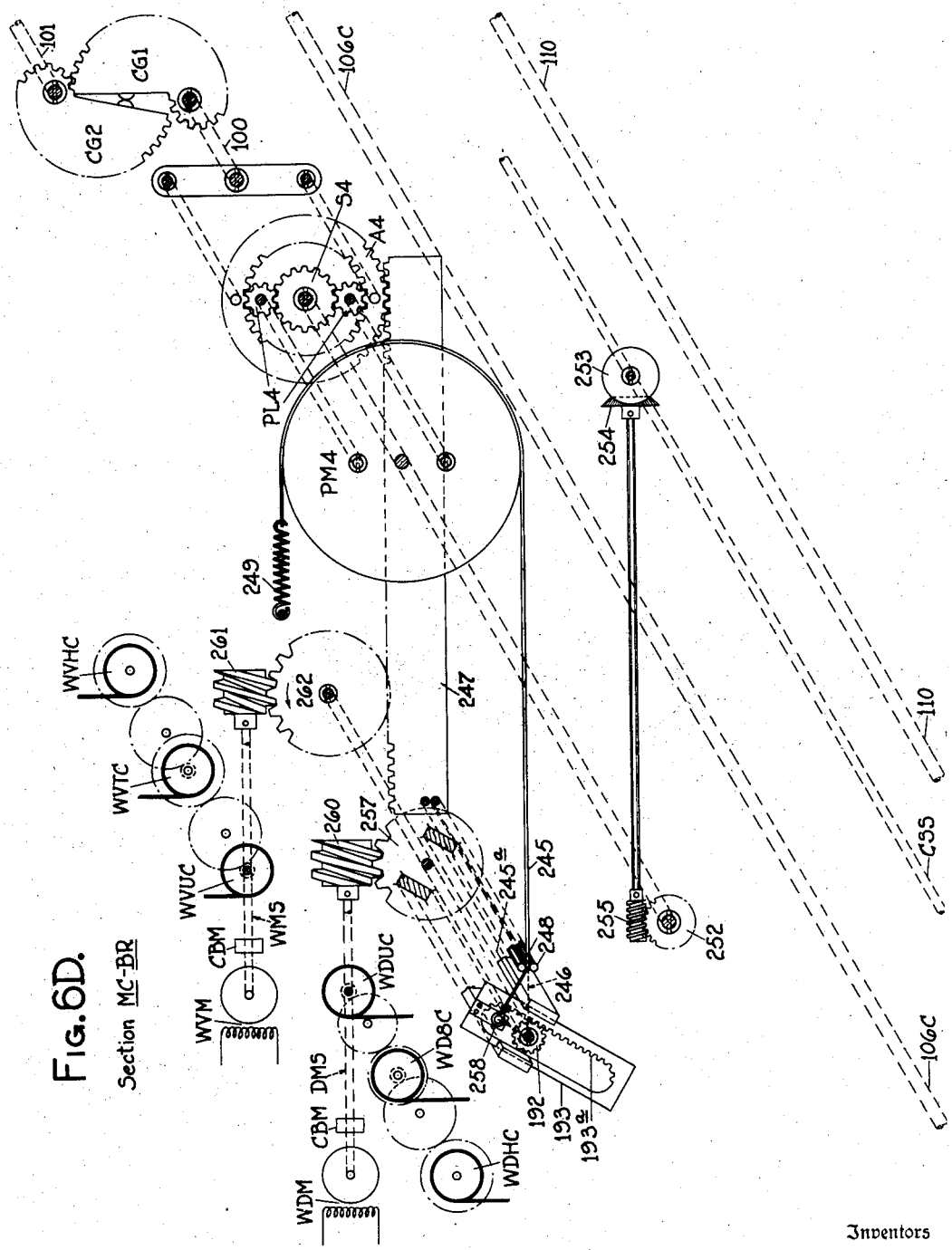

Oct. 11, 1949. O. S. FIELD ET AL 2,484,463
AIRWAY TRAFFIC CONTROL SYSTEM
Filed June 22, 1944 29 Sheets-Sheet 21

Inventors
O.S.Field, S.N.Wight and R.W.Hewes
By Neil W. Preston,
Their Attorney

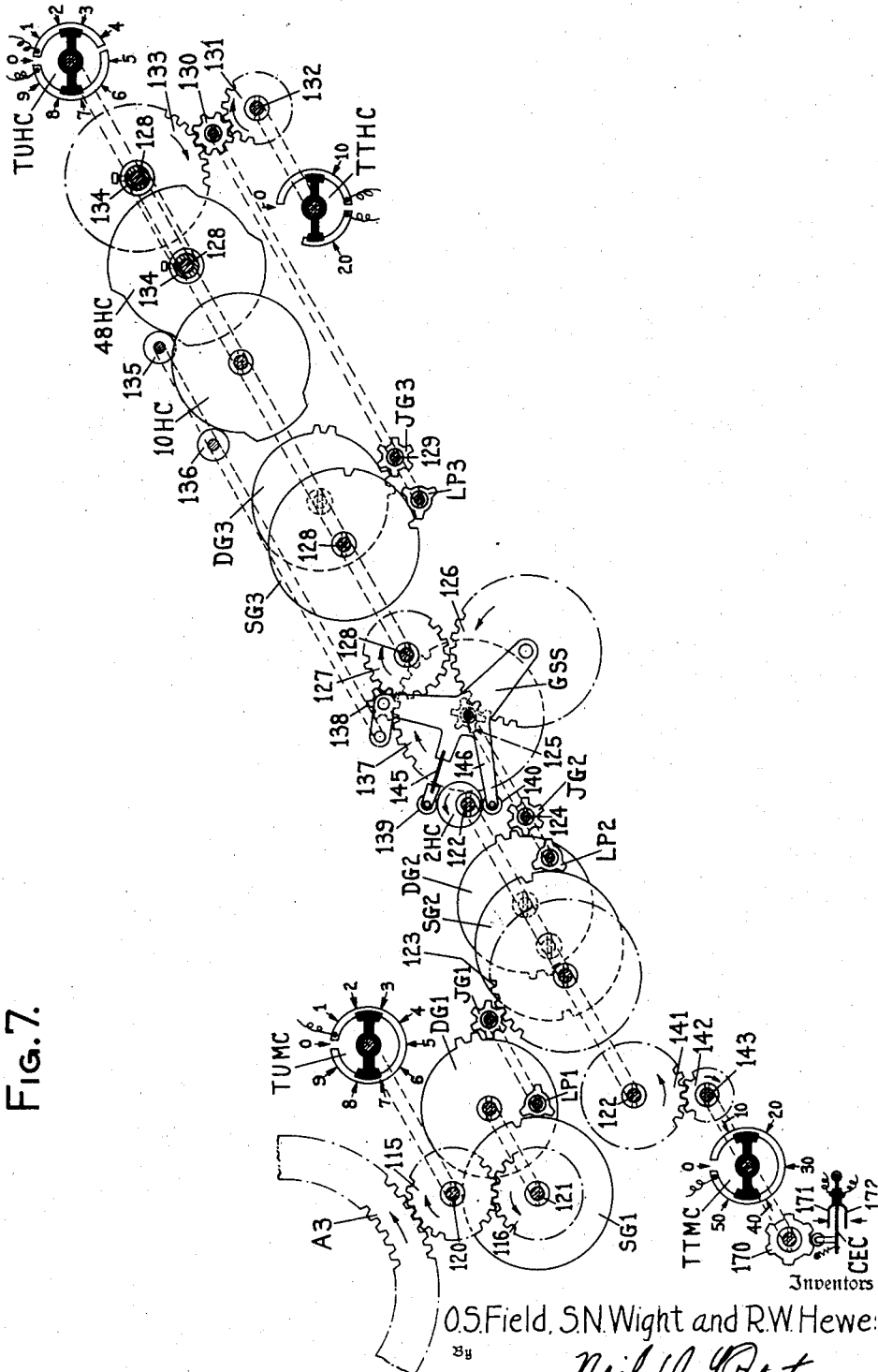

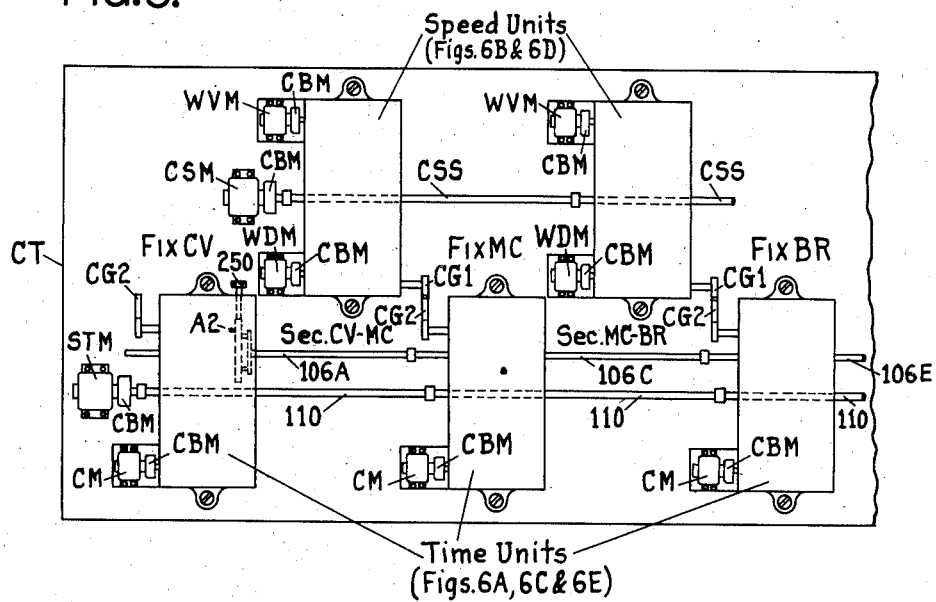
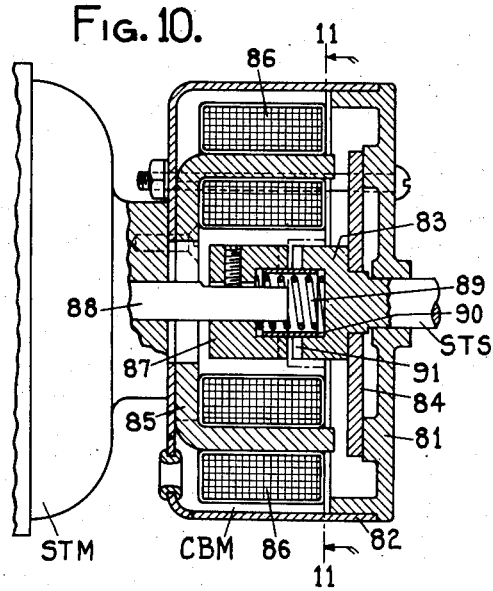
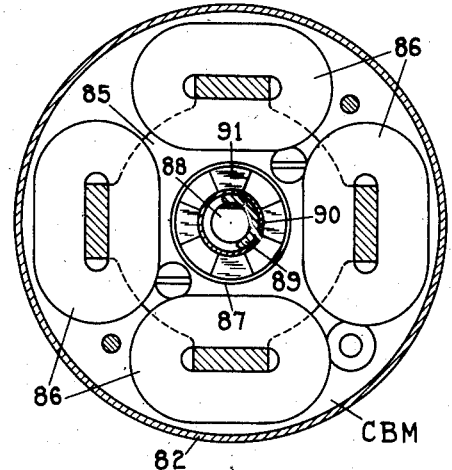

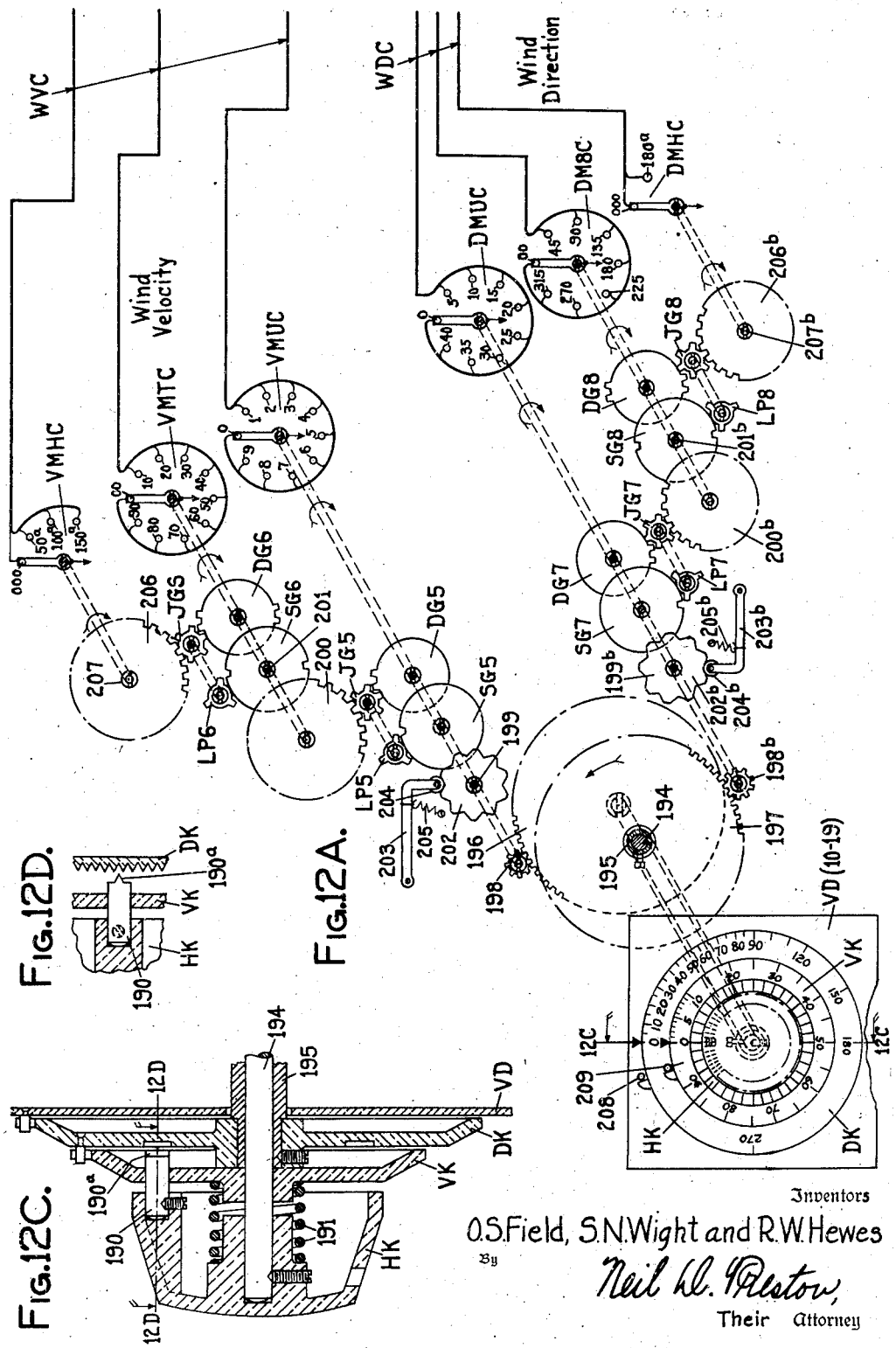

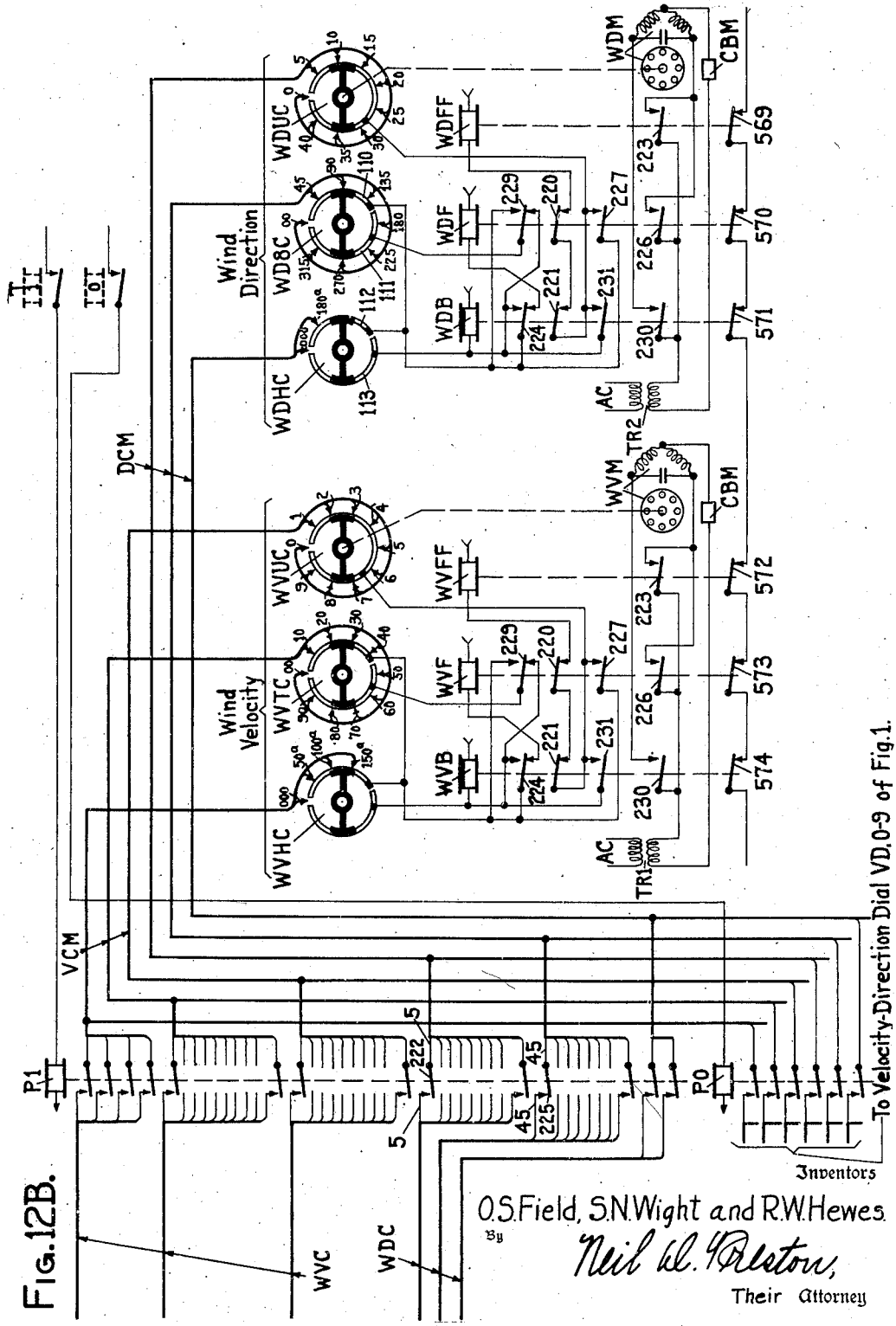

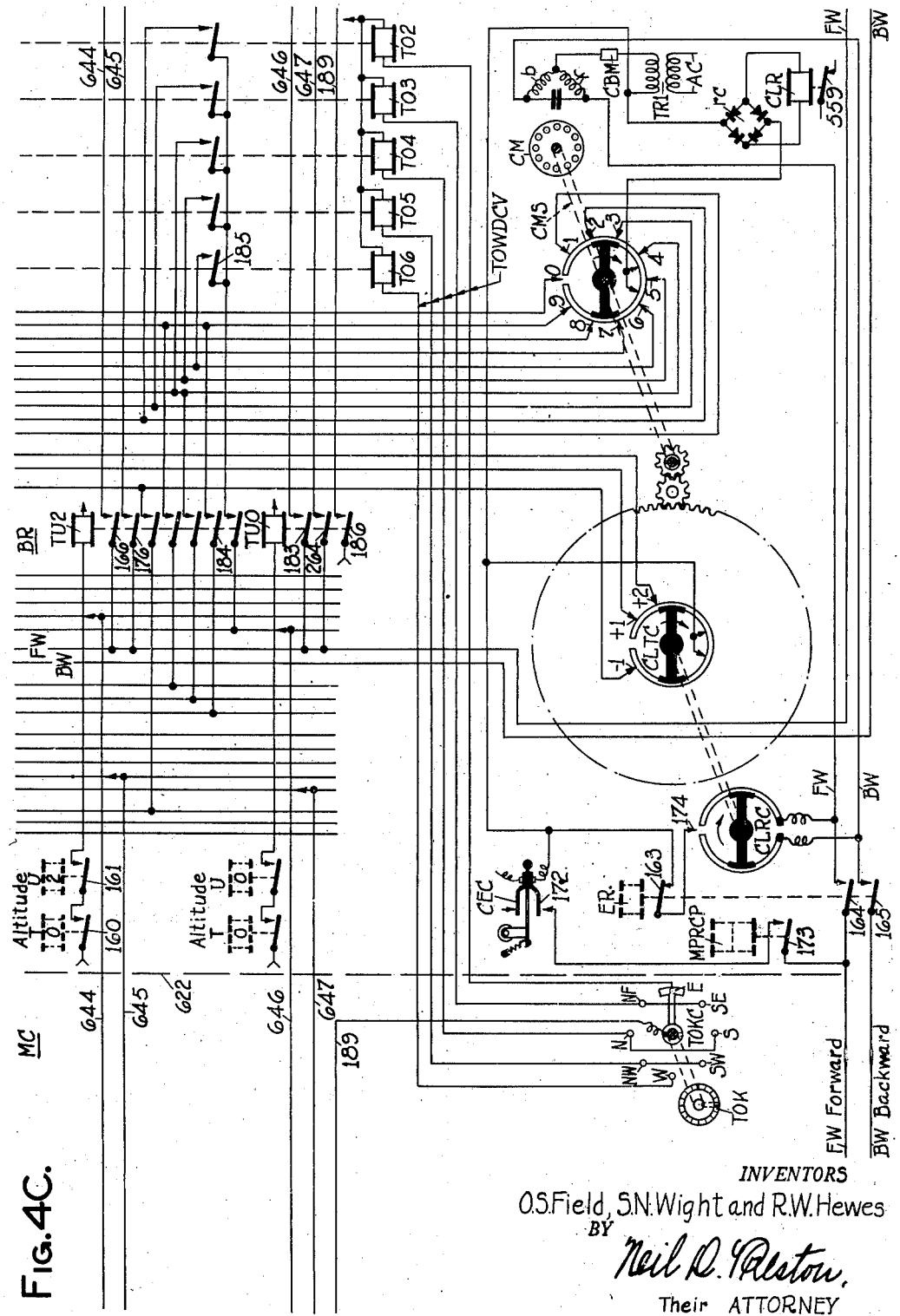

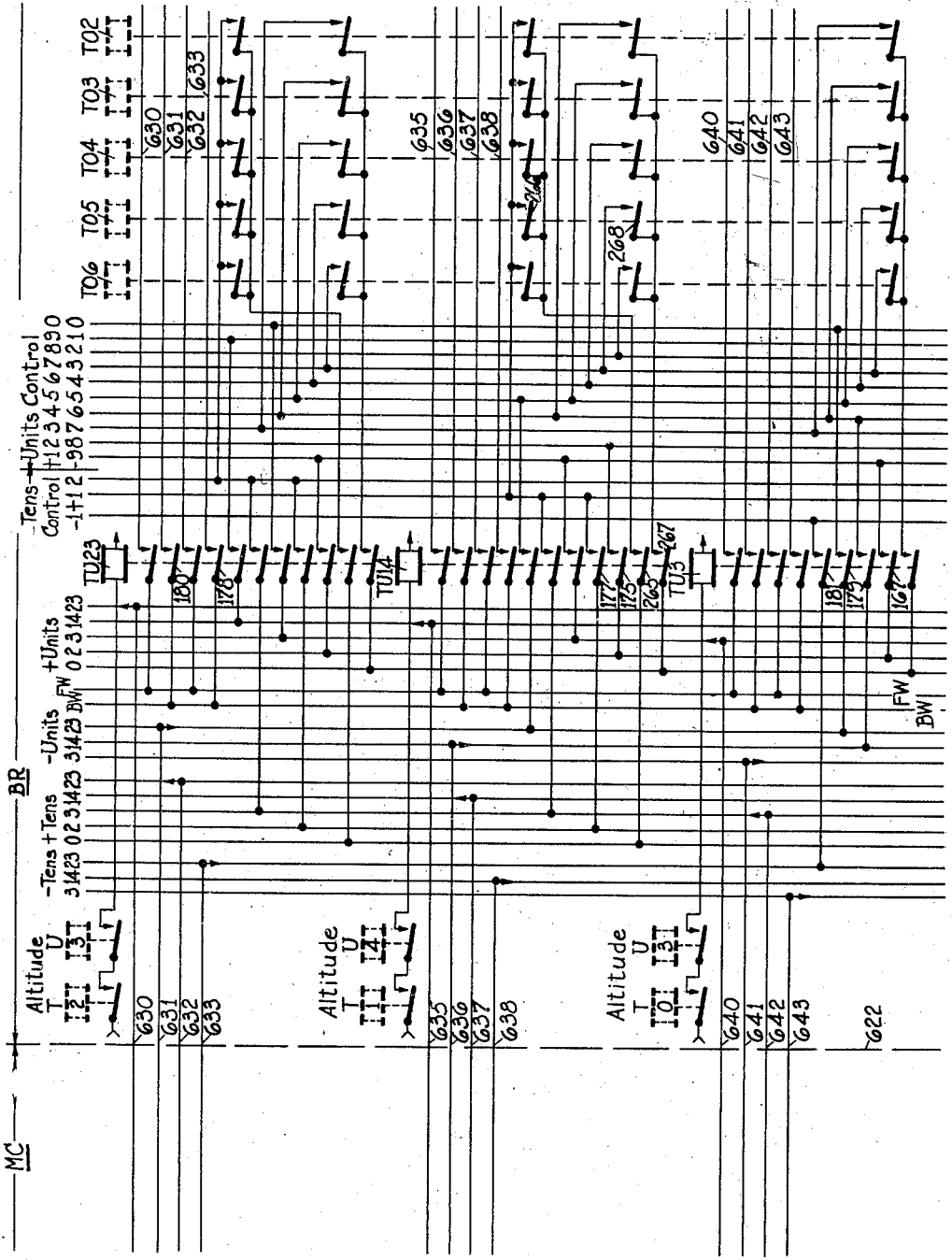

Patented Oct. 11, 1949

2,484,463

UNITED STATES PATENT OFFICE 2,484,463

AIRWAY TRAFFIC CONTROL SYSTEM

Oscar S. Field, Sedgwick N. Wight, and Ralph W. Hewes, Rochester, N. Y., assignors to General Railway Signal Company, Rochester, N. Y.

Application June 22, 1944, Serial No. 541,638

37 Claims. (Cl. 235—61)

The present invention relates to calculator and display apparatus for automatically calculating and displaying on a check display board the arrival times of airplanes at various destinations on a route. This display of information is calculated in accordance with take-off direction, route direction and velocity of wind as manifested by devices either manually or automatically operable and in response to information derived from a distant point over a teletype system or locally from manually operable devices, as to the starting time, the route over which the airplane is to travel, and the cruising speed of the airplane.

In order to ascertain whether a proposed flight plan avoids conflict with other proposed flight plans over the same flight route, it is necessary to be able to calculate the characteristics of such a flight plan, that is, the arrival time of its airplane at various destinations over the route dependent upon the velocity and direction of the wind in the various sections of the route at that particular time, and to do this very quickly. Since weather conditions vary continuously and since the average direction and velocity of wind in a particular section joining two fixes on a route must be approximated by an experienced person in this work, it is proposed to have one man adjust wind velocity and wind direction knobs for all sections of all routes in that territory in accordance with the wind and weather observer's information without detracting such man's attention to other matters such as the number of airplanes flying over the various routes, and the like.

It is therefore proposed in accordance with the present invention to have the information regarding a particular flight plan, including its starting point, starting time, its destination, and its cruising speed irrespective of whether this information comes over a teletype system or is determined locally; preferably manifested in code form on a perforated tape. Suitable apparatus is provided to automatically calculate the arrival times at the various locations in accordance with this information on the perforated tape as modified by the condition of the weather knobs and to thereafter display the information as to the proposed flight plan including its various arrival times on a check display board preferably located above the usual flight progress board on which a plurality of such flight plans have already been displayed. In addition to the foregoing, it is proposed to have the calculator also automatically take into consideration the time that is lost or gained when an airplane makes a climb or a descent in its travel from fix to fix over the route and to also take into consideration the additional amount of time that is required when an airplane takes off at a starting fix in a direction determined by the direction of the wind, as compared with the time that would be required if the airplane took off in the direction of the first leg of the route.

Since the information which comes over the teletype system and which is to automatically control the calculating apparatus is sometimes in abbreviated form in which not all fixes are specifically mentioned, and since every fix involved in the route, as well as the altitude at which the airplane is to fly over such unnamed fix, should be specifically made manifest, it is proposed to employ a so-called "route expander" which identifies the unnamed fixes of the route and the altitudes at which an airplane is to fly over such unnamed fixes.

It is further proposed to employ a teletype controlled tape perforator which perforates a paper tape to record therein the information transmitted over the teletype system and to provide additional manually operable tape perforating apparatus for perforating a like paper tape in accordance with information derived locally at the central office where the apparatus is located.

Since the net ground speed of an airplane flying in air moving at a specified velocity in a specified direction at times involves triangulation calculations, it is proposed to employ an element in the calculator which separately calculates the actual ground speed of such airplane when the cruising speed, the direction and velocity of wind, is known.

It is further proposed to have the flight check board include a plurality of electrically operated and electrically illuminated posting units which visually manifest the various factors including the identity and cruising speed of the airplane to fly over the route as well as the starting time or arrival time and altitude of the airplane at each fix on such route in accordance with the information electrically manifested in the arrival time calculator and associated apparatus. These posting units are preferably of a construction as disclosed in the prior application of Wight and Field, Ser. No. 489,776, filed June 5, 1943, now Patent No. 2,378,294.

Other objects, purposes and characteristic features of the present invention will to a large extent be pointed out in the specification hereinafter and will in part be obvious from the accompanying drawings forming a part of this application and in which:

Fig. 1 illustrates a block diagram of the various apparatuses involved connected by cables and a climb motor shaft illustrated by dotted lines;

Fig. 2B illustrates a tape portion defining a proposed flight route including unnamed fixes;

Figure 14A:
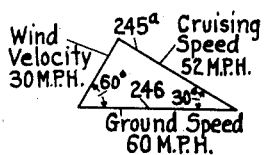
Figure 14B:
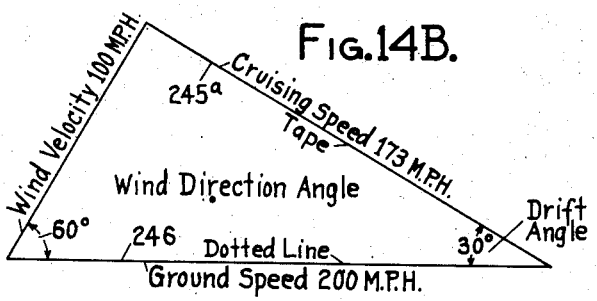
Figure 15:
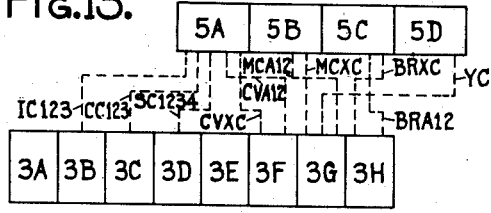
Figure 14C:
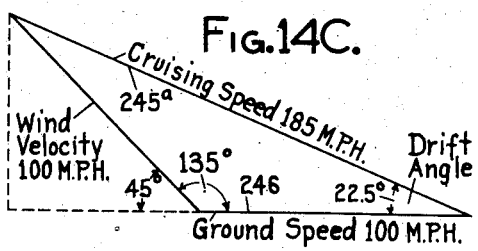
Figure 16:
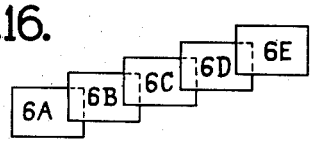
Figure 13:
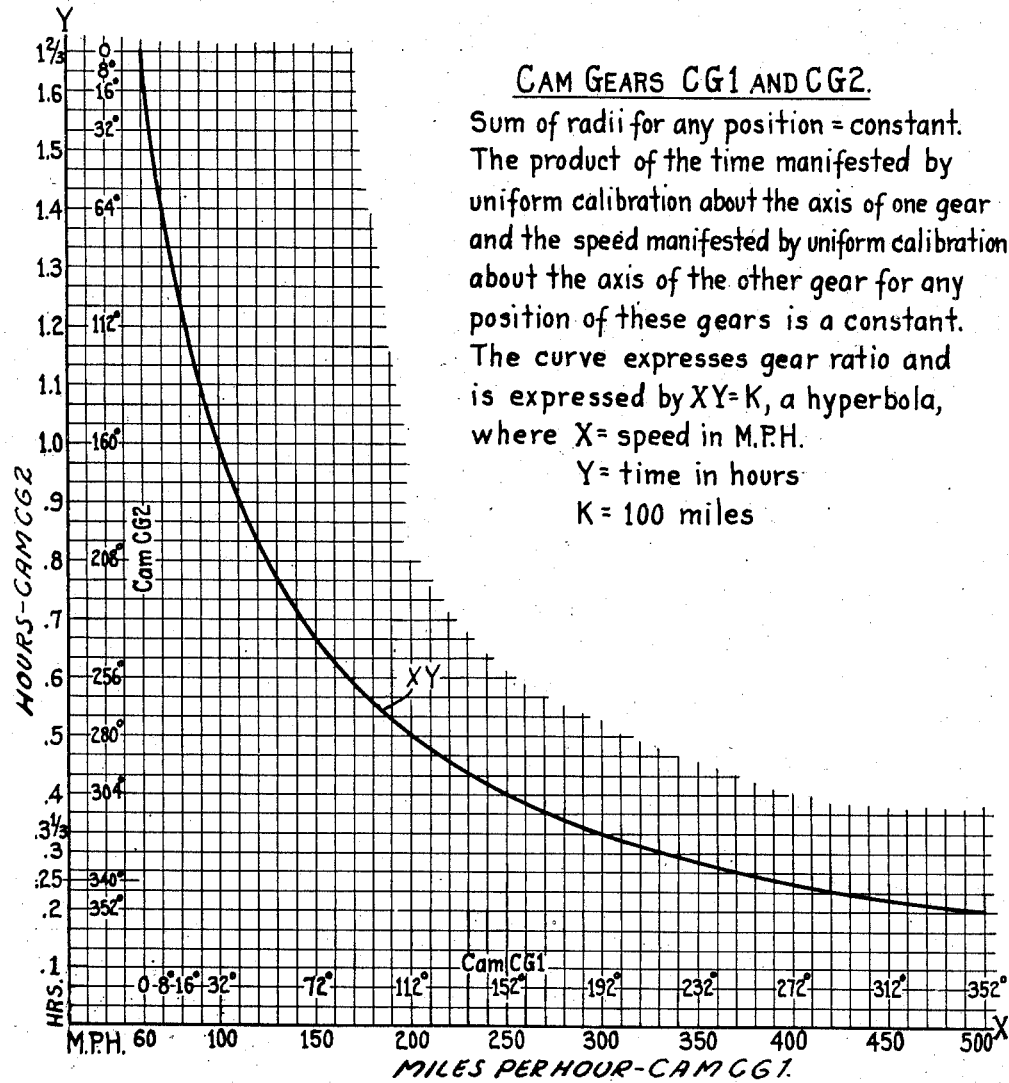

Figs. 3A-3H, inclusive, illustrate the relays and wiring of the decoder for characterizing a flight route and including storage relays for storing identity, cruising speed, starting time, and altitude for each fix, and in the lower portion of these figures a route expander has been illustrated which has been illustrated conventionally by the block RX in the block diagram of Fig. 1;

Figs. 4A, 4B, 4C and 4D illustrate the circuits and apparatus for controlling the climb and descent motors associated with a particular leg of the route (namely, section CV—MC);

Figs. 5A-5D show the electrical apparatus portion of the calculator illustrated by block diagram AT in Fig. 1 of the drawings;

Figs. 6A-6E illustrate the mechanical portion of the calculator AT illustrated by block diagram in Fig. 1 including the electrical motors for operating this mechanical apparatus and of which Figs. 6A, 6C and 6E illustrate "time units" associated with the fixes and of which Figs. 6B and 6D show "speed units" associated with the stretches between fixes (also see Fig. 9);

Fig. 7 illustrates more specifically the apparatus for operating the four contact mechanisms which electrically manifest the four digits of arrival time including intermittent gearing and an automatically controlled gear shift;

Figs. 8A-8J illustrate the positions assumed by cams of this gear shift apparatus, shown in Fig. 7, for various times during a 24-hour period;

Fig. 9 illustrates the manner in which the time units and speed units of the calculator are interchangeably assembled, i. e. time units are interchangeable with time units and speed units are interchangeable with speed units;

Figs. 10 and 11 illustrate an electrically operated clutch and brake associated with each of the motors of the calculator illustrated in Fig. 6;

Figs. 12A-12D illustrate one of the wind direction and wind velocity knobs illustrated in the block VDB of block diagram Fig. 1, together with the contact mechanism operated thereby and the relays for controlling the associated wind velocity motor and wind direction motor as well as contacts operated by these motors for stopping their operation when they have reached the position prescribed by their associated control knobs;

Fig. 13 illustrates a hyperbolic curve from which degrees of turning of one cam gear may be read if the degrees of turning of the other cam gear are known;

Figs. 14A, 14B and 14C illustrate respectively triangles of ground speed calculation for an aiding and a hindering wind;

Fig. 15 diagrammatically illustrates how Figs. 3A-3H and Figs. 5A-5D are interconnected by cables; and Fig. 16 illustrates how the sheets containing Figs. 6A to 6E inclusive, may be partly cut away and then laid side-by-side.

STRUCTURE AND STRUCTURAL OPERATION

Figure 2A:
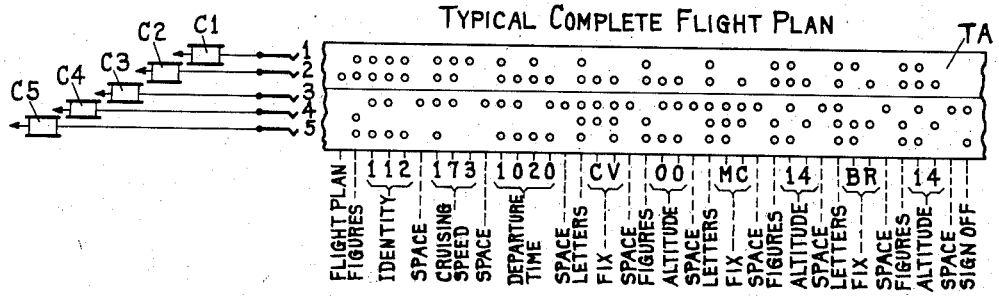
Figs. 2A and 2B illustrate tape portions, the tape portion of Fig. 2A illustrating a perforated tape portion defining a proposed flight route in which each fix and altitude of the route are specifically designated.
Figure 2B:
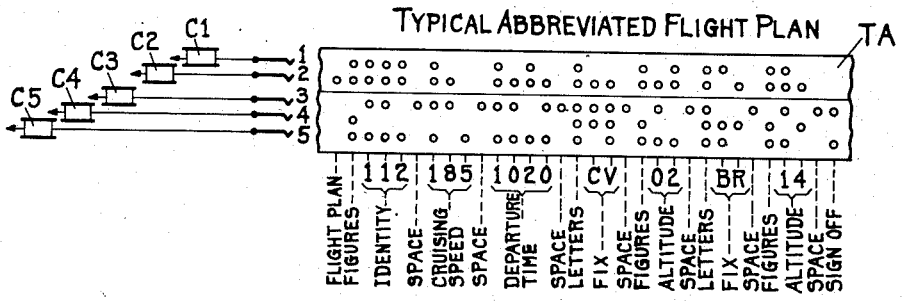

*Block diagram.*—In Fig. 1 has been illustrated a block diagram showing by rectangles the various apparatuses involved in the particular form of the invention disclosed in the instant application and the manner in which these apparatuses are interconnected by cables and a shaft. This Fig. 1 illustrates a Teletype TL having inlet wires 11 and 12 which in turn control a tape perforator P. This Teletype and tape perforator constitute well-known apparatuses and for this reason have been shown conventionally in block form. These apparatuses perforate a paper tape in a manner so that each code character is characterized by one to five holes punched at a particular location crosswise of the tape as illustrated in Figs. 2A and 2B of the drawings. The code employed is the well known Baudot code which transmits in succession five code elements of which each element may constitute one of two characters (hole or no hole) and the tape perforator in turn perforates these five elements of a code character in a single crosswise row on the tape. As shown in Fig. 1 the tape perforator is connected to the decoder in a manner so that the tape may pass directly from the tape perforator into the decoder, a slack controlling weight roller being employed to control a contact 13 which determines whether the decoder shall or shall not pull tape into the same. In practice, it may be desirable to omit this slack take-up feature in that it may be desirable to feed automatically or locally perforated tape into the decoder manually.

The decoder D is shown by a block diagram directly below which there is a block diagram RX which denotes a route expander. This portion of the apparatus includes relays for operating auxiliary fix identifying and altitude characterizing relays of unnamed fixes of a particular route, so that even though the Teletype message does not include all fixes of the route the route expander will control auxiliary relays at the unnamed fixes to identify these fixes and to operate the altitude relays so as to characterize the same altitude as was characterized for the next preceding fix in the Teletype message. This decoder and route expander D—RX is specifically illustrated in Figs. 3A-3H of the drawings. The arrival time calculator conventionally shown by block AT of the block diagram of Fig. 1 has been illustrated divided into two parts namely, the "Electrical portion" and the "Mechanical portion."

The electrical portion is specifically illustrated in Figs. 5A-5D of the drawings whereas the mechanical portion is illustrated in Figs. 6A-6E of the drawings. The next block TO in the block diagram is the take-off, climb and descent apparatus, and this is shown in Figs. 4A, 4B, 4C and 4D of the drawings.

Just to the left of this take-off, climb and descent block TO is illustrated the manually controlled "wind velocity and direction" block VDB the apparatus of which is shown in Figs. 12A-12D of the drawings. Near the top of Fig. 1 is illustrated by block diagram the flight check board FCB. This flight check board includes a specified number of posting units for each fix of which the fixes CV, MC and BR only have been illustrated. It should of course be understood that many more fixes may be used and calculated by the same calculator extended. At each end of each fix on this flight check board FCB is illustrated a direction lamp provided with an arrow to indicate the direction of flight of the particular flight route displayed. They have been designated EL and WL. The posting units for this flight check board FCB may be of a construction such as illustrated in the prior application of Wight and Field, Ser. No. 489,776, filed June 5, 1943, when modified as pointed out in the Wight, Field and Dicke application, Ser. No. 500,672, filed August 31, 1943, now Patent No. 2,399,777.

*Decoder.*—Let us now refer to Fig. 2A in which has been illustrated a typical complete flight plan, a typical abbreviated flight plan being illustrated in Fig. 2B. It will readily be seen that these flight plans consist of a series of characters including characters such as "flight plan," "figures," "space," "letters," "sign-off," as well as specific letters and specific numerals. As illustrated the first character is "flight plan" or FPR1 which designates that the code character will pick up flight plan relay FPR1. The next character is "figures" which signifies that the relay FIGS is to be picked up by this code character. This relay corresponds to the usual shift-key on the typewriter. With this relay FIGS up only the figures and characters illustrated in the column "figures" (Fig. 3A) can be transmitted whereas if the relay LTRS is in its energized position, which is picked up by the code element LTRS, only the letters and characters illustrated in the column "letters" (Fig. 3A) will be transmitted. As illustrated by the tape in Fig. 2A after the character "figures" has been transmitted the numbers 1, 1 and 2 will be transmitted in that order signifying airplane identity or flight plan identity 112. After the character 2 has been transmitted a character "space" is transmitted which is followed by the numerals 1, 7 and 3 signifying that the cruising speed is 173 miles per hour. This is followed by the character "space" followed by numerals 1, 0, 2, 0, indicating a starting time of 10:20. This is followed by a "space" character which is followed by a "letters" character signifying that the letters relay LTRS is now up and the figures relay FIGS has been deenergized. It is readily seen that the picking up of one of these relays opens the stick circuit for the other relay so that only one of these two relays is up at a time (see Fig. 3A). After the transmission of the "letters" character, the characters C and V will be transmitted in that order signifying that the first fix of the route is the fix CV. This is followed by the transmission of "space" and "figures" characters which is then followed by the transmission of 0 and 0 signifying that the airplane is to take off at fix CV, that is, the altitude at fix CV is zero. This is then followed by "space" and "letters" characters followed by the transmission of characters M and C in that order signifying that the next fix is the fix MC, which is then followed by the transmission of numerals 1 and 4 in that order signifying that the altitude of airplane flight at fix MC is 14,000 feet. This is then followed by the transmission of "space" and "letters" characters followed by the characters B and R in that order signifying that the next fix is fix BR. This is then followed by "space" and "figures" characters followed by numerals 1 and 4, signifying that the airplane is to fly at altitude 14,000 feet at the third fix, namely, fix BR. This is then followed by a "space" character followed by the "sign-off" character which latter character completes the necessary circuit for picking up the sign-off relay SO shown in Fig. 3H of the drawing.

Figure 3A:
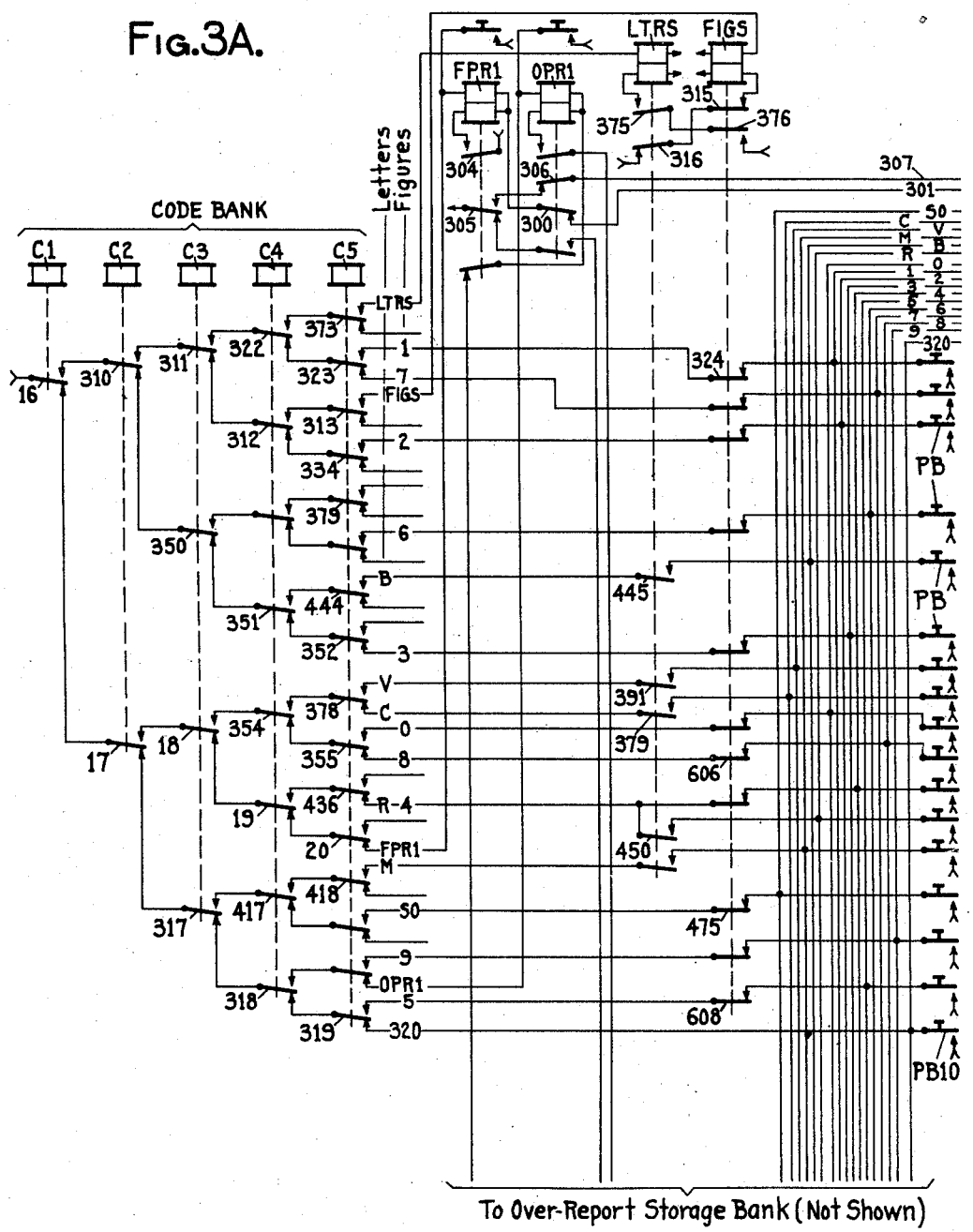

Referring to the typical flight plan tape shown in Fig. 2A it will be seen that the five portions of each increment of the tape are in line with contact fingers which are connected to code element relays designated C1, C2, C3, C4 and C5 successively reading from top to bottom. Each of these five code elements may constitute a whole or not, as the case may be, and in practice the five spring contacts are arranged to receive energy as they pass over a hole in the tape as the tape moves into the decoder D. These relays C1, C2, C3, C4 and C5 are also shown at the top of Fig. 3A of the drawings. It is readily seen that the flight plan character FPR1 constitutes a punched hole at the location 2 in the tape signifying that the relay C2 will be picked up when the tape assumes this first position.

Referring now to the circuits carried through contacts of the relays C1—C5 it will be observed that with relay C2 only energized a circuit may be traced from the (+) terminal of a suitable source of current through back contacts 16, 18, 19 and 20 of relays C1, C3, C4 and C5 and through front contact 17 of relay C2 which leads to the relay FPR1 irrespective of whether the letters relay LTRS or the figures relay FIGS is energized. By assuming the various punch holes or perforations in the tape shown in Fig. 2A and in tracing similar circuits through the contacts of relays C1 to C5, inclusive, it will be observed that some of the circuits closed lead to a wire having two designations, one designation in the "letters" column and the other designation in the "figures" column, and that these designations correspond to the designations shown adjacent the tape. Further, these wires run to the corresponding bus wire through front contacts of the letters relay LTRS or the figures relay FIGS so that the same character transmitted will energize one bus wire or another bus wire depending upon whether the letters relay LTRS or the figures relay FIGS is energized. Only a portion of the total number of bus wires has been illustrated and for this reason attention is directed to the characters R and 4 which lead to bus wires R or 4 depending upon whether the letters relay LTRS or the figures relay FIGS is energized.

Figure 3B:
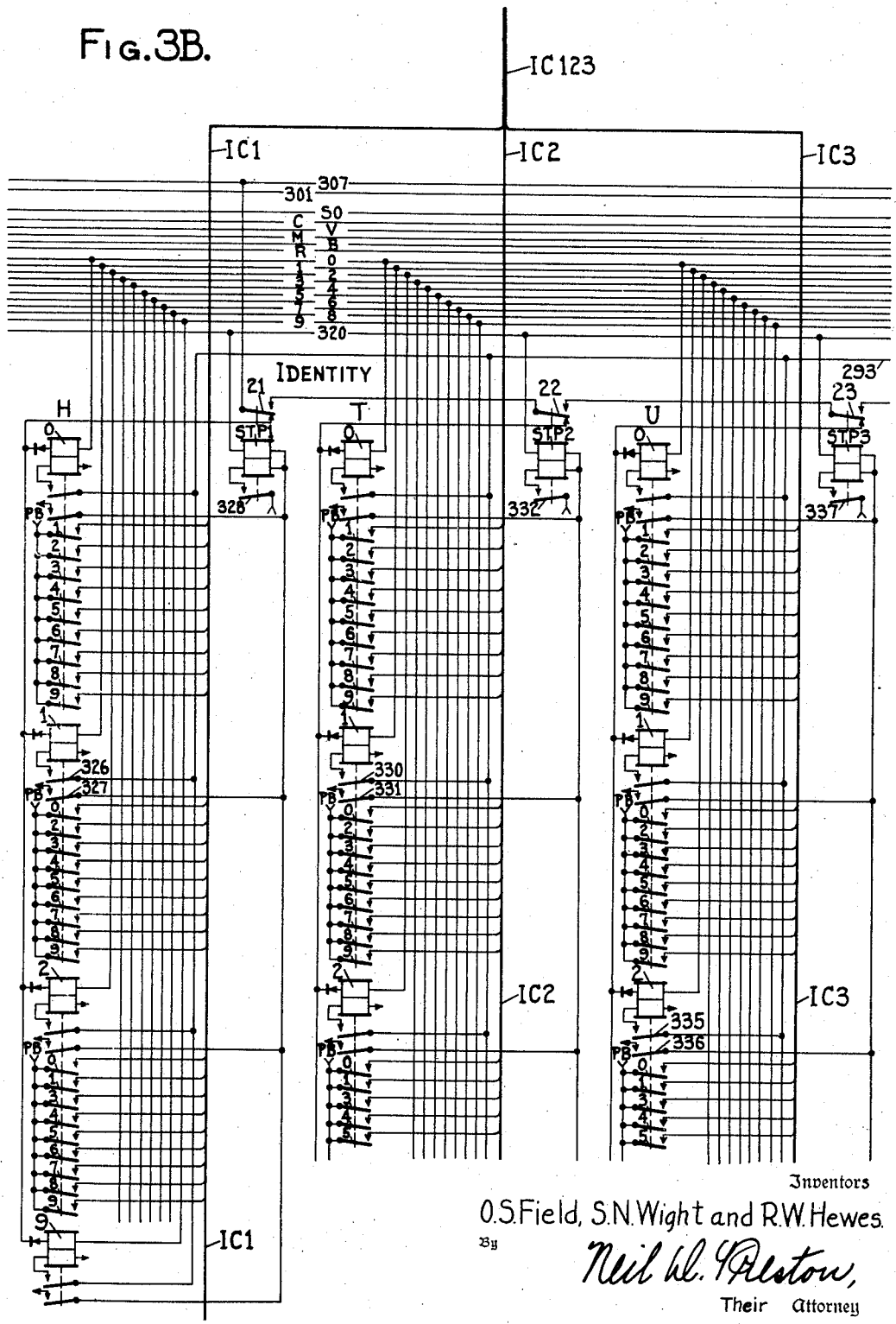

Referring now to Fig. 3B of the drawings, it will be observed that three columns of numeral designating relays H, T and U have been provided. For each decoding of a tape characterizing a particular flight route number three digit numbers will be transmitted to signify "identity" as indicated for the portion of tape so marked in Fig. 2A of the drawings. The first numeral so transmitted signifies "hundreds," and picks up one of the relays in column H of Fig. 3D of the drawings, the second numeral transmitted picks up a correspondingly numbered relay in the column T desingated "tens" whereas the third numeral transmitted will pick up one of the relays in the column U, so that three relays are energized to signify an airplane identity number from 1 to 999. For the particular flight route illustrated by the tape shown in Fig. 2A the airplane identity number is 112 signifying that relays 1 in columns H and T and relay 2 in column U will be picked up.

Three similar columns of relays H, T and U are shown in Fig. 3C of the drawings and identify the "cruising" speed of the airplane. In Fig. 3D of the drawings four columns of numeral designating relays 10H, H, 10M and M have been illustrated. The first column 10H signifies tens of hours, the second column H signifies units of hours, the third column 10M signifies tens of minutes, and the fourth column M signifies units of minutes, and the time so signified is the "starting time" for the proposed airplane flight. In Fig. 3E have been illustrated some of the relays for designating two-digit fix letter characters. The relays illustrated for the first digit are relays M, B and C whereas the relays illustrated for the second digit are the relays V, R and C.

Referring now to Fig. 3F in this figure has been illustrated the fix relay CVR and the associated column of tens relays T and associated column of units relays U for signifying the altitude at which an airplane is to fly over the fix CV. In this connection it is readily observed that the fix relay CV is picked up only if the relay C in the first digit column of Fig. 3E is in its energized condition and the relay V in the second column, signifying the second digit, is in its energized condition.

Figure 3G:
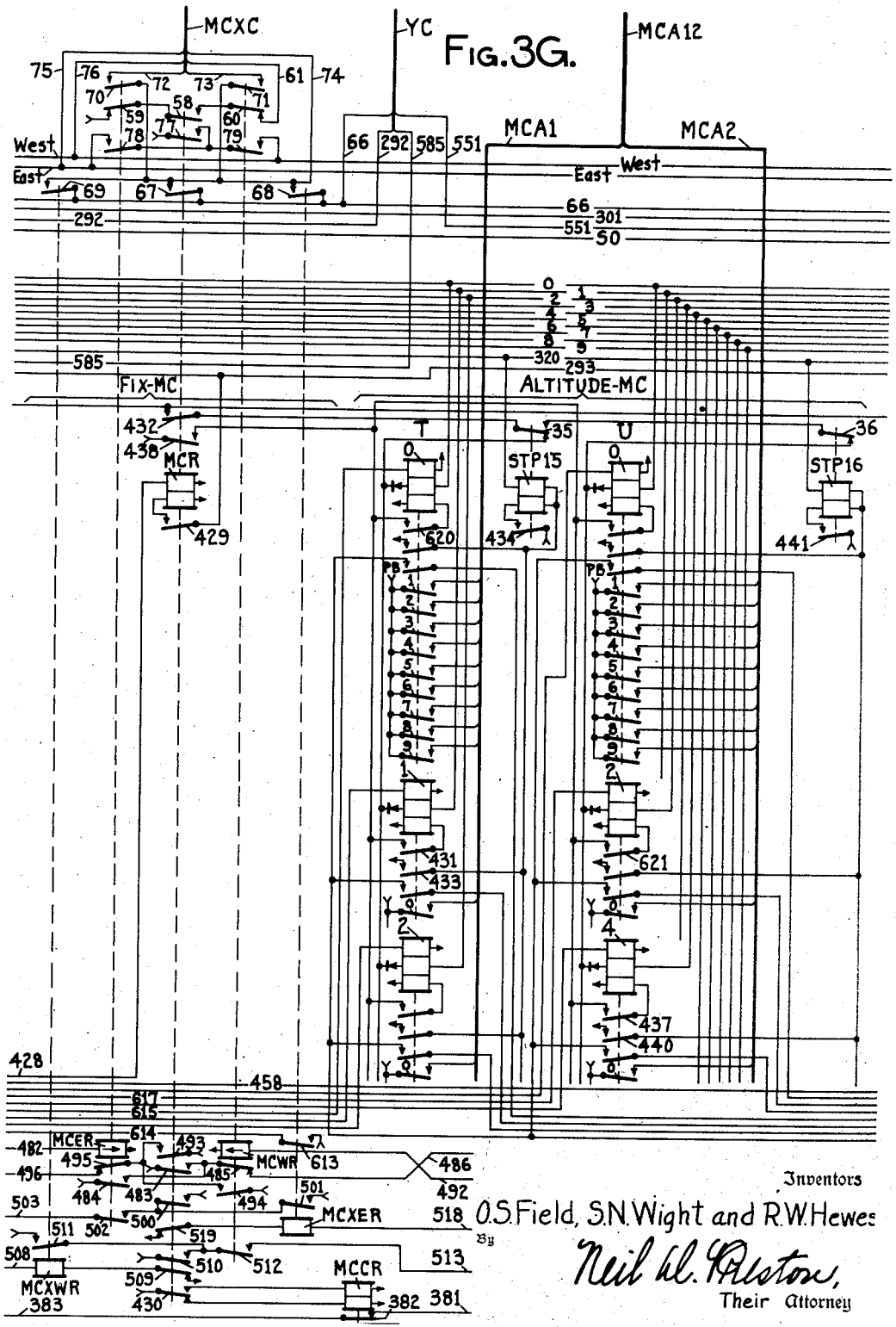

Referring now to Fig. 3G the apparatus illustrated therein is similar to that illustrated in Fig. 3F except that it applies to the fix MC controlled by the relay MCR. Similarly, the apparatus shown in Fig. 3H is similar to that shown in Fig. 3G of the drawings except that it applies to fix BR including a fix relay BRR.

Referring again to Fig. 3B of the drawings, it will be observed that three stepping relays STP1, STP2 and STP3 are illustrated associated with the columns of relays H, T and U signifying hundreds, tens and units for characterizing the identity of the airplane. It will be observed that the relays of column H are energized through the back contact 21 of stepping relay STP1 whereas the relays of column T are controlled through the front contact 21 of the stepping relay STP1 and a back contact 22 of the stepping relay STP2. Similarly the relays of the column U are energized through the front contacts 21 and 22 of stepping relays STP1 and STP2 and through the back contact 23 of the stepping relay STP3. It should be observed that similar stepping relays STP4, STP5, STP6, STP7, STP8, STP9, STP10, STP11, STP12, STP13, STP14, STP15, STP16, STP17 and STP18 are illustrated in Figs. 3C, 3D, 3E, 3F, 3G and 3H of the drawings and that they are provided with similar contacts numbered 24 to 38 inclusive. It should be observed that the right-hand terminal of the upper winding of each of these stepping relays is connected to a wire 320 which is energized during an "off" period between code characters on the perforated tape, namely, when all of the code element relays C1—C5 assume their deenergized position. From this it will be understood that a stepping relay is picked up only during the "off" period between code characters.

Also, the right-hand terminal of both windings of these stepping relays is connected to the other terminal of such source through a front contact of the code character relay that is then energized of the next preceding column of relays. In other words, a stepping relay cannot pick up unless at least one relay in the next preceding column of code character relays is energized and then only when all of the five code element relays C1—C5 assume their deenergized position. It should also be noted that the left-hand terminal of the upper winding of all of the code character relays are energized through a circuit including the back contact of the stepping relay next to the right and all of the front contacts of the stepping relays to the left, except for the stepping relays STP11, STP12, STP13, STP14, STP15, STP16, STP17 or STP18. The stepping relays STP11 and STP12 are associated with fix letter identifying relays which are used more than once and stepping relays STP13, STP14, STP15, STP16, STP17 and STP18 are associated with fix relays in separate branch circuits. Each of the code character relays and each of the stepping relays heretofore mentioned when once energized is maintained energized under predetermined conditions through the medium of a stick circuit. These stick circuits will be more fully described in connection with the operation of the system hereinafter.

*Over-and-under detection.*—In order to prevent the calculation of the arrival times for a flight route when the Teletype message has accidentally transmitted too few or too many characters of figures or letters, as the case may be, a cancelling relay CR, a repeater cancelling relay CP, and an impulse relay IMP together with an audible signal or alarm BEL have been provided. This apparatus, shown in Fig. 3E, is employed to cancel all of the code character storages that may have taken place in the decoding and storing relay bank (Figs. 3B-3H). For instance, by referring to Fig. 2A it will be seen that ten numeral code characters must be received between the first code character "figures" and the first code character "letters." The over-and-under detection apparatus including this cancelling relay CR is constructed to cancel out all of the storage that may have taken place in the event there have been either too few or too many code characters transmitted during any "letters" or any "figures" transmission. For the first figures transmission of the present disclosure it will be seen that if the stepping relay STP10 has not picked up to open its back contacts 40 and 41 (Fig. 3E) when the letters relay LTRS picks up to close its front contact 42 the cancel relay CR is picked up, assuming the flight plan relay FPR1 up. This is the under-detection for the first series of figures. Similarly, if the figures relay FIGS remains up to keep closed its front contact 43 and the letters relay LTRS does not pick up to open its back contact 49 before the impulsing relay closes its back contact 47 for terminating the next code character, the stepping relay STP10 now being up to hold closed its contact 41, will through the medium of back contacts 44, 45 and 46 of the fix relays CVR, MCR and BRR close a circuit for the cancel relay CR. This is the over-detection. The cancelling relay CR when once picked up will be stuck up through a stick circuit including its stick contact 48 and a cancel button contact CB. Also, with this relay CR picked up it will by opening its back contact 49 deenergize the repeater relay CP which will then by the opening of its front contact 50 remove energy from the stick circuits of all storage relays in Figs. 3A-3H, inclusive, and the dropping of these storage relays will cause their associated stepping relays to also be deenergized. Furthermore, dropping of the repeating cancel relay CP will by the closure of its back contact 51 cause sounding of the alarm device BEL.

Similar apparatus may be provided at each point in the storage apparatus where code characters change from letters to figures or from figures to letters. By this construction the omission of a code character or the transmission of an additional code character before a letters relay is substituted for a figures relay, or vice versa, all of the stored indications will be cancelled.

*Flight check and flight progress boards.*—In accordance with the present invention it is proposed to very quickly and automatically calculate all of the arrival times of a particular flight route and to automatically display these arrival times together with the identity of the flight route, the cruising speed and the altitude for each fix so that this entire flight plan is pictorially presented before the dispatcher. It is proposed that the dispatcher will study this flight plan in connection with the flight routes already set up on a flight progress board such as disclosed in the patent to Wight and Field, No. 2,344,761, dated March 21, 1944, and to thereafter, possibly in response to a manual act, cause this entire flight plan together with its calculated arrival times and other information to be transposed from the flight check board FCB shown in the upper part of Fig. 1 of the drawings to a flight progress board such as shown in said patent to Wight and Field, No. 2,344,761, dated March 21, 1944. This transposition of information is accomplished through the medium of a suitable system master posting relay SMPR such as is illustrated in said patent to Wight and Field, No. 2,344,761, dated March 21, 1944. This system master posting relay SMPR and an associated repeater relay SMPRP have been shown conventionally in the upper portion of Fig. 5D of the drawings.

Figure 5D:
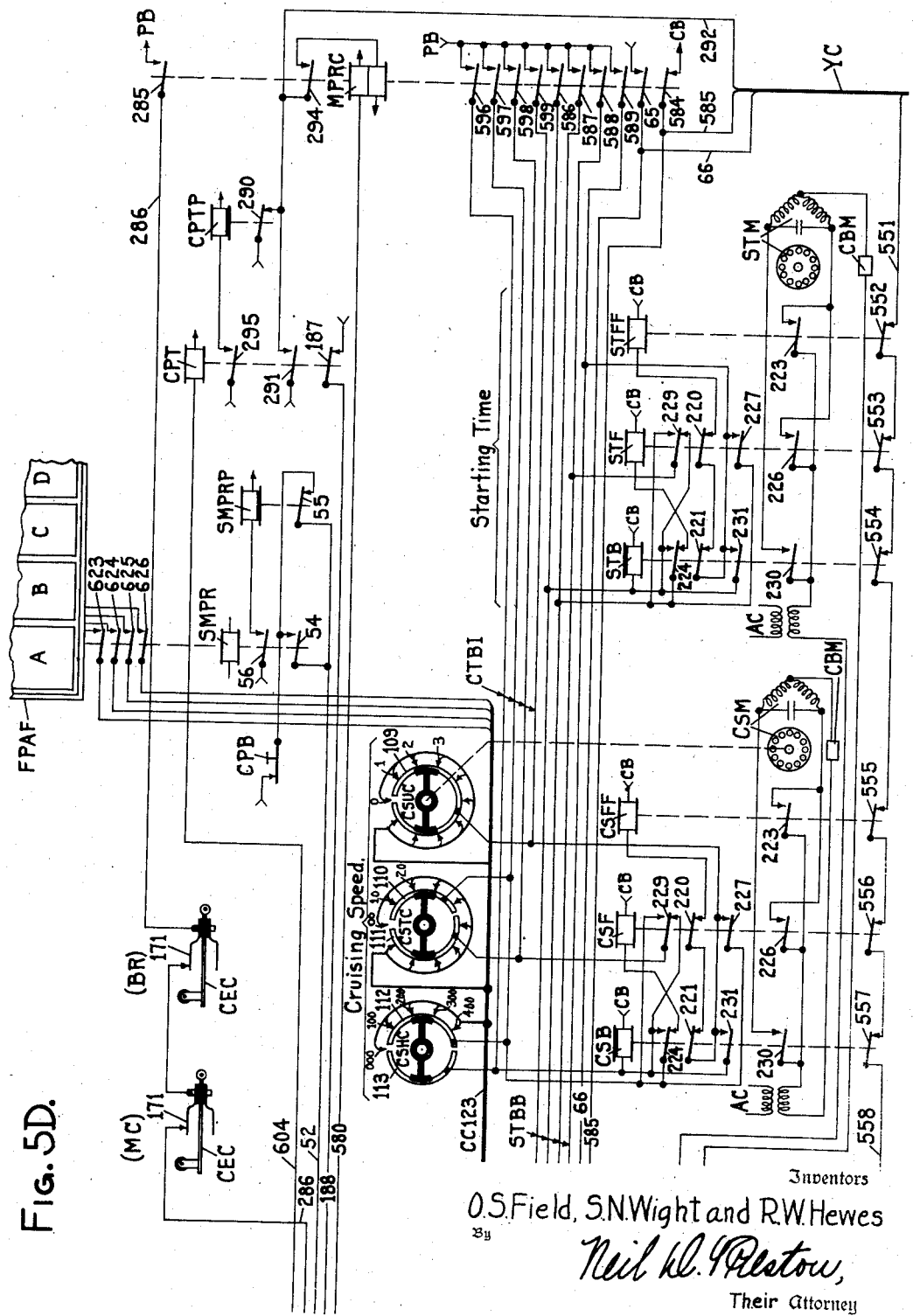

It should be noted that the check posting repeating relays MPRCPP shown in each of Figs. 5A, 5B and 5C may be stuck up through stick circuits including their stick contact 53 each in series with the contacts 54 and 55 of the relays SMPR and SMPRP in multiple. The cancelling push button CPB may be used to cancel the flight route displayed by the posting units on the flight check board FCB shown in the upper part of Fig. 1 of the drawings. Such manual cancellation may be accomplished by depressing the cancelling button CPB to thereby cause opening of the same stick circuits for the relays MPRCPP which are opened in response to the picking up and subsequent dropping of the system master posting relays SMPR and SMPRP. The relay SMPRP (Fig. 5D) is controlled by front contact 56 of relay SMPR.

*Route expander.*—As already mentioned, Fig. 2A shows the tape of a typical complete flight plan whereas Fig. 2B shows a typical abbreviated flight plan including unnamed fixes. In order for the automatic arrival time calculator to function properly it is necessary that each fix of a proposed route as well as the altitude at which the airplane is to fly over such fix should be made manifest. In view of this requirement it is necessary to provide suitable means for expanding an abbreviated route into a complete route and apparatus to perform this function has been provided and is illustrated in the lower portions of Figs. 3F, 3G and 3H of the drawings. This apparatus includes east direction relays MCER and BRER which are sequentially energized in response to the picking up of the first fix relay when an eastbound proposed route is decoded in the decoding apparatus and includes auxiliary relays such as relays BRXER, MCXER and CVXER which are sequentially energized in that order in response to the energization of the first fix relay beyond an unnamed fix. These letter relays will, however, only pick up at the unnamed fixes. The control circuit for relay MCER includes front contact 480 of relay CVR, back contact 481 of relay CVWR and wire 482. The control circuit for relay BRER includes in multiple front contacts 483 and 484 of relays MCR and MCER respectively, back contact 485 of relay MCWR and wire 486. The control circuit for relay MCWR includes in multiple front contacts 490 and 489 of relays BRR and BRWR respectively, back contact 491 of relay BRER and wire 492. The control circuit for relay CVWR includes in multiple front contacts 493 and 494 of relay MCR and MCWR, back contact 495 of relay MCER and wire 496.

Considering now the auxiliary relays the control circuit for the relay CVXER includes in multiple front contacts 500 and 501 of relays MCR and MCXER, front contact 502 of relay MCER, wire 503, and back contact 504 of relay CVR. The control circuit for relay BRXWR includes in multiple front contacts 510 and 511 of relays MCR and MCXWR, front contact 512 of relay MCWR, wire 513 and back contact 514 of relay BRR. The control circuit for the relay MCXWR includes in series front contacts 506 and 507 of relays CVR and CVWR respectively, wire 508 and back contact 509 of relay MCR; and the control circuit for relay MCXER includes in multiple front contacts 515 and 516 of relays BRXER and BRR, front contact 517 of relay BRER, wire 518, and back contact 519 of relay MCR. In other words, the first mentioned group of relays are tumble-up east direction relays ending in letters "ER" which tumble up, so to speak, in the direction of traffic whereas the second group or auxiliary east (ending in letters "XER") direction relays are relays which tumble up, so to speak, in the opposite direction to that of the route, but only at unnamed fixes. In other words, at the starting fix only the main fix relay is energized, at the last named fix and at each intermediate named fix of the route only the east direction relay and main fix relay are energized, at each unnamed intermediate fix only east direction relay and the east auxiliary relay are energized, and at all fixes beyond the last named fix only the east direction relay will be energized. It will be observed that the east or west direction relay picked up through front contact 65 of relay MPRC (Fig. 5D), wire 66, if the main fix relay, such as MCR is energized (see contact 67) or an auxiliary relay such as MCXER (see contact 68) or MCXWR (see contact 69) are in an energized condition providing the proper direction relay such as MCER or MCWR are energized to hold their front contacts 70 or 71 closed, to allow current to flow over wires 72 or 73 to relay LER or LWR (Fig. 5C). Also, the east bus wire 75 and the west bus wire 76 controlling the east relay ER (Figs. 5A, 5B and 5C) or the west relay (not shown) are energized through contacts 77 of the main fix relay, such as MCR provided the contacts 78 or 79 of direction relays such as MCER or MCWR (Fig. 3G) are closed. In other words, the east relays ER will be picked up at all fixes on the entire board when an eastbound route is set up because the east and west buses 75 and 76 extend throughout the board and since at least at the last fix both the main fix relay and the east direction relay will be in their energized condition.

It will be observed that the wire 74 (in cable MCXC, Fig. 5B) at each fix receives energy from the plus terminal of a source during posting operation through front contact 65 of master check posting relay MPRC (Fig. 5D) and wire 66 in cable YC when either the main fix relay, such as MCR, see its contact 67 (Fig. 3G) is energized or an associated auxiliary relay, such as MCXER, see its contact 68, is in an energized condition, as a result of which the master check posting repeater relay MPRCP (Figs. 5A, 5B and 5C) at each fix of the prescribed route will be picked up in response to the picking up of relay MPRC (Fig. 5D) since either the main fix relay (such as MCR) or an auxiliary direction relay (such as MCXER) of the authorized portion of the route will be in an energized condition. These wires 61, 66, 72, 73, 74, 75 and 76 for fix MC are contained in cable MCXC (Figs. 1, 3G and 5B), like numbered wires, some of which have been omitted, being contained in cables CVXC and BRXC.

Similar direction relays CVWR, MCWR, BRWR, BRXWR, MCXWR and CVXWR are employed for westbound routes, but since the calculator specifically disclosed herein is only used for calculating eastbound routes these westbound direction relays need not be specifically discussed except insofar as their control contacts are used for eastbound travel. From this consideration it will be readily seen that if the fix relay CVR is picked up in response to a Teletype message and the fix relay BRR is next picked up, without the intervening picking up of the fix relay MCR, that as a result of such operation of the main fix relays CVR and BRR and the auxiliary or expanding fix relay MCXER is picked up. This auxiliary relay MCXER may through the medium of front contacts thereof perform the function of controlling the calculator apparatus which function would otherwise have been performed by the main fix relay MCR. Referring to the circuits controlled by these relays for fix MC it will be observed that only the main fix relay MCR will be picked up if this fix is the first fix to be identified in a route so that for the eastbound calculator shown the starting fix relay SF (Fig. 5B) may be controlled through a circuit including in series wire 61, a front contact, such as contact 58 of relay MCR (Fig. 5G) and back contacts, such as 59 and 60 of relays MCER and MCWR respectively as is actually the case. At every other fix whether it be a named or an unnamed fix the corresponding relay SF remains deenergized for this particular route so that the starting time motor will be stopped by the contact mechanisms of the calculator for fix MC under the above condition. These route expanding relays and their associated contacts and circuits will be more specifically described in connection with the operation of the system.

*Calculator*

Since the flight check board illustrated only involves three fixes CV, MC and BR which comprise three stations or other locations along an actual air route, although more fixes may be involved, only that portion of a calculator sufficient to calculate the arrival times at the fixes CV, MC and BR has been illustrated in Figs. 6A-6E and 9 of the drawings. Referring to Fig. 9 for the purpose of illustration only the "time units" and the "speed units" of the calculator, which in practice are mounted on a frame, have been shown mounted on a calculator table CT. The time units are particularly associated with the fixes CV, MC and BR whereas the speed units are particularly associated with the stretches or sections CV—MC and MC—BR of route between these fixes.

*Calculator motors*

The five calculator motors, namely, the climb motor CM, wind direction motor WDM, wind velocity motor WVM, cruising speed motor CSM, and the starting time motor STM may be of any suitable construction but are preferably, and are shown as, reversible alternating current motors. These motors preferably have two windings $a$ and $b$ arranged in quadrature with one end of each winding connected together and with the other end of these windings connected through the medium of a condenser. By this construction if either winding is directly energized by alternating current the other winding is energized by leading current supplied through the condenser. If both windings should be simultaneously energized no harm is done and the motor would not start. These calculator motors may be gear-head motors, constructed with a gear reduction so that the shaft thereof rotates at a much lower speed than does its rotor.

The first speed unit is associated with the stretch CV—MC and the second speed unit is associated with the stretch MC—BR. As shown in Figs. 6A–6E and 9 each time unit has associated therewith a climb and descent motor CM whereas the entire group of time units has associated therewith a starting time motor STM which drives a single time shaft 110 extending entirely through all of the time units. Referring now to the speed units shown in the upper portion of Fig. 9 (see also Figs. 6A–6E) each of these speed units has associated therewith a wind direction motor WDM and a wind velocity motor WVM whereas all of the speed units as a group has associated therewith a single cruising speed motor CSM which drives a single cruising speed shaft CSS extending throughout all of the speed units of the calculator. In Fig. 9 (see also Figs. 6A–6E) the shaft sections 106A, 106C and 106E are connected through gear trains and operate at different speeds. It should be understood that the units shown in Fig. 9 of the drawings are constructed to calculate an eastbound flight route only and that similar apparatus in practice will be employed for calculating a westbound flight route.

Since the moving parts of the various motors STM, CM, CSM, WVM and WDM are rather heavy and since the shafts and apparatus driven thereby must be stopped very quickly it is proposed that a combination clutch and brake CB such as illustrated in Figs. 10 and 11 of the drawings will be employed between each motor and the shaft driven thereby. One such combination clutch-brake unit CB has been illustrated for each of the motors shown in Figs. 9, 6A, 6B, 6D and 6E, of the drawings.

*Clutch-brake*

Referring to Figs. 10 and 11 of the drawings, the combination clutch-brake for the starting time motor STM above referred to preferably includes a suitable stationary braking base 81 supported by the motor such as STM through the medium of the housing 82 in which the starting time shaft STS driven by this combination clutch-brake is supported. To the shaft STS is keyed or otherwise operatively and slidably secured a bushing 83 to which is secured the clutch-brake plate 84 of magnetic material. The housing 82 has secured therein a four-legged spider-like magnetic structure 85 on the legs of which are provided coils 86 for the purpose of magnetizing this spider-like structure to at times draw the clutch-brake plate 84 out of braking relation with respect to the braking base 81 and to cause frictional or positive engagement of the two bushings 83 and 87 so as to perform a clutch action to clutch the motor shaft 88 to the calculator shaft STS, these bushings 83 and 87 being normally held apart through the medium of the compression spring 89 contained within a bushing 90. The clutch bushings 83 and 87 may have either frictional, square jaw or saw-tooth engaging surfaces so as to afford a rather positive driving connection when coils 86 are energized. The bottom of the teeth thereof are shown by dotted lines 91.

If now the coils 86 are so connected in series or multiple as to produce magnetic poles of alternate opposite polarities in the spider-like core structure and this circuit is either included in series or in multiple with the windings of the motor with which the clutch-brake CB is associated, the clutch-brake plate will be operated toward the left, as viewed in Fig. 10, each time the motor is energized, thereby causing the bushings or clutch elements 83 and 87 to frictionally engage each other to constitute a driving connection. Also, upon deenergization of such motor the magnetic field set up in the spider-like core structure will collapse and the compression coil spring 89 will push the clutch-brake plate 84 against the braking base 81 so that the calculator shaft is brought abruptly to a stop whereas the associated motor STM may continue to rotate for a short time to thereby dissipate its kinetic energy.

Hyperbolic ratio gearing

As illustrated in Figs. 6A, 6B, 6C, 6D and 6E and also in Fig. 9 of the drawings, each speed unit is connected to the time unit to the right thereof (it being a calculator for eastbound travel) through the medium of a variable ratio gear reduction which has a hyperbolic gear ratio. A hyperbola may be expressed by the algebraic expression $XY=K$, where $XY$ are variables and $K$ is a constant. From this algebraic expression it immediately becomes apparent that the product of $X$ and $Y$, for a particular point on the curve $XY$, is always the same. This is also true as to the speed of an object and the time required for that object to traverse a particular space, that is, it takes one-tenth as long to traverse a particular distance if the speed of movement is ten times as high. As illustrated in Fig. 6C, for instance, the variable ratio gears CG1 and CG2 are of identical construction and are of general spiral shape. These spirals are of such shape that the radii of the two gears drawn from the axis of rotation of one gear to the axis of rotation of the other gear are such that the gear ratio varies as the abscissa varies with respect to the ordinates of a hyperbolic curve. Such a curve is shown in Fig. 13. That is, the sum of these two radii is constant and is always the same and the product of the time manifested by uniform calibration about the axis of one gear and the speed manifested by uniform calibration about the axis of the other gear, for any position of these gears, is a constant. This is as it should be in that, as pointed out more fully hereinafter the shaft 100 to which the drive cam gear CG1 is secured is caused to assume an angular position depending upon the ground speed of an airplane as a result of which the shaft 101 to which the driven gear CG2 is secured, is rotated to a position representing the time necessary to traverse a predetermined distance when moving at such ground speed.

In the calculator disclosed in this application (Figs. 6A-6E) the variable ratio (see curve in Fig. 13) of gears CG1 and CG2 are designed to function for airplane speeds from 60 miles per hour to 500 miles per hour in the ground speed shaft 100 which reflects in the time shaft 101 extreme times of 1⅔ hours to 0.2 hour respectively. This is because of the inherent relationship between miles-per-hour and hours-per-mile as well as the particular choice of gear ratios in the time shafts 106A, 107, 106C and the other time gears used to give the arrival times. To change miles-per-hour to hours-per-mile, it is only necessary to obtain the reciprocal of the expressed mile per hour. This expression is actually performed by the gears CG1 and CG2 in changing the speed values of shaft 100 to the time values of shaft 101. But since the assignment of such values of time to shaft 101 would require larger gear ratios between gears 103A and 105A and also in the other time gears used to give the arrival times the values actually assigned to cam CG2 and shaft 101 for the purposes of this disclosure are made 100 times as great as the reciprocal values to obtain more convenient gear ratios for use in the calculating organization. These values of time arbitrarily assigned to the different scaled positions of the gear CG2 are then taken as a standard for a 100 mile stretch of airway and are shown on the Y axis of the graph Fig. 13. In other words, assuming a 100 mile stretch and referring to Fig. 13, when the ground speed reflected by shaft 100 is 60 M. P. H. the time reflected by shaft 101 is 1⅔ hours, for 100 M. P. H. the time reflected by shaft 101 is 1.00 hour, for 150 M. P. H. the time reflected by shaft 101 is ⅔ hour, for 200 M. P. H. the time reflected by shaft 101 is 0.5 hour, for 250 M. P. H. the time reflected by shaft 101 is 0.4 hour, for 300 M. P. H. the time reflected by shaft 101 is ⅓ hour, for 400 M. P. H. the time reflected by shaft 101 is 0.25 hour, for 450 M. P. H. the time reflected by shaft 101 is 2/9 hour, for 500 M. P. H. the time reflected by shaft 101 is 0.20 hour.

These variable ratio gears CG1 and CG2 have rather small teeth and are so accurately constructed that there is practically no lost motion between the teeth thereof. The hyperbolic curve $XY$ shown in Fig. 13 has not only speed and time calibrations assigned thereto but degree calibrations are also given so that degrees of turning of shafts 100 and 101 with respect to each other may be determined if the starting point of either of the shafts is known.

Differential or epicyclic gearing

As is readily seen from the drawings of Fig. 6A to Fig. 6E, inclusive, each of the time units (Figs. 6A, 6C and 6E) is provided with three sets of differential or epicyclic gearing, whereas each speed unit (Figs. 6B and 6D) is provided with only one such epicyclic gear train. This epicyclic gearing is the same as is more clearly illustrated in Fig. 3 of the prior application of Wight and Field, Ser. No. 470,018, now Patent No. 2,459,399, which prior application discloses a mechanical calculator over which the calculator of the present application is an improvement. Each of these epicyclic gear trains includes a sun gear S of a specified diameter, a planet mounting gear PM on the pivots of which the planet gears PL of one-half the specified diameter are mounted and which planets rotate physically about the sun gear S and their outer teeth engage annular teeth of an annular gear A of twice the diameter of said sun gear S. Obviously, other gear ratios could be employed but in order to render the entire problem more simple this ratio of diameter of gears employed in the epicyclic gear trains has been selected and for the purpose of this specific disclosure.

In other words, if the annular gear A is held stationary the speed ratio from the sun gear to the planet mounting gear is 3 to 1 and from the planet mounting gear to the sun gear is 1 to 3. Also, if the sun gear S is held stationary the speed ratio from the planet mounting gear PM to the annular gear A is 2 to 3 and from the annular gear A to the planet mounting gear PM is 3 to 2. Also, if the planet mounting gear PM is held stationary the speed ratio from the sun gear S to the annular gear A is 2 to 1 and from the annular gear A to the sun gear S is 1 to 2. These epicyclic gear trains are employed so that one shaft may be driven in accordance with the angle of rotation of two other shafts simultaneously and by employing a plurality of these epicyclic gear trains a particular shaft may be driven by any two or more of a plurality of shafts depending on how many epicyclic gear trains are employed. The gears and rings of the various epicyclic gear trains employed have been identified by like reference characters having distinctive suffixes.

Time units

Referring again to Fig. 9 and Figs. 6A–6E of the drawings, it will be observed that the calculator disclosed includes three time units one for each of fixes CV, MC and BR and shown more specifically in Figs. 6A, 6C and 6E and includes two speed units for section CV—MC and section MC—BR, respectively, and shown more specifically in Figs. 6B and 6D of the drawings. Referring particularly to Fig. 6C of the drawings the shaft 107 is driven by either of the shafts 104 or 106A through the medium of epicyclic gearing including the annular gear A1, the planet mounting gear PM1, the planet gears PL1, and the sun gear S1. The planet mounting gear PM1 is driven by the cam gear CG2 through gear reduction including gears 102, 103A and 105A which have a gear ratio commensurate with the distance between fixes CV and MC. The shaft 106C may be driven by either of the shafts 107 or CMS through the medium of an epicyclic gear train including an annular gear A2, a planet mounting gear PM2, two planet gears PL2 and a sun gear S2, the planet mounting gear PM2 being rotated to a particular position as determined by the climb and descent motors CM, the worm gear PM2 being driven by shaft CMS through the medium of worm 113.

As illustrated in Fig. 6C the annular gear A2 drives the planet mounting gear PM3 of a third epicyclic gear train of which the sun gear S3 is driven by the starting time motor STM shown in Fig. 6A of the drawings through the medium of shafts STS and 110, worm 111 and worm wheel 112. This latter epicyclic gear train also includes an annular gear A3 and planet gears PL3. The annular gear A3 of this latter epicyclic gear train drives the gear 115 of the four digit contact mechanisms for electrically manifesting the arrival time for fix MC. This latter gearing includes an automatically operated gear shift and is more specifically disclosed in Figs. 7 and 8A–8J of the drawings.

*Intermittent time gearing and gear shift.*— Let us now refer to Fig. 7 of the drawings wherein the time manifesting contact mechanisms and the manner in which they are operated is more specifically disclosed than is the case with the conventional showing illustrated in Figs. 6A, 6C and 6E of the drawings. It will be observed that the gear 115 and shaft 120 in Fig. 7 of the drawings are directly driven by the annular gear A3 of Fig. 6C of the drawings and that this shaft 120 is rotated toward the right when the calculator is operated toward a lower speed higher time position.

In Fig. 7 of the drawings have been illustrated four contact mechanisms which are operated to electrically manifest the starting time or arrival time manifested by the time unit through the medium of intermittent gearing and the automatic gear shift shown. Since it is important that each of the four contact mechanisms TTHC, TUHC, TTMC and TUMC should be very precisely operated so that all but one of the circuits leading therefrom are closed for each time indicating position of the apparatus, it is important that all of these contact mechanisms except the first, namely TTHC, should be operated by intermittent gearing, so that each contact mechanism of a higher order is advanced or retarded, as the case may be, only when the contact mechanism of the next lower order passes from 9 to 0 or from 0 to 9, as the case may be. As shown in Fig. 7, this intermittent gearing includes a drive gear DG having only one or two groups of two adjacent teeth and a stop gear SG having only one or two notches which gears are secured to the same shaft and upon rotating when passing from 9 to the 0 or from the 0 to the 9 position causes rotation of the contact mechanism of the next higher order by rotating the six-tooth jump gear JG through an angle of 120 degrees, such rotation of the jump gear JG being permitted by one of the teeth of the three-tooth lock pinion LP passing through the notch in the stop gear SG. As illustrated, this jump gear JG has its teeth directly engaged with the teeth of a driven gear which operates the contact mechanism of the next higher order. In Fig. 7 of the drawings, three such intermittent gear structures are provided and for convenience, they have been assigned like reference characters having distinctive suffixes 1, 2 and 3. It is readily seen that of the four contact mechanisms shown in Fig. 7 the contact mechanism TTMC is rotated one complete revolution for each six revolutions of the contact mechanisms TUMC, that the contact mechanism TUHC is rotated one complete revolution for each ten revolutions of the contact mechanism TTMC and that the contact mechanism TTHC is rotated one complete revolution for each three revolutions of the contact mechanism TUHC. As is readily apparent from the reference characters employed the contact mechanism TTHC reflects tens of hours, the contact mechanism TUHC reflects units of hours, the contact mechanism TTMC reflects tens of minutes, and the contact mechanism TUMC reflects units of minutes.

From this consideration, it is readily apparent that hours and minutes from 0 to 29 hours and 59 minutes may be indicated. Since, however, there are only twenty-four hours in a day and the present invention contemplates using the European time system having zero to twenty-three hours inclusive rather than twelve hours of A. M. and twelve hours of P. M., increased speed of rotation must be employed when the mechanism is advanced from the twenty-third hour to the zero hour position, and a suitable automatically operated gear shift mechanism is employed for this purpose.

Referring to Fig. 7, it will be observed that the shaft 128 which is driven by the gear 127 may be driven either by the high speed pinion 138 or by the low speed gear 126 depending upon the operated position of the gear shift spider GSS. As a matter of fact, the gear 127 is driven seven times as fast as when it is driven by the gear 137 and the idler 138 than when it is driven by the pinion 125 and gear 126. This ratio of gearing is necessary in order that the units of hours contact mechanism TUHC may be rotated over an arc of seventy per cent of one revolution instead of an arc of ten per cent of one revolution as will be required when the contact mechanism is advanced from the twenty-third hour position to the zero hour position as compared with being advanced from the twenty-two hour position to the twenty-three hour position, for instance. It will be readily seen that the ten-hour cam 10HC and the forty-eight hour cam 48HC fixed to shaft 128 and sleeve 134, respectively, may positively operate the gear shift spider GSS to its lower speed position against the action of spring 145; whereas, the two-hour cam 2HC may operate this gear shift spider GSS to its high speed position through the medium of the spring arm including the leaf spring 145. As a matter of fact, however, the gear shift spider GSS is actually operated to its low speed position through the medium of the cam 2HC acting on the roller 140 pivoted in the rigid arm 146 of the gear shift spider GSS.

The outside pitch-diameter of annular gear A3 is four times that of gear 115 so that shafts 120 and 121 turn four times as fast as the annular gear A3, the gears 115 and 116 having the same pitch-diameter. The gear 123 is rotated two teeth for each jump of jump gear JG1 and has 24 teeth so that shaft 122 rotates only one revolution for each two hours of expressed time. The pitch-diameter of gear 142 is half that of gear 141 so that shaft 143 and contact mechanism TTMC rotate one revolution for each hour of expressed time. The drive gear DG2 and stop gear SG2 have two sets of teeth and notches so that jump gear JG2 and shaft 124 make one jump each hour of expressed time. The drive gear DG3 is provided with two sets of jump teeth one set of which acts between hours 9 and 0 and the other acts between the hours 1 and 2, as conventionally shown by the arcuate lines 150 and 151, shown in Figs. 8F and 8J of the drawings, so that the jump gear JG3 makes two jumps every ten hours the second jump of which does, however, not change any contact relationship as conventionally illustrated by the large gap in the contact mechanism TTHC in Figs. 7, 6A, 6C and 6E of the drawings. For these reasons shaft 129 and gear 130 make 2/3 of a revolution for each ten hours of expressed time and the pitch-diameter of gear 130 is one-half that of gear 131 and one-fourth that of gear 133 since it is desired to have sleeve 134 and shaft 132 rotate one revolution for each 48 and each 24 hours of expressed time, respectively. In this connection it should be remembered that the high speed gear ratio is in effect between hours 23 and zero of expressed time.

The precise manner in which this gear shift from low speed to high speed and from high speed to low speed position is accomplished at a time when the driving gears directly involved are all stationary, as is required because this gear shift is of the engage-before-disengage construction, so that the meshing of gears as determined by the original assembling of the apparatus can never be disturbed, will now be pointed out by considering its operation by reference to Figs. 7 and 8A-8J of the drawings.

Figure 8D:
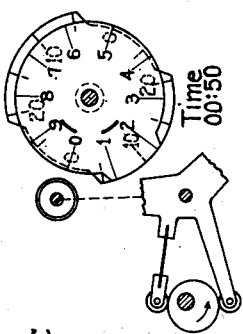
Figure 8J:
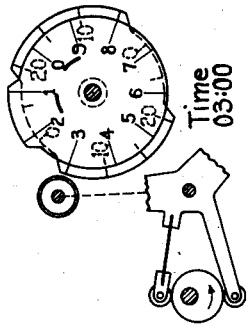
Figure 8C:
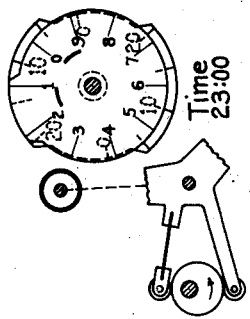
Figure 8F:
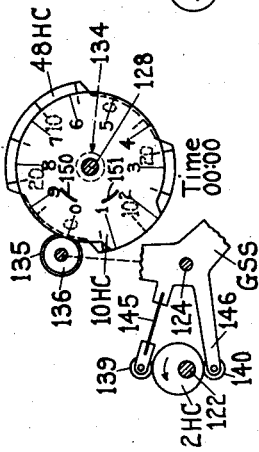
Figure 8I:
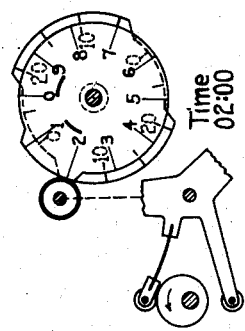

*Gear shift operation.*—As is readily apparent from Fig. 7 of the drawings the tens hours contact mechanisms TTHC and units hours contact mechanism TUHC are operated through the medium of the gear shift mechanism including the gear shift spider GSS and associated gears. Let us now observe under what conditions the gear shift spider GSS is shifted to its high speed position, in which it is shown in Figs. 7, 8E and 8F, and how it is shifted back to its low speed position in which it is shown in each of Figs. 8A-8D and 8G-8J. Referring to Fig. 8A of the drawings, it will be observed that the cams 48HC, 10HC and 2HC assume the 18:00 o'clock position. Under this condition the cam 48HC actually assumes the 15 hour position, although its contact mechanisms TTHC manifests the 10 hour position. This is true because the contact mechanism is so designed that there is no change made in the circuits when the cam 48HC is moved from any tens numbered position to the half point between it and the next higher tens numbered position. As is readily observed from Fig. 8A of the drawings the gear shift is still held in its low speed position by the cam 48HC, the spring 145, however, being tensioned by the cam 2HC so as to tend to shift the gear shift spider GSS to its high speed position as is the case for each even hour indication of the timing mechanism. The eccentric cam 2HC is rotated one revolution for every two hour period of time indication and at each odd hour positively holds the gear shift spider GSS in its low speed position.

Figure 8B:
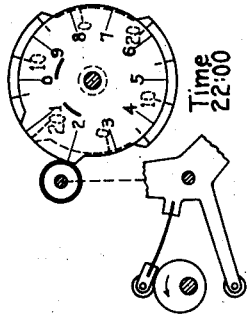
Figure 8E:
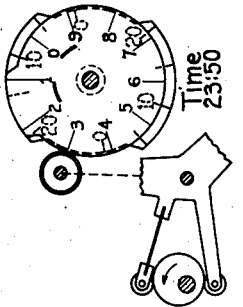
Figure 8H:
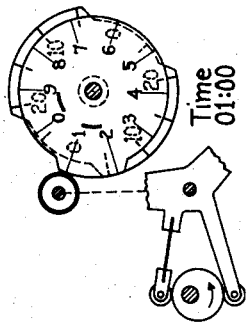
Figure 8A:
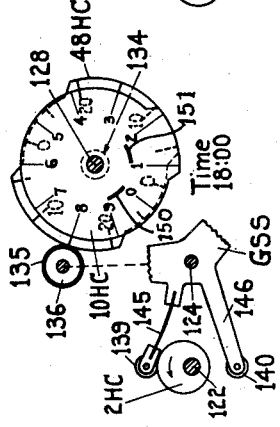

Referring now to Fig. 8B where the cams assume the 19:00 o'clock position, nothing particularly happens insofar as the cams 48HC and 10HC are concerned, but the eccentric cam 2HC now assumes a position where the spring 145 is not tensioned.

As the time mechanism is now advanced from the 19:00 o'clock to the 22:00 o'clock positions (see Figs. 8B and 8C) movement of the cam 10HC from the 9 position to the 0 position causes movement of the cam 48HC a half step from the 15 to the 20 position by reason of one set of teeth on the drive gear DG3, causing a jump operation of the jump gear JG3. In this connection it should be noted that the drive gear DG3 on the shaft 128 is provided with two sets of teeth and the associated stop gear SG3 is provided with two notches instead of only one as is true of gears DG1 and SG1. In other words, jump operation of the mechanism for driving the contact mechanism TTHC takes place twice between successive contact positions of the contact mechanism TTHC, that is, a half-step operation takes place when the 10HC cam moves from the 1 to the 2 position (no change in contact relationship of contact mechanism TTHC) and another jump operation takes place when this cam 10HC moves from the 9 to the 0 position. As a result of this construction the cam 48HC is advanced from the 15 position to the 20 position when the cam 10HC moves from the 9 to the 0 position (the apparatus now indicating 20:00 o'clock) and the cam 48HC is not moved when the cam 10HC moves from the 0 to the 1 position, so that at the 21:00 o'clock position of the cams the rollers 135 and 136 are both held outwardly to hold the gear shift spider GSS in its low speed position.

As the cam 10HC now advances from the 1 to the 2 position, the cam 48HC advances from the 20 to the 25 position at which point the roller 136 is held out by the cam 10HC and since this is an even hour position the eccentric cam 2HC assumes its upper-most position in which it tensions the spring 145. As the cam 10HC now advances to the 3 position the cam 48HC is not operated and now the time indicating mechanism assumes the 23 hour position, which is an odd hour position and therefore leaves the spring 145 untensioned. Also, the cams 48HC and 10HC no longer hold the gear shift spider GSS in its low speed position but the roller 140 acting on the rigid arm 146 does (see Fig. 8D) so hold it. As the cam 2HC now operates intermittently through the medium of the jump gear mechanism including the jump gear JG1 it eventually reaches the 50 minute position so that the apparatus now indicates 23:50 o'clock (see Fig. 8E). During this last 50 minutes of operation of the mechanism the gears beyond the gear shift mechanism have, of course, not been operated and gear shifting took place by the cam 2HC exerting pressure on the spring arm 145 to thereby cause the gear mechanism to be shifted to its high speed position.

It should be remembered that the gear teeth of gears 138 and 127 must engage before the gear teeth of gears 126 and 127 disengage. It is essential therefore that gear shifting should take place when the gears involved in this gear shift are not rotated. As the time indicating mechanism now advances another 9 minutes nothing particularly takes place in that no jump gearing is operated. As, however, the contact mechanism TUMC is operated from its 9 position to its 0 position jump operation of the jump gear JG1 takes place and since the jump gearing operated by the shaft 122 is also in its 50 position, jump operation of the jump gear JG2 also takes place. Since the gear shift spider GSS is now in its high speed position the shaft 128 and contact mechanism TUHC will be operated through a distance of 7 hours, namely, from the 3 hour position to the 0 hour position and when this contact mechanism TUHC operates from the 9 to the 0 position, jump operation of the jump gear JG3 takes place, thereby causing the contact mechanism TTHC to be operated from the 20 hour position to the 0 hour position. In other words, the apparatus now assumes the 0 o'clock position as shown in Fig. 8F of the drawings. As is clearly shown in Fig. 8F of the drawings, neither the cam 10HC nor the cam 48HC is in the way of its associated roller 136 or 135 and this being an even hour position the cam 2HC exerts a force upon the gear shift spider GSS through the spring 145 so as to maintain the gear mechanism in its high speed position. As the time indicating mechanism, however, advances step by step to the 50 minute position (see Fig. 8G) the eccentric cam 2HC engages the lower roller 140 and shifts the gear shift spider to its low speed position, this taking place while the gears included in the gear shift mechanism are all stationary so that the engagement and disengagement of the engage-before-disengage teeth can take place without the jamming of any of the gear teeth. As the time contact mechanism TTMC now moves from the 50 minute position to the 0 minute position the cam 10HC is advanced from the 0 to the 1 position so that this cam 10HC now holds the roller 136 outwardly so that the gear shift spider GSS is maintained in its low speed position by the cam 10HC. As now the cam 10HC is advanced from the 1 to the 2 position it, through the medium of the jump gear JG3 operated by teeth on the drive gear DG3 causes operation of the cam 48HC from the 0 to the 5 position so that the cam 48HC now again can through the medium of roller 135 hold the gear shift spider GSS in its low speed position. This condition is indicated in Fig. 8I of the drawings and constitutes the 02:00 o'clock position of the mechanism. In this position of the mechanism the eccentric cam 2HC again exerts a force on the gear shift spider GSS through the medium of the spring 145 but gear shifting cannot take place by reason of the fact that both of the cams 10HC and 48HC prevent such operation of the gear shift spider GSS. As the cam 10HC now advances from the 2 position to the 3 position (03:00 o'clock) the cam 48HC and eccentric 2HC only hold the gear shift mechanism in its low speed position.

It is thus seen that the cams 10HC and 48HC in combination hold the gear shift mechanism in its low speed positions at all even hours except at the 23:00 o'clock position and that the gear shift mechanism is at this time (23:00 o'clock) held in its low speed position by the eccentric cam 2HC; that gear shifting then takes place by operation of the cam 2HC from its 0 minute to its 50 minute position, that rapid operation of the gears associated with the contact mechanisms TTHC and TUHC takes place when the time indicating mechanism is advanced from the 23:50 o'clock position to the 00:00 o'clock position and that the gear shift mechanism is again then shifted back to the low speed position by operation of the eccentric cam 2HC from its 00:00 position to its 00:50 position.

The specific construction shown in Figs. 7 and 8A-8J and the operation just described is one wherein the contact mechanisms electrically manifest and the posting units controlled thereby indicate 00:00 time as distinguished from 24:00 o'clock as the last time indication of the day. If it is desired to have the posting units indicate 24:00 instead of 00:00 the gear shifting must be modified so as to take place during the twenty-fourth hour instead of the twenty-third hour. This only consists in shifting of each of the cams 2HC, 10HC and 48HC to the extent of one hour on their respective shafts.

*Starting time setting*

The manner in which the contact mechanisms TTHC, TUHC, TTMC and TUMC (see Figs. 7 and 5B) are used in stopping the starting time motor at the proper point when the starting time is entered into the calculator and how these contact mechanisms are used for operating the associated time indicating posting units will be more specifically pointed out hereinafter when the circuits associated therewith are described and the operation of the system is considered.

Referring to Figs. 6A to 6E, inclusive, and to Fig. 9 it will be observed that the starting time motor STM operates, through the medium of clutch-brake CB, the worm 111 and worm wheel 112, a starting time shaft 110 which extends throughout the entire calculator mechanism. Since there are times when the eastbound airplane starts from fix CV and there are other times when an eastbound plane starts from the fix MC, it is necessary at times to stop the starting time motor STM by a contact mechanism associated with the fix CV and at other times to so stop it by a contact mechanism associated with fix MC. This contact mechanism comprises the contact mechanism just described in connection with Fig. 7 of the drawing for the fix CV or the fix MC, as the case may be. It may be pointed out at this time that the relay SF (see Figs. 5A and 5B), in combination with the east relay ER, is used for this purpose, only one of the relays SF being energized at a time, namely, the one associated with the fix at which the starting time is to be indicated.

*Climb and descent motors and circuits*—As already pointed out hereinbefore each of the time units (Figs. 6A, 6C, 6E and 9) have associated therewith a climb and descent motor CM which drives a shaft CMS (Figs. 1, 4A, 4C, 6A, 6C and 6E) which shaft CMS in turn not only through the medium of worm 113 operates the worm gear PM2 the timing unit directly associated therewith but also operates through accumulator shafts 196A and 196C the timing units at subsequent stations. It also operates motor stop contact mechanisms CLUC, CLTC and CLRC (Figs. 4A, 6C and 6E) which stop the motor when the motor has reached the position designated by established circuits. The manner in which these climb and descent motors CM are operated is specifically disclosed in Figs. 4A and 4B of the drawings.

Figure 4A:
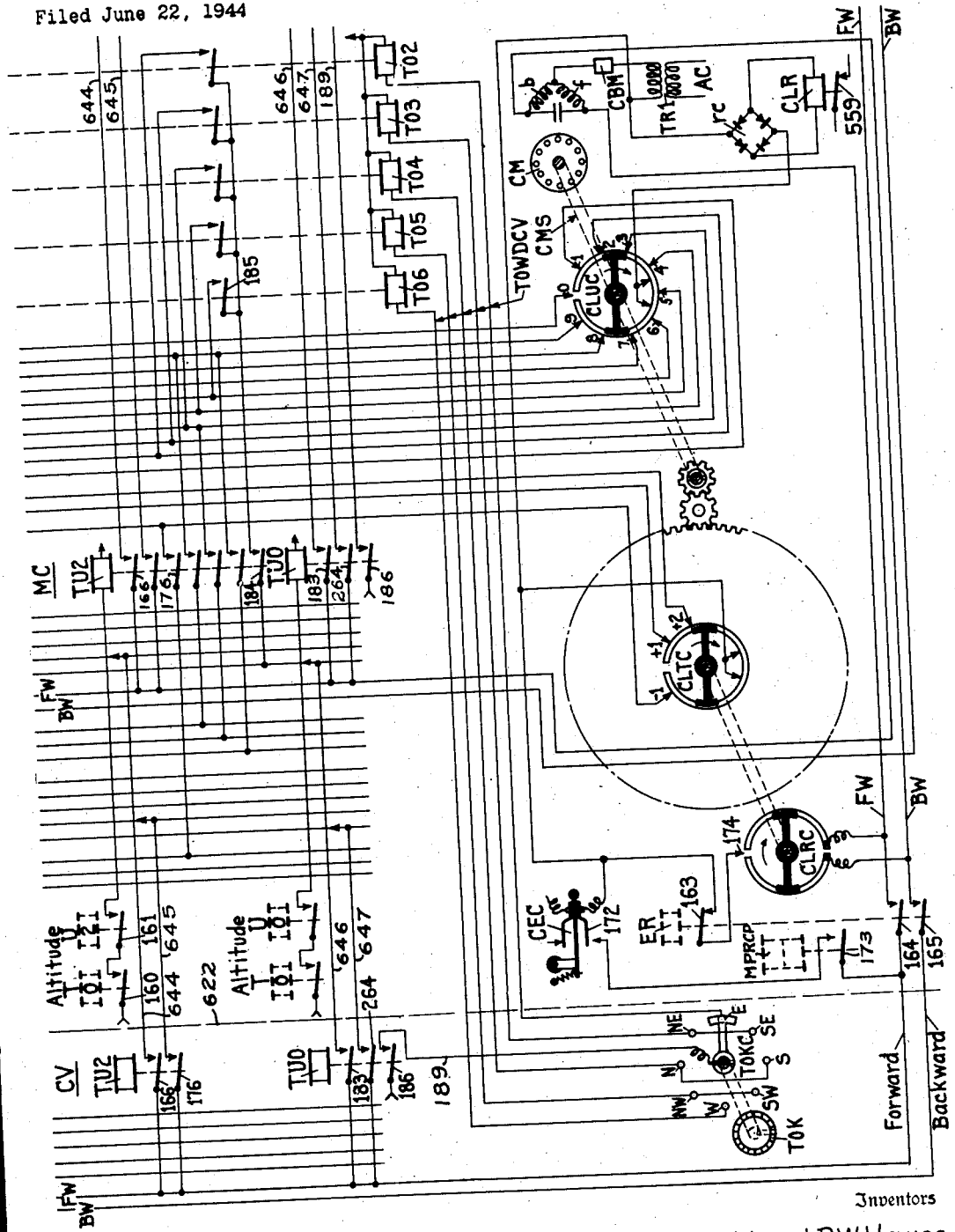
Figure 4B:
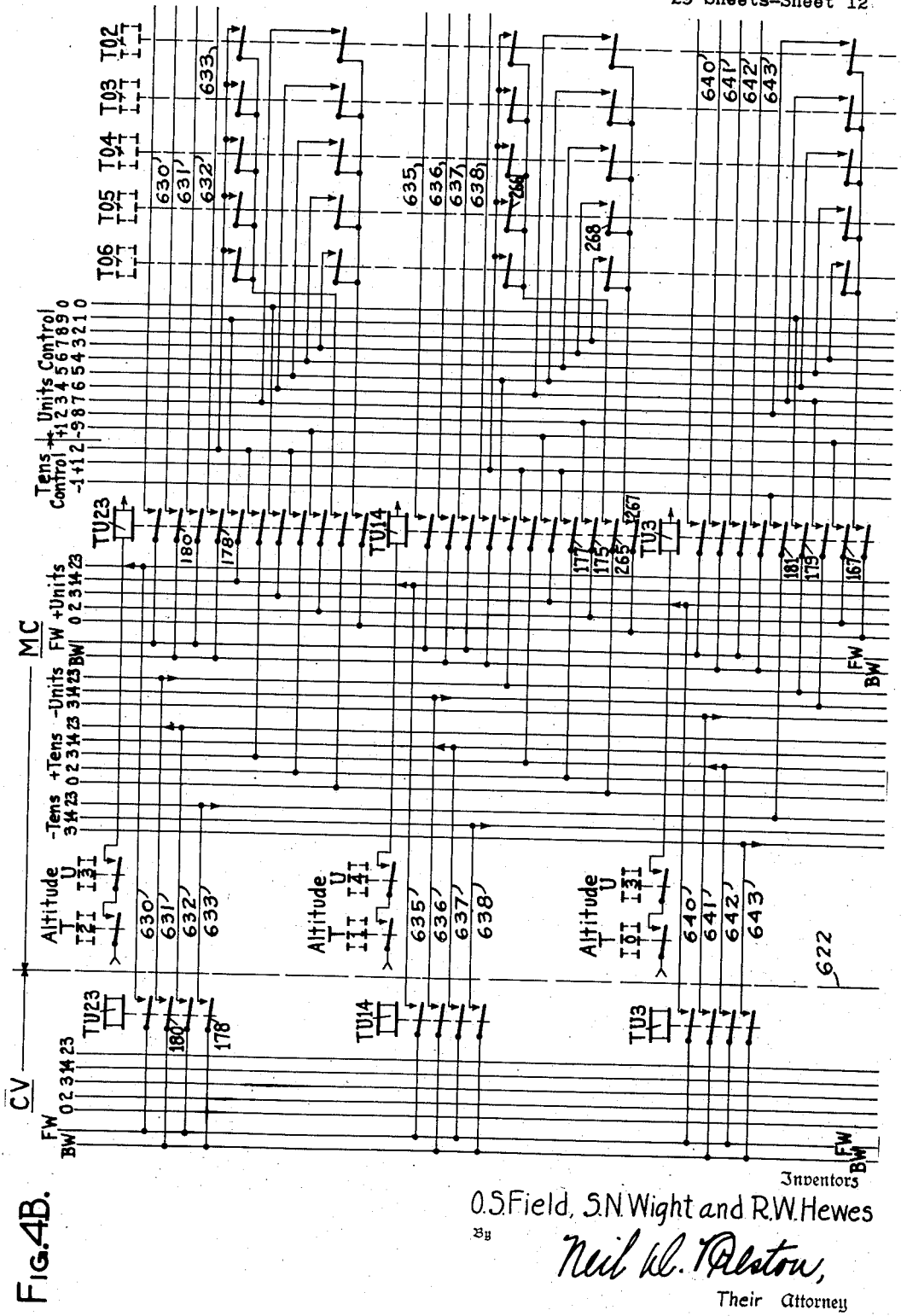

Referring to Figs. 4A and 4B it will be observed that altitude relays TU0 TU2, TU3, TU14 and TU23 have been illustrated for each of fixes CV and MC. The apparatus shown in Fig. 4A is provided to control the calculator so as to compensate for ascent or descent maneuver by an eastwardly traveling airplane between fixes CV and MC and also to compensate for unfavorable take-off at fix CV. That is, if an eastbound airplane takes off at fix CV and the wind is from the east the airplane would naturally take off into the wind and in an eastwardly direction and therefore would not lose any time for take-off other than a constant time that is allowed for in the apparatus. If, on the other hand, the wind were from the west then the airplane would have to take off in a westwardly direction and this would increase the path of travel to an appreciable extent in that the airplane would fly a few miles westwardly and then turn around into an eastwardly direction.

In accordance with the present invention, it is assumed that an airplane taking off in an eastwardly direction and making an ascent to a 2000 foot altitude would require an additional two minutes as is implied by the reference character TO2 for the relay involved (Fig. 4A). If, however, the direction of wind is from the west as indicated by the letter W on the control knob TOK of the take-off contact mechanism TOKC (block VDB, Fig. 1 and Fig. 4A) about six minutes of time would be lost as implied of the numeral 6 included in the reference character for relay TO6 (Fig. 4A).

Corresponding intermediate time losses would be encountered if there were a north-west, south-west, north, south, north-east or south-east wind as determined by relays TO3, TO4 and TO5 (Fig. 4A) of which only one is effective at one time. It will be observed that the altitude relays TU0, TU2, TU3, TU14 and TU23 in Figs. 4A and 4B characterize altitudes rather than digit numbers as is the case of the altitude relays shown in Figs. 3F, 3G and 3H. These altitude relays TU0, etc., are repeater relays and are controlled by both unit and tens altitude relays illustrated in Figs. 3G–3H of the drawings. The altitude relay TU2, for instance, is controlled by the zero tens relay and the two units relay in the altitude columns for fix MC in Fig. 3G of the drawings as shown by contacts 160 and 161 of these relays (Fig. 4A).

Since the climb and descent motor CM (see Fig 6C) operates a time shaft as distinguished from a speed shaft in the calculator mechanism it is only necessary to rotate this time shaft a specific amount in one direction for each minute that is lost due to a climb and to operate it in the opposite direction the same amount for each minute which is gained by descent of an airplane. It is assumed that an airplane will lose one minute for each thousand feet of ascent of such airplane and that it will gain one-half minute for each thousand feet of descent of such airplane during flight and the apparatus illustrated is designed accordingly. Other assumptions may however be used. With this understanding of the apparatus let us observe the extent of rotation of the climb and descent motor CMS under specific conditions of ascent, descent and take-off. Figs. 4A and 4B disclose the essential parts of the climb and descent control circuits for fix MC and disclose additionally the altitude relays TU for fix CV. Similarly, the Figs. 4C and 4D disclose the essential parts of the climb and descent control circuits for fix BR, and additionally discloses the take-off contactor TOKC for fix MC. Thus it will be seen that the climb and descent apparatus for the fixes MC and BR is disclosed by placing the Fig. 4B above Fig. 4A, and by placing Figs. 4C and 4D respectively to the right of Figs. 4A and 4B. This causes the various corresponding wires of the several figures to properly match together. From the consideration of these drawings it will be noted that the climb and descent apparatus for any additional fixes would be the same as for those fixes shown.

*Climb and descent motor operation.*—Let us first assume that an eastbound airplane is to enter fix CV at a 2000 foot altitude (causing the altitude relay TU2, fix CV, Fig. 4A, to assume its energized position) and that it is to climb to the 3000 foot altitude at fix MC (altitude relay TU3 at fix MC, Fig. 4B, energized) under which conditions of course the east relay ER (Figs. 4A and 5B) will assume its energized position. Relay TU2 (Figs. 4A and 4B) of fix CV is controlled by altitude relays T0 and U2 of fix CV in exactly the same way as like numbered relay TU2 of fix MC (Figs. 4A and 4B) is controlled by relays T0 and U2 of fix MC. The manner in which these relays T0 and U2 are controlled is shown in Figs. 3F and 3G of the drawings. The east relay ER shown in dotted block form in Fig. 4A is shown in full line in each of Figs. 5A, 5B and 5C. Each of these relays ER is connected to the east wire 75 contained in cables CVXC and MCXC in each of Figs. 3F, 3G and 3H all as more fully described hereinafter. With the east relay ER energized the motor returning circuit is opened at back contact 163 of this relay ER and the forward and backward operating circuits will both be closed at front contacts 164 and 165 of the relay ER. Under this condition a circuit may be traced from the right-hand terminal of the secondary winding of the transformer TR1, through clutch magnet CBM, the forward winding *f* of the climb motor CM, front contact 164 of the east relay ER, front contact 166 of the altitude relay TU2, fix CV, front contact 167 of the altitude relay TU3, fix MC to units wire 1, to contact 1 of the contact mechanism CLUC, through the rectifier *rc* associated with relay CLR to the other terminal of the secondary winding of the transformer TR1. The completion of this circuit will cause the motor CM to operate in a forward direction causing clockwise rotation of the rings of contact mechanisms CLUC and CLTC, the contact mechanism CLTC operating at a much reduced speed, and preferably being operated by jump gearing such as illustrated in Fig. 7. This will cause operation of the climb motor CM in a forward direction to cause the time indicating mechanism for the fix MC and illustrated in Fig. 6C to be operated to a higher time to the extent of one minute. Since the worm gear ratio is 9 to 1 the worm ring PM2 is operated 1/90 of a revolution or 4°. Also, this additional one minute of time operation produced in the time mechanism at fix MC (Fig. 6C) is through shafts 106C and 106E reproduced in the time mechanism at each fix to the east thereof.

Since the time contact mechanisms (Fig. 7) are controlled by a plurality of motors, and the calculated time at either of fixes MC and BR may run into a fraction of a minute, it is desirable to provide means to adjust the contact mechanism TUMC so as to assume an even minute position at least for unit minute indications 0 and 1, because it is between these points that jump operation of jump gear JG1 (Fig. 7) takes place. For this reason the shaft 143 (Fig. 7) has been provided with centering contact mechanism CEC including a toothed wheel 170, a normally closed contact 171 and a normally open contact 172. The contact 171 is included in the posting circuit for the time posting units TPTH, TPUH, TPTM and TPUM (Fig. 5B) so that time posting cannot take place unless the contact mechanism TTMC for that fix assumes an even ten minute position. At other points (2-9) of operation of contact mechanism TTUC a fractional time manifestation can be tolerated in that, in the event of a fractional minute manifestation, the posting unit will be operated until it reaches the first of two dead wires which will be the correct indication within less than one minute, which is accurate enough. The contact 172 is, on the other hand, included in a circuit for the climb and descent motor CM (Fig. 4A) so that this motor will, as soon as posting takes place and the posting repeated relay MPRCP (Figs. 4A and 5B) is energized, close a circuit including contact 164 of relay ER, 172 of the centering mechanism, and contact 173 of the relay MPRCP, to cause operation of the motor CM until contact 172 is opened and contact 171 is closed. When motor CM finally is deenergized the series relay CLR is dropped and the back contact 559 (Fig. 5B) in the circuit of relay MPRC is closed.

As soon as the calculator has performed its calculating function and the posting operation has been completed all of the calculating apparatus is returned to its normal condition the east relay ER as well as the altitude relays TU2 of fix CV and TU3 of fix MC will be returned to their deenergized positions. The closing of back contact 163 of the east relay ER will close a restoring circuit for the climb motor CM which includes the stationary contact 174 of the returning contact mechanism CLRC. It will be remembered that the climb motor CM was operated forward when the east relay ER became energized and it should be observed that it will now be operated in the opposite direction through a circuit starting at the right-hand terminal of the secondary winding of the transformer TR1, through clutch magnet CBM, the backward winding $b$ of the motor CM, the left-hand segment of the return contact mechanism CLRC through fixed contact brush 174, back contact 163 of the east relay ER, to the other terminal of the secondary winding of the transformer TR1. The climb motor will therefore after posting operation has been completed be returned to its zero position at which point the circuit just traced is opened at the brush 174 of the return contact mechanism CLRC.

Let us now assume that the eastbound airplane under consideration is to make a climb from the 2000 foot altitude to the 14,000 foot altitude in flying from fix CV to fix MC. Under this condition the altitude relay TU2 at fix CV and the altitude relay TU14 at fix MC will assume their energized positions as will also the east relay ER. Under this condition a forward operating circuit for the climb motor CM is completed which may be traced from the right-hand terminal of the secondary winding of the transformer TR1 through clutch CB, the forward winding $f$ of the motor CM, front contact 164 of relay ER, front contact 166 of the altitude relay TU2, fix CV, and front contact 175 of the altitude relay TU14, fix MC, to the (+) wire 2, of the units cable leading to contact mechanism CLUC, and another circuit may be traced through the front contact 176 of the altitude relay TU2, fix CV, and front contact 177 of the altitude relay TU14, fix MC, to the wire +1, of the tens cable connected to brush +1 of the tens contact mechanism CLTC. From this construction it is apparent that the motor CM will be operated in a forwardly direction to an extent of 12 minutes (48° rotation of worm ring PM2) before both of these circuits are opened, as it should in that there is to be a 12,000 foot climb by the airplane in flying from fix CV to fix MC. The circuits just traced will apply energy to the contact brush 2 of the contact mechanism CLUC and will also apply energy to the contact +1 of the tens contact mechanism CLTC. This will cause operation of the motor in a forward direction. Not only until the contact 2 of contact mechanism CLUC is in the gap of the contact ring, for this will happen after a two minute extent of operation of the motor CM, but will continue until the +1 contact of the tens contact mechanism CLTC is also in the gap of the ring which occurs at the end of one revolution of the ring of contact mechanism CLUC and since the circuit is then still closed at contact 2 of this latter mechanism the motor will continue to operate to an extent reflecting two additional minutes of time. The total extent of forward running of the climb motor therefore reflects 12 minutes thereby causing the time reflected by the time mechanism illustrated in Fig. 6C of the drawings to manifest a higher time to the extent of 12 minutes. After the calculating operation has been completed the climb motor apparatus will return to its normal position for reasons above given.

Let us now assume that an eastward flying airplane is to make a descent from the 23,000 foot altitude at fix CV to the 3,000 foot altitude at fix MC. Under this condition the altitude relay TU23, fix CV, and the altitude TU3, fix MC, will assume their energized position as will also the east relay ER. Under this condition since there is to be a 20,000 foot descent in flying from fix CV to fix MC it would be understood that the climb motor and associated apparatus should be operated in a backward direction to an extent to reflect ten minutes of gain in time, that is, the arrival time should be ten minutes lower than it otherwise would have been. Such backward operation of the climb motor CM is accomplished through a circuit which may be traced from the right-hand terminal of the secondary winding of the transformer TR1, through clutch magnet CB, the backward winding b of the motor CM, front contact 165 of the east relay ER, front contact 178 of the altitude relay TU23, fix CV, through down minus bus wire 23, front contact 179 of the altitude relay TU3, fix MC, to the zero wire of the units cable, to the zero brush associated with the units contact mechanism CLUC, and another circuit extends through front contact 180 of the altitude relay TU23, fix CV, through downward bus 23 of the (—) tens cable, through front contact 181 of the altitude relay TU3, fix MC, to the —1 wire of the tens cable to the brush —1 of the tens contact mechanism CLTC. The climb motor CM will now operate in a backward direction to an extent until both the zero wire of the contact mechanism CLUC and the —1 wire of the contact mechanism CLTC are out of contacting relationship with their respective contact rings, and this will occur when the contact mechanism CLUC has made one complete revolution in a counterclockwise direction from its normal position. This operation of the climb motor CM in a backward direction would cause the time manifested by the apparatus shown in Fig. 6C to manifest ten minutes less than would have otherwise been manifested.

Let us now consider the take-off portion of the apparatus, illustrated in Figs. 4A and 4B of the drawings, which is not only controlled by altitude relays but is also controlled by wind direction button TOK (Figs. 1 and 4A) of fix CV. Let us assume that an eastbound airplane is to take-off at fix CV, that is, start at zero altitude as is reflected by the altitude relay TU0, fix CV, being energized and let us further assume that there is a west wind requiring the airplane to take off in the most unfavorable direction. Let us further assume that this airplane is to fly at its minimum altitude of 2000 feet over the fix MC. Under this condition the east relay ER, the altitude relay TU0, fix CV, and the altitude relay TU2, fix MC, as well as the climb relay CL6 will assume their energized positions. Under this condition the climb motor CM will be operated in a forward direction through a circuit which may be traced from the right-hand terminal of the secondary winding of transformer TR1, through clutch CB, the forward winding f of the motor CM, front contact 164 of relay ER, front contact 183 of the altitude relay TU0, fix CV, the upward wire +0 of the units bus, front contact 184 of the altitude relay TU2, fix MC, front contact 185 of the take-off relay TO6, to the +6 wire of the units bus to the brush 6, and the ring of the contact mechanism CLUC through the rectifier rc associated with the relay CLR, back to the right-hand terminal of the secondary winding of the transformer TR1. The relay TO6 is of course energized because contact 186 of relay TU0 is closed and direction button TOK is in its "W" position. The completion of this circuit will cause the climb motor CM to operate in a forward direction to an extent to reflect six additional minutes of time, this being the time required for the airplane to make its climb from zero altitude to 2000 foot altitude and to compensate for the additional time required for the airplane to make an unfavorable take-off in a westwardly direction when the airplane is to fly in an eastwardly direction.

It may be pointed out that the contact mechanism CLRC and CLTC are preferably operated in the same direction as is the contact mechanism CLUC and they are preferably operated by jump gearing such as disclosed in Fig. 9 of the drawings. Many other take-off, climb and descent circuits may be traced in Figs. 4A and 4B of the drawings but since these other circuits are similar to those already traced such tracing of the remaining circuits is believed unnecessary. In practice additional climb circuits such as illustrated in Figs. 4A and 4B for section CV—MC will be provided for other sections adjoining two adjacent fixes. In order to illustrate this, Figs. 4C and 4D represent reproductions of Figs. 4A and 4B respectively except that apparatus and circuits to the left of the dotted line 622 have been removed with respect to that apparatus which is merely a duplicate of what is already shown for fix MC in Figs. 4A and 4B. Line 622 of these Figs. 4C and 4D serves to indicate the line of separation of the apparatus between the fixes BR and MC. The interconnecting wires 189, 630—633, 635—638, 640—646, and 647 obviously match each other and make proper connections between the respective figures. In this manner additional control circuits for successive fixes can be readily produced. At those fixes where no take-offs can be made, the take-off time loss features including the relays TO2, TO3, TO4, TO5 and TO6 may be omitted.

Speed units

Referring again to Fig. 9 of the drawings illustrating the manner in which the time units and the speed units are interchangeably assembled, that is, are assembled so that any unit may be removed and a corresponding time unit or speed unit may be substituted therefor, it will be observed that the speed units are shown in the upper portion of Fig. 9. These speed units are also shown more specifically but conventionally in Figs. 6B and 6D of the drawings. It will be observed that each of these speed units (Figs. 6B and 6D) is provided with an epicyclic gearing similar to those described in connection with the time units illustrated in Figs. 6A, 6C and 6E and for this reason the sun gear S4, planetary gears PL4, planetary mounting gear PM4, and the annular gear A4 have been assigned like reference characters except for the distinctive suffix 4. In this connection it should be observed that the planet mounting gear PM4 also serves as a tape spool on which the tape 245 hereinafter to be described will wrap or unwrap, as the case may be, dependent upon the direction and velocity of the wind, in the particular stretch in which this speed unit is located. Before the apparatus controlled by the wind velocity motor and the wind direction motor illustrated in Figs. 6B and 6D and including the triangle calculator is considered, it is deemed advisable to discuss the circuits involved in the control of the wind direction motor, wind velocity motor, the cruising speed motor and the starting time motor.

*Wind direction and velocity knobs.*—Referring to Fig. 1 of the drawings, it will be observed that in the "wind velocity and direction" block VDB there have been illustrated four wind velocity and direction knobs VD, one each for altitudes 0 to 10,000 feet and 11,000 to 20,000 feet for each of sections CV—MC and MC—BR. Only the upper wind velocity and direction knob VD for section CV—MC has been specifically disclosed in Figs. 12A, 12B, 12C and 12D of the drawings, the other three being identical, and this control knob and the contacts controlled thereby will now be described in detail. Although the other three velocity and direction knobs VD are identical they do not necessarily assume the same positions in that a weather station is preferably provided for each section of the route which ascertains wind velocity and direction at various altitudes. Referring to Figs. 12A and 12C it will be observed that the direction knob DK is rotatably mounted directly on the velocity and direction panel VD and has its edge calibrated in degrees by long ten degree marks and short five degree marks, this direction knob DK being read by reading the degree marks which are lined up with the arrow painted or otherwise engraved on the velocity direction panel VD.

It will also be observed that the wind velocity knob VK is supported co-axially on top of the wind direction knob DK and is of sufficiently small diameter so that the calibration on the direction knob of DK is not obscured. It will also be observed that this velocity knob is calibrated in miles per hour of wind, for wind velocities from 0 to 100 miles per hour. This wind velocity knob VK is read by reading the miles per hour on its calibrated scale, that is, take the reading on its scale at the arrow painted or otherwise engraved on the wind direction knob DK. In other words, the wind velocity knob VK is read with respect to the wind direction knob DK and the wind direction knob is read with respect to the stationary panel VD. A hand knob HK (Fig. 12C) is operatively connected to the velocity knob VK but so as to permit axial movement of the hand knob HK with respect to the velocity knob VK, this operative connection including a pin 109 which is provided with a V-shaped tooth 190ª (see Fig. 12D) which may engage any one of a plurality of V-shaped notches arranged in a circle on the wind direction knob DK. This hand knob HK is normally held in a retracted position by a compression spring 191 so that if this knob HK is turned without depressing the same, only the velocity knob VK will be turned with it. If, however, the hand knob HK is depressed so that the pin 190 engages a V-shaped notch in the direction of knob DK, both of the knobs DK and VK are turned with the hand knob HK. This construction is necessary because the velocity knob VK must not only be operated when the velocity of the wind changes but it must also be operated when the velocity of the wind remains the same, but the direction of the wind changes. The reason for this requirement will be more readily understood when the triangle calculating apparatus constituting part of the speed unit of the calculator and shown in Figs. 6B and 6D is described hereinafter. It may, however, be stated that pinion 192 must be turned with the variable radius rack 193 (Fig. 6B) in order for the radius to remain the same. From this it will be seen that pinion 192 must rotate one revolution for one revolution of radius arm 193 and the length of the radius rack 193ª must be the same as the pitch circumference of pinion 192.

Referring to Fig. 12A, it will be observed that the wind velocity knob VK is connected to the shaft 194; whereas, the wind direction knob DK is connected to the sleeve 195 pivoted about this shaft 194; so that the velocity knob VK is directly operatively connected to the gear 196, whereas, the direction knob DK is directly operatively connected to the gear 197. The gear 196 through the medium of pinion 198 and shaft 199 directly operates the units velocity contact VMUC and it also, through the medium of the drive gear DG5 and the stop gear SG5 and jump gear JG5, gear 200 and shaft 201 drives the rotary contact arm of the tens velocity contact mechanism VMTC. The shaft 199 is provided with a notched centering wheel 202 which is held into any one of ten positions, one position for each notch, by a detent including a detent arm 203 provided with a roller 204 and urged into a centering position by a tension spring 205. The contact mechanism VMHC through the medium of gear 206 and shaft 207 is driven by jump gearing actuated by shaft 201 making two jumps per revolution of shaft 201 as shown for which reason this jump gearing has been designated by like reference characters having distinctive suffixes 6. It will be observed that the rotatable arm of the hundreds contact mechanism VMHC is prevented by stop pin 208 in plate VD and 209 in dial DK from rotating more than three jumps. This provision is made to prevent the operator turning the wind velocity knob VK in the wrong direction to the desired position. In this connection it should be observed that the maximum necessary turning of wind velocity dial VK is a little less than two revolutions, one revolution due to turning of dial VK on dial DK and another revolution due to the turning of dial DK when dial VK is locked thereto.

The units direction contact mechanism DMUC, the tens direction mechanism DM8C and the hundredth direction mechanism DMHC are operated by apparatus similar to that just described for operating the wind velocity contact mechanisms VMUC, VMTC and VMHC and for this reason all parts have been assigned like reference characters except for distinctive suffixes and exponents. It may, however, be pointed out that the gear ratios between the two apparatuses illustrated in Fig. 12A are slightly different by reason of the fact that each of contact mechanisms VMUC, VMTC and VMHC is provided with ten stationary contacts; whereas, the contact mechanism DM8C is provided with only eight stationary contacts and the contact mechanism DMUC is provided with only nine stationary contacts. The intermittent gearing for wind direction is so constructed that the tens contact mechanism DM8C will be operated only one jump (one ninth revolution) for each revolution of operation of the units contact mechanism DMUC. The reason for this construction is that the units contact mechanism DMUC represents 9 steps of 5 degrees each whereas the tens contact mechanism DM8C represents 8 steps of 45 degrees each. It should be noted that the second jump gearing in each case is provided with two sets of jump teeth and two notches in the stop gear. This is done to provide additional control circuits 50ª, 150ª and 180ª for reasons pointed out in the description of the operation hereinafter.

*Wind direction motor circuits.*—Referring to the right-hand portion of Fig. 12B of the drawings, it will be observed that the wind direction motor WDM, also shown in Figs. 6B, 6D and 9, is illustrated and that it, through the medium of reduction gearing, illustrated conventionally by a dotted line drives the direction motor shaft DMS, which is provided with contact mechanism WDUC. It may be pointed out that this contact mechanism WDUC, through the medium of intermittent or jump gearing (not shown) drives the contact mechanism WD8C in such a manner that this latter contact mechanism takes one jump for each complete rotation of the unit contact mechanism WDUC and so that contact mechanism WDHC takes one jump for every half revolution of contact mechanism WD8C. That is, the contact mechanism WD8C operates one jump (one-eighth turn) to the right when the contact mechanism WDUC is moved from the 40 to the 0 position, but jumps one jump toward the left each time the contact mechanism WDUC is moved counter-clockwise from the 0 to the 40 position. Similarly, contact mechanism WDHC is rotated one-eighth revolution clockwise each time contact mechanism WD8C moves from 135 to 180 positions and is rotated counter-clockwise one-eighth revolution each time contact mechanism WD8C moves from the 180 to the 135 position.

As illustrated, the stationary contacts surrounding the contact ring of the contact mechanism WDUC and surrounding the contact segments of contact mechanisms WD8C and WDHC are connected to the contact mechanisms DMUC, DM8C and DMHC, respectively (Fig. 12A), controlled by the proper wind direction knob depending upon the altitude under consideration in that the wind direction and velocity in one layer of atmosphere may be considerably different than the wind direction and velocity in another layer of atmosphere and since the wind direction and velocity knobs illustrated in Fig. 1 are operated to reflect the direction and velocity of wind in different layers, namely, 0 to 9,000 feet and 10,000 to 19,000 feet, depending upon the particular tens altitude relay that is energized. In other words, the wind direction contacts WDUC, WD8C and WDHC are connected to the wind direction knob for the lower atmospheric layer when the 0 relay of the tens altitude column of fix MC (Figs. 12B and 3G) is energized and will be connected to the wind direction knob for the upper atmospheric layer when the No. 1 relay of the tens altitude columns for fix MC is energized. It will be observed that the contact mechanisms WDUC, WD8C and WDHC (Fig. 12B) have their contact rings connected to control circuits for relays WDB (wind direction backward), WDF (wind direction forward) and WDFF (wind direction forward finish). The manner in which the wind direction motor WDM (Fig. 12B) is controlled by the wind direction motor shaft contact mechanisms WDUC, WD8C and WDHC and by dial controlled contact mechanisms DMUC, DM8C and DMHC will now be described.

*Wind direction motor operation.*—Let us first assume that the wind direction knob DK in Fig. 12A is turned clockwise a distance so that units contact 5, tens contact 00, and hundreds contact 000 are energized from the terminal (—) as illustrated, of a suitable source of current. This will cause the ring of contact mechanism WDUC to be connected to the (—) terminal of the source since both of the ring portions of each of contact mechanism WD8C and WDHC are not connected to the (—) terminal of the source. Therefore neither of the relays WDB nor WDF will be energized but only the relay WDFF will be energized through a circuit beginning at the terminal (+) of said source, winding of the relay WDFF, back contacts 220 and 221 of relays WDF and WDB, respectively, the ring of contact mechanism WDUC, stationary contact 5, wire 5 of cable DCM, front contact 222 of altitude relay 1 column T (see also Fig. 3G), wire 5 of cable WDC, stationary contact 5 and the rotary contact of contact mechanism DMUC associated with the direction knob DK (Fig. 12A) to the terminal (—) of said source. With the relay WDFF now energized, the closure of its front contact 223 will directly energize the forward winding f of motor WDM to cause operation of this wind direction motor in a forward direction. The alternating current for so operating this motor is derived from the transformer TR2 illustrated. Operation of the wind direction motor WDM will cause rotation of the ring of contact mechanism WDUC in a clockwise direction until the stationary brush 5 is positioned in the gap of this contact ring. In other words, this wind direction motor WDM will be operated to the 5 degree position.

Let us now assume that the direction knob illustrated in Fig. 12A is turned to the 50 degree position. In this case, the contact arm of the contact mechanism DM8C assumes a position to engage stationary contact 45 which reflects 45 degrees of operation, or one revolution of operation of the contact arm of contact mechanism DMUC. To manifest a 50 degree wind it will be necessary to rotate contact mechanism DMUC an additional 5 degrees making a total of 50 degrees. That is, under the condition assumed the rotatable arm of contact mechanism DMUC engages stationary contact 5 as before.

Referring now to Fig. 12B it will be understood that the stationary brush 5 of the contact mechanism WDUC and the brush 45 of the contact mechanism WD8C will both be connected to the (—) terminal of the source of current above mentioned. Under this condition of the apparatus current may flow from the terminal (+) of this source through the winding of the relay WDF through back contact 224 of the relay WDB to the right-hand contact segment 110 of contact mechanism WD8C through stationary contact 45 of this mechanism through cable DCM through wire 45, front contact 225 of relay P1, through wire 45 of cable WDC to stationary contact 45 of the contact mechanism DM8C to the other terminal (—) of said source. The completion of this circuit will cause the forward relay WDF to be picked up and this will cause forward operation of the wind direction motor WDM through the medium of its front contact 226. This operation of the motor WDM will at least continue until the large gap between the two ring segments 110 and 111 of contact mechanism WD8C is directly under the associated stationary brush 45. This will not cause deenergization of relay WDF because this relay is still held energized through a stick circuit including back contact 224 of relay WDB and front stick contact 227 of relay WDF and through the ring and brush 5 of contact mechanism WDUC, from whence the circuit continues to the (—) terminal as above traced. The wind direction motor WDM will, therefore, keep on running in the forward direction until the gap of the ring of contact mechanism WDUC reaches the stationary brush 5 associated therewith. The motor WDM will now have operated to indicate a wind direction of 50 degrees.

Thus far, the operations of the wind direction motor considered were such as to cause operation of this motor in a forward direction and to a less extent than 180 degrees of rotation of contact mechanism WD8C. Let us now assume that the wind direction knob DK (Fig. 12A) is turned to the 190 degree position. Under this condition of the wind direction knob DK the tens contact mechanism DM8C associated with this knob is operated to a position where the contact arm engages the stationary contact 180 (reflecting 180°) where the rotary contact arm of the contact mechanism DMUC engages the fixed contact 10 (reflecting 10°) and where the rotatable arm of contact mechanism DMHC engages stationary contact 180ª, so that the net wind direction manifestation is 180 degrees plus 10 degrees making a total of 190 degrees. The function of the contact 180ᵃ and its connecting wire 180ᵃ will be explained hereinafter.

Referring now to the right-hand portion of Fig. 12B of the drawings, let us remember that the fixed brush 180 of contact mechanism WD8C and brush 180ᵃ of contact mechanism WDHC are connected to the (—) terminal of said source of current and that the fixed brush 10 of the contact mechanism WDUC is also connected to this (—) terminal. With both the fixed brush 180 of contact mechanism WD8C and 180ᵃ of contact mechanism WDHC connected to the (—) terminal of the source heretofore mentioned, current may flow through the windings of both the backward driving wind direction relay WDB and the forward driving wind direction relay WDF. One circuit extends through back contact 229 of relay WDF and the other circuit extends through back contact 224 of relay WDB. Since relays WDB and WDF are interlocked and since relay WDB is a slow pick-up relay and relay WDF is a quick pick-up relay, as conventionally shown, the latter relay will pick up and open the circuit for relay WDB at back contact 229. With the forward running relay WDF now energized through a circuit including brush 180ᵃ, segment 112, and back contact 224 of relay WDB, the wind direction motor WDM will be operated in a forward direction through contact 226 until the contact mechanism WD8C has made a half revolution at which time the jump gearing jumps the contact mechanism WDHC in a clockwise direction one jump to bring the brush 180ᵃ in the large gap between segments 112 and 113 and to simultaneously therewith bring the brush 180 into the large gap between segments 110 and 111. The brush 10 of contact mechanism WDUC, however, still applies negative energy to a stick circuit for relay WDF including stick contact 227 of relay WDF and back contact 224 of relay WDB. The motor WDM will therefore continue to run until brush 10 gets into the gap in the ring of contact mechanism WDUC.

We have thus seen that forward (counterclockwise) turning of the wind direction knob DK whether a small extent or whether more than 180 degrees will cause forward operation of the wind direction motor WDM.

Let us now observe how backward (clockwise) turning of dial DK will cause backward operation of the wind direction motor. Let us imagine that the wind direction dial DK as well as the contact mechanisms WDHC, WD8C and WDUC still assume the 190 degree position to which they were just operated. Let us further assume that the dial DK is then operated backwards (clockwise) to the 5 degree position. With the direction dial DK in the 5 degree position the stationary brushes 000, 00 and 5 of the contact mechanisms WDHC, WD8C and WDUC respectively are all connected to the negative terminal of said source. The brush 000 of contact mechanism WDHC will apply the negative terminal of the source through segment 113 directly to relay WDB, and the brush 00 of contact mechanism WD8C will apply negative potential from said source to the winding of relay WDB through segment 111 and back contact 229 of relay WDF and the brush 5 of contact mechanism WDUC will apply this same negative potential to the winding of relay WDB through its stick contact 231 as soon as this relay WDB picks up. Also the contact brush 5 of contact mechanism WDUC will apply the negative terminal of said source to the winding of forward relay WDFF through back contacts 220 and 221 of relays WDF and WDB respectively. Since the relay WDB is slow to pick up the relay WDFF will pick up first and unnecessarily run the motor WDM forward, say until contact mechanism WDUC has been operated forward ⅝ of one revolution, namely, clockwise from the 10 position to the 5 position where the circuit for relay WDFF is broken. This forward rotation causes the contact mechanism WD8C to be jump operated from 180 position to the 225 position. The backward relay will by this time pick up and at its open back contact 221 will deenergize relay WDFF. Picking up of relay WDB will then by closure of its front contact 230 cause backward operation of motor WDM by directly energizing the backward winding b the winding a being energized by leading current through the medium of the associated condenser. Backward rotation of motor WDM will during the first operation of contact mechanism WDUC from the 0 position to the 40 position cause jump action of the contact mechanism WD8C from the 225 to the 180 position and upon the second operation of contact mechanism WDUC from the 0 position to the 40 position will cause jump operation of the contact mechanism WD8C from the 180 position to the 135 position and simultaneously therewith cause jump operation of the contact mechanism WDHC from the 180ᵃ position to the 000 position. The backward relay WDB is now no longer energized through its former direct pick-up circuit including segment 113 of contact mechanism WDHC but is still energized through a pick-up circuit extending from brush 00 and segment 111 of contact mechanism WD8C and back contact 229 of relay WDF.

Operation of motor WDM in a backward direction will continue until the brush 00 of contact mechanism WD8C is over the wide gap between segments 110 and 111 at which time brush 40 of contact mechanism WDUC is in the gap of its ring. Relay WDB is, however, still energized from brush 5 of contact mechanism WDUC, through a stick circuit including stick contact 231 of relay WDB. Backward operation of motor WDM will therefore continue until the gap in the ring of contact mechanism WDUC gets under the brush 5. It is thus seen that backward movement of the direction dial from the 190 degree position to the 5 degree position caused a net backward running equivalent to 185 degrees. This was, however, accomplished in two separate operations. First a forward operation of ⅝ of a revolution of contact mechanism WDUC took place, and then a backward operation of 5 revolutions of contact mechanism WDUC took place making a net backward rotation of 4 and ⅛ revolutions of contact mechanism WDUC, equivalent to 4 and ⅛ times 45 or 185 degrees.

*Wind velocity motor circuits.*—The control apparatus for the wind velocity motor is substantially the same as that for the wind direction motor and for this reason all of the contact mechanisms, relays, relay contacts and circuits involved have been illustrated in like manner. The contact mechanisms have, however, been assigned reference characters WVHC, WVTC and WVUC instead of WDHC, WD8C and WDUC (Fig. 12B). In this connection, it may be pointed out that there are two differences between the control apparatus for the wind direction motor WDM and the wind velocity motor WVM, one is that the wind direction motor may only be controlled to 72 different positions, in that only 9 stationary brushes are used on the contact mechanism WDUC and that only 8 stationary contact brushes are employed in the contact mechanism WD8C; whereas, each of the contact mechanisms WVTC and WVUC for controlling the wind velocity motor WVM have 10 stationary brushes; and the other difference is that the contact mechanism WVHC has contacts 50ª, 100ª and 150ª which allows for an additional 100 positions of operation, and for this reason the wind velocity mechanism may be controlled to a little less than 200 different positions. This additional approximately 100 positions for velocity of wind manifestation is never actually effective in the calculator but is required in the apparatus because the pinion 192 (Fig. 6B) must be capable of making two complete revolutions although the rack it engages has only a length equivalent to one revolution. This extra revolution of pinion 192 is required because it must make one revolution with the crank arm when that makes one revolution if the length of the variable radius is to remain the same. In other words, to do both, swing the radius arm 193 an entire revolution counter-clockwise and at the same time extend the radius from zero length to its maximum length will require two complete revolutions of pinion 192. For this reason the extra brushes 100ª and 150ª and the associated wires 100ª and 150ª have been provided. The extra wire and brushes 50ª for the wind velocity motor WVM and the extra wire and brushes 100ª for the wind direction motor WDM have been provided to cause proper forward and backward operation of the respective motors as required.

*Wind velocity motor operation.*—The operation of the wind velocity motor is exactly the same as that of the wind direction motor except that the contact mechanism WVTC is capable of making two revolutions whereas the contact mechanism WD8C is capable of making only one revolution. This is due to the fact that the extra brushes 100ª and 150ª on the contact mechanisms VMHC and WVHC allow the contact mechanism WVTC to make two complete revolutions whereas the contact mechanism WD8C can only make one complete revolution, and this is primarily due to the fact that stop 209 allows dial DK to turn only one revolution whereas stops 208 and 209 together allow dial VK to make almost two revolutions. For reasons above pointed out the brushes 50ª and 150ª on contact mechanisms VMHC and WVHC are provided to cause proper forward and backward operation of the motor WVM.

*Cruising speed motor control apparatus.*—The cruising speed motor control apparatus for controlling the cruising speed motor CSM (Figs. 6B and 5D) is identical to the wind velocity motor control apparatus except in two particulars: (1) the third digit contact mechanism CSHC (Fig. 5D) for cruising speed motor CSM is provided with five stationary contact brushes (illustrated by arrows) whereas the third digit contact mechanism WVHC for the wind velocity motor WVM is provided with only two stationary contact brushes; and (2) the contact mechanism CSHC (Fig. 5D) is jumped forward or backward, as the case may be, once during each revolution of the contact mechanism CSTC whereas the contact mechanism WVHC (Fig. 12B) is jumped forward or backward, as the case may be, once during each half revolution of the contact mechanism WVTC. These differences also bring in the need of a half-step contact brush 50ª for the contact mechanism WVHC and not required for the contact mechanism CSHC (Fig. 5D). The control circuits for the motor control relays CSB, CSF and CSFF are identical to those for the relays WVB, WVF, and WVFF, respectively, as are also the circuits controlled by these respective groups of relays, and for this reason the relay contacts have been identified by like reference numbers.

*Cruising speed motor operation.*—The operation of the cruising speed motor CSM (Figs. 5D and 6B) is substantially the same as that of wind velocity motor WVM (Fig. 12B). There is, however, a slight difference in the operation of the two in degrees rather than in principle. It will be remembered from the description of operation of the direction motor WDM, the operation of which is the same as that of the wind velocity motor WVM, that a net backward operation of this motor WDM may be preceded by an unnecessary forward operation of contact mechanism WDUC (Fig. 12B) to an extent less than one revolution. Similar net backward operation of motor CSM may require more than one revolution of unnecessary forward operation followed by a greater extent of backward operation. For this reason one example of backward operation of cruising speed motor CSM will be given.

Let us assume that the cruising speed motor CSM (Fig. 5D) and its associated contact mechanisms CSHC, CSTC and CSUC stand in the 72 miles per hour position (large gap of CSTC under contact 7 and the gap of CSUC under contact 2) and that thereafter the cruising speed relays H0, T1 and U1 (Fig. 3C) become energized because an 11 M. P. H. cruising speed has been set up by the teletype apparatus to reflect a new cruising speed of 11 miles per hour (not a practical cruising speed). This will result in negative potential being applied to the brush 000 of contact mechanism CSHC, to the brush 10 of the contact mechanisms CSTC which now engages segment 110 and to brush 1 of contact mechanism CSUC. It will be observed that with negative potential of the control battery CB applied to segments 110 of contact mechanism CSTC the relay CSF will be energized through back contact 224 of relay CSB. The relay CSF will pick up and will at its back contact 229 open one pick-up circuit for relay CSB. Relay CSF when once picked up will be stuck up through a stick circuit including its stick contact 227 and back contact 224 of relay CSB and receiving energy through brush 1 of contact mechanism CSUC. The front contact 226 of relay CSF will now close a forward running circuit through motor CSM to cause forward operation of this motor. This forward operation will continue until contact mechanism CSHC, CSTC and CSUC assume respectively the 100, 00 and 0 position characterizing 100 M. P. H. This position was reached by jump operation of contact mechanisms CSHC from the 000 to the 100 position by the contact mechanisms CSTC and CSUC moving forward from the 72 to the 100 position. The contact mechanism CSUC was therefore operated forward 2 and $\tfrac{8}{10}$ revolutions.

With the contact mechanism CSHC now assuming the 100 position and with negative potential applied to the brush 000 thereof, as above explained, current is directly applied to backward relay CSB which when once picked up by the opening of its back contact 224 breaks the circuit for the forward relay CSF. The motor CSM will now be operated in a backward direction through front contact 230 of relay CSB.

The relay CSB is held energized by three other circuits, one extending from brush 10 to segment 110 of contact mechanism CSTC and through stick contact 224 of relay CSB, a second circuit effective when this brush 10 engages segment 111 of this same contact mechanism and including back contact 229 of relay CSF and a third circuit including brush 1 of contact mechanism CSUC and including stick contact 231 of relay CSB.

It is now readily seen that interchanging of segment 110 and 111 with brush 10 (connected to minus energy) will not drop relay CSB and that this relay CBS will remain energized until the cruising speed of 11 miles is manifested by the contact mechanisms CSHC, CSTC and CSUC, under which condition all energized brushes 10 and 1 of these contact mechanisms will be in the large gaps of their respective rings. It is thus seen that contact mechanism CSUC ran forward unnecessarily two and $\frac{8}{10}$ revolutions in order to get the associated motor control relays to be conditioned to cause backward operation, whereas to start backward operation of the wind direction motor WDM an unnecessary forward operation of only $\frac{1}{10}$ of a revolution was necessary. By examining the number of stationary brushes provided on the contact mechanism CSHC it is readily seen that any cruising speed between zero and 499 M. P. H. may be set up. In practicing the present invention specifically as shown the maximum cruising speed of 499 M. P. H. can however not be used when the direction of wind is favorable because a favorable wind may boost the ground speed to an extent of 100 M. P. H. above the cruising speed (Fig. 6B) and since the cam gear GG1 can accept only ground speeds up to and including 500 M. P. H. (Fig. 13) there may be times when the cruising speed may be required to be as low as 400 M. P. H. Obviously, by changing the specific construction shown, in degree only, higher cruising speeds will be acceptable. Also, to prevent breakage of parts properly constructed motor control limit switches will be employed to stop a motor when it has operated its extreme position. For commercial cruising speeds now employed such limit switches, which stop the motors involved when the mechanical structures have moved to near the end of their stroke, are not required and for this reason have not been illustrated.

*Starting time motor control apparatus.*—The starting time control motor STM (Figs. 5D and 6A) is controlled by relays STB, STF, STFF in identically the same manner as the cruising speed motor CSM (Figs. 5D and 6B) is controlled by relays CSB, CSF and CSFF, and for this reason the contacts of these two sets of relays have been identified by like reference characters. It should be observed that relays STB, STF and STFF are connected to the bus wires STBB in exactly the same way as the relays CSB, CSF and CSFF are connected to bus wires CTB. The wiring between the contact mechanisms CSHC, CSTC and CSUC and bus wires CTB, and between the contact mechanisms TTHC, TUHC, TTMC and TUMC connected to bus wires STBB should now be compared.

It will of course be observed that the contact mechanisms for stopping the starting time motor STM (see Fig. 5A, 5B or 5C) include four such mechanisms whereas only three such mechanisms CSHC, CSTC and CSUC are employed for the cruising speed motor CSM. It will be observed that the two right-hand contact mechanisms TTMC and TUMC for starting time motor control have their rings connected together and that they are connected to the front points of stick contacts 227 and 231 of the relays STF and STB in exactly the same way as the contact ring for the contact mechanism CSUC (Fig. 5D) is connected to the front points of stick contacts 227 and 231 of the relays CSF and CSB respectively.

It should be noted that the contact mechanism TTMC (Fig. 5C) is provided with only six brushes and that only three brushes are provided for the contact mechanism TTHC. This is done because there are only six groups of 10 minutes each in an hour and because there are more than 20 and less than 30 hours in a day. Attention is also directed to the fact that the large gap between segments 242 and 243 of contact mechanism TTHC is much wider than is the large gap between the segments 240 and 241 of contact mechanism TUHC. The reason for this large gap may be ascribed to the fact that, referring to Fig. 7, the contact mechanism TTHC is operated twice for each revolution of the segments of contact mechanism TUHC and for this reason the contact functions performed by contact mechanism TTHC should only change for alternate $\frac{1}{6}$ revolutions of the segments of this contact mechanism TTHC, that is should only change three times in spite of six jumps of operation through one rotation. It is also desired to point out again that a gear shift apparatus is employed as shown in Fig. 7 of the drawings and that although sufficient stationary contacts are provided on the contact mechanisms TTHC, TUHC, TTMC, TUMC (Fig. 5A, 5B or 5C) to manifest any time from zero time to 29:59 o'clock that this gear shift apparatus permits these contact mechanisms to manifest only times from zero to 23:59.

There is no decided difference between the contact mechanisms for controlling the cruising speed motor CSM, wind direction motor WDM, and wind velocity motor WVM, and the contact mechanism for the starting time motor STM, and such difference in structure as has been resorted to has been employed to have the first three of these motors operate in a direction in which their control contacts were operated to their new position whereas the starting time motor is caused to operate in a direction which requires the minimum amount of operation of the motor to reach its new position. This difference in functioning is primarily due to the fact that the left-hand segment 13 of the cruising speed contact mechanism CSHC (Fig. 5D) and segment 13 of the wind direction contact mechanism WDHC and of the wind velocity contact mechanism WVHC (Fig. 12B) have no stationary brushes engaging the same when the apparatus assumes its zero position, in which it has been illustrated, whereas the contact segment 243 of the contact mechanism TTHC (Figs. 5A, 5B and 5C) is engaged by a fix brush 2 when in its normal position. It is this difference that causes the starting time motor to operate in a direction of the shortest path to its new position and which causes the motors WDM and WVM to operate in a direction in which the contacts which control the same have been moved. In order to more fully bring out this preferential back or forward operation of the starting time motor two examples of operation will be considered.

*Starting time motor operation.*—Referring to Figs. 5C and 5D of the drawings let us first assume that the contact mechanisms TTHC, TUHC, TTMC and TUMC signifying tens of hours, units of hours, tens of minutes and units of minutes respectively assume the 00:00 position and that thereafter the starting time relays 10H1, H1, 10M1 and M1 (Fig. 3D) are energized in a manner to manifest 11:11 o'clock. It will be readily seen from Figs. 5C and 5D of the drawings that since contact segments 242 of contact mechanism TTHC and segment 240 of contact mechanism TUHC are under this condition energized from the negative terminal of the control battery CB whereas the segments 241 of contact mechanism TUHC and 243 of contact mechanism TTHC are not so energized that the backward operating relay STB (Fig. 5D) for the starting motor STM will not be energized either through its direct pick-up circuit or through its pick-up circuit including the back contact 229 of the relay STF and that for this reason the starting motor STM will be operated in a forward direction. In view of the operations for the cruising speed motor, wind direction motor and wind velocity motors heretofore given, it is readily seen that the starting time motor STM will now continue to operate until it has been operated to a position to manifest 11:11 o'clock.

Let us now assume that the starting time motor STM and its associated mechanism again assumes the 00:00 o'clock position and that the starting time relays in columns 10H2, H1, 10M1 and M1 are energized to characterize 21:11 o'clock and that for this reason the brush 2 of contact mechanism TTHC (Fig. 5C) and the brushes 1 of contact mechanisms TUHC, TTMC and TUMC are connected to the negative terminal of said control battery CB. Under this condition negative energy may be directly applied to the backward operating control relay STB from the segment 243 of the contact mechanism TTHC through bus STBB and energy may also be applied to the forward operating relay STF from the segment 240 of the contact mechanism TUHC and through the medium of bus STBB and back contact 224 of the relay STB. Since, however, the backward operating relay STB is slow to pick up whereas the forward operating relay STF is quick to pick up, the relay STF will pick up first resulting in temporary forward operation of the starting time motor STM. After a short time, however, the backward control relay STB will pick up and by the opening of its back contact 224 will cause deenergization of the relay STF so that backward operation of this starting time motor STM will take place until it has reached a position to manifest the starting time 21:11. It is thus seen that the starting time motor STM will run either forward or backward depending on which direction of operation requires the least amount of operation. By studying the circuits between contact mechanisms TUHC, TTMC and TUMC and the relays STB, STF and STFF, it is readily seen that similar minimum forward or backward operation will take place when only energy is applied to the segments and rings of these contact mechanisms and energy is not at all applied to either of the segments 242 or 243 of the contact mechanism TTHC. In other words, the starting time motor STM is always operated in such a direction to require the minimum amount of operation. In this connection it should be observed that the mechanical structure of the calculator (Figs. 6A-6E) is such that the starting time manifestation may be operated directly from a 23:00 o'clock position to a 01:00 position directly through its shortest path from one day into the next day without mechanical interference in the calculator.

*Speed units (continued)*

*Triangle calculators.*—Each of the speed units shown in Figs. 6B and 6D includes a triangle calculator for calculating the ground speed when the airplane cruising speed, the direction of the wind, and the velocity of the wind are known.

Referring now to Fig. 14B wherein there is shown a triangle of which one side has been designated "Wind velocity," another side has been designated "Cruising speed," and another side has been designated "Ground speed." The cruising speed side has also been designated "Tape" and the ground speed side has also been designated "Dotted line." The angle between the two sides "Wind velocity" and "Ground speed" is the angle of the direction of the wind with respect to the direction of the section of the route with which the speed unit is associated and has been designated "Wind direction angle." The angle between the sides "Ground speed" and "Cruising speed" is the angle of drift of the airplane with respect to the direction in which it is headed and has been designated "Drift angle."

Referring now to Fig. 6B of the drawings the triangle calculator includes a similar triangle in which the variable radius arm rack 193 corresponds to the side "Wind velocity" side of the triangle in Figs. 14A, 14B and 14C; where the tape portion 245ª corresponds to the side of the triangle marked "Cruising speed" and where the dotted line 246 corresponds to the side of the triangle designated "Ground speed." It is believed unnecessary to discuss in detail why the length of the side of the triangle of Fig. 14B designated "Ground speed" reflects the actual ground speed when the two other sides of this triangle reflect the "Wind velocity" and "Cruising speed" respectively, it being readily understood that the component of the "Wind velocity" side when projected on a line corresponding to the direction of the route will be the increased speed due to the wind and that the projection of the side of the triangle marked "Cruising speed" upon the line designating the direction of the route will constitute the component of the ground speed due to the cruising speed so that the sum of these two components constitute the total "Ground speed."

From the foregoing consideration it is readily understood that if the cruising speed motor CSM had been employed to adjust the length of a pitman rod, and if this rod had been substituted for the portion of tape 245ª for the purpose of pulling or pushing the ground speed rack 247 a much simpler appearing construction than that illustrated would have resulted. The pitman rod construction would be more readily understood and would produce the same calculated result. In order, however, to avoid mounting the cruising speed motor either on the movable ground speed rack 247 or upon the movable variable radius arm rack 193 the construction illustrated in the drawing has been employed, and in this construction the length of the tape between the variable radius arm rack and the rollers 248 supported on the ground speed rack may be adjusted through the medium of the epicyclic gear train S4, PL4 and A4, the spring 249 and the ground speed rack 247. It is readily seen that the ground speed rack 247, the annular gear A4, and the shaft 100 are all operated directly in accordance with the ground speed. This is readily understood because the annular gear A4 is directly connected to this speed shaft 100, which is directly connected to the ground speed cam gear CG1, and the teeth of the annular gear A4 engage the teeth of the rack 247.

*Operation of triangle calculator.*—Let us first assume that the variable radius arm rack 193 assumes its zero radius position so that the end of the tape 245ª is anchored at the axis of the pinion 192. Under this condition the two rollers 248 supported by the ground speed rack 247 have no particular function except to mark the end of the tape portion which reflects the cruising speed of the airplane. Under this zero wind velocity condition, operation of the cruising speed motor will result in operation of the ground speed rack directly in proportion to the extent of rotation of this cruising speed motor, that is, the tape wheel PM4 will remain stationary as will also the pivots of the two planet gears PL4. This is as it should be because with zero wind velocity the ground speed and the cruising speed of the airplane are identically the same and therefore each will vary directly with the other. From a mechanical standpoint the reason for the direct gear ratio and the stationary condition of the pivots of the planet pinions PL4 is due to the fact that the tape 245 does not bear against either of the rollers 248. The same ratio is therefore also existent when there is a wind velocity if such wind is either a direct head-wind or a direct tail-wind.

Let us now assume that the adjustment of the cruising speed reflects 60 miles per hour cruising speed, the minimum cruising speed adjustment possible as shown in Fig. 14A. Let us also assume that the variable radius arm rack 193 is angularly positioned to make a zero "wind direction angle." Let us further assume that the wind, namely, a west wind, assuming that the airplane route is directly to the east, is a 30 miles per hour wind, and that the radius arm rack is lengthened from 0 to an extent to reflect 30 miles per hour. This lengthening of the variable radius arm rack 193 will of course allow the spring 249 to rotate the tape wheel PM4 from its minimum ground speed position of 60 M. P. H. to an extent to take up all the slack which was created by lengthening the length of the radius arm rack. This partial rotation of the tape wheel PM4 through the medium of the epicyclic train S4, PL4, A4 causes the ground speed shaft 100 and cam gear CG1 to be rotated through an angle proportional to the extent of lengthening the radius arm rack 193, namely, from the 60 M. P. H. to the 90 M. P. H. position. By referring to the hyperbolic curve in Fig. 13 it is readily seen that the ground speed shaft is turned 24 degrees from its zero position. This is true because the sun gear S4 is now held stationary by the cruising speed motor CSM. In other words, the cam gear CG1 was therefore operated directly in porportion to the extent of lengthening the variable radius arm 193, as it should be, since the wind was a tail wind and the velocity of the wind must be added to the cruising speed velocity in order to obtain the ground speed velocity.

If now the wind is in some other direction and the variable radius arm rack is operated to a position to reflect the direction of the wind and if this variable radius arm rack is projected to have a radius corresponding to the velocity of the wind, the end of the tape 245ª will be so anchored in space that operation of the cruising speed motor to a position to reflect the cruising speed of the airplane will result in the operation of the ground speed rack 247 to a position to reflect or characterize the resultant ground speed. This operation of the cruising speed motor CSM will not cause rotation of the ground speed shaft 100 directly in proportion to the extent of operation of the cruising speed motor because each increase in the cruising speed will cause two distinct operations of the ground speed shaft 100, one due directly to clockwise rotation of the sun gear S4 and the other due to rotation of the tape wheel PM4 in a counter-clockwise direction which is due to the spring 249 taking up the slack in the tape 245 which was put there by the rollers 248 moving toward the right. It is readily seen that such slack will be created for all winds other than direct head or direct tail winds provided the rollers 248 are moved to the right due to an increase in cruising speed as reflected by clockwise rotation of the sun gear S4.

*Other mechanical features of calculator*

The time units illustrated in each of Figs. 6A, 6C and 6E are identical except as to three particulars. Firstly, the epicyclic gear train S1, PL1, PM1 and A1 of Fig. 6A is entirely anchored by having the annular gear A2 anchored as illustrated by an anchor block 250. Secondly, the centering contact mechanism 171—172 is omitted (or at least not used) from Fig. 6A. This anchoring of the annular gear A2 is resorted to because the time unit illustrated in Fig. 6A is the time unit at the first fix of the route, the calculator illustrated, being employed only for calculating eastbound airplane flight, naturally has nothing to calculate dependent on the section in the rear. Thirdly, the calculating ratio between gear 102 (same diameter in all figures) and planet mounting gear PM1 (same diameter in all figures) in Fig. 6C of the drawings is such as to reflect the distance in miles between fixes CV and MC which is assumed to be 100 miles, the gear ratio which is effected by gears 103A and 105A (Fig. 6C) being a step-up gear ratio of 1 to 1.178, whereas the corresponding gear ratio for corresponding gears 103B and 105B in Fig. 6E of the drawings is such as to reflect a distance of 200 miles between fixes MC and BR and this gear ratio is a step-up gear ratio of 1 to 2.356. In all other respects the time units shown in Figs. 6A, 6C and 6E are identical and for this reason like parts have been assigned like reference characters.

As illustrated in Figs. 6A–6E each of the climb motors CM, wind direction motors WDM and wind velocity motors WVM, and the single cruising speed motor CSM, are provided with motor stop contact mechanisms which are illustrated rather conventionally in Figs. 6A–6E but which have been shown more specifically in Figs. 4A, 12B and left-hand portion of Fig. 5D, respectively. It will be observed that the starting time motor STM illustrated in Fig. 6A of the drawings is not provided with similar stopping contact mechanisms because this motor is sometimes stopped in accordance with the starting time as manifested for fix CV and is at other times stopped in accordance with the starting time as manifested for fix MC or BR when additional fixes are added at the east end. These starting time motor stopping contact mechanisms are illustrated in Figs. 5A, 5B and 5C, in Figs. 6A, 6C and 6E and more specifically in Fig. 7. The control relays for controlling the starting time motor STM by these contact mechanisms have been illustrated in the right-hand portion of Fig. 5D of the drawings. It may be pointed out that the epicyclic gear trains S1, PL1, MP1, A1 and S2, PL2, PM2 and A2 (Figs. 6A–6E) are associated with a sectionalized time accumulator shaft 106A, 106C, 106E which results in adding at each fix the arrival or starting time indicated or manifested at the next fix to the left. This function is necessary because each time unit calculates the time consumed in the next preceding section to the rear only, so that in order to manifest the arrival time at any particular fix the arrival time indicated at the next preceding fix in the route must be added to the time consumed in traversing the distance between said next preceding fix and the fix under consideration. As already pointed out the starting time motor STM drives a time shaft 110 which extends throughout all of the time units of the calculator and on this starting time shaft 110 are mounted on the sun gears S3, one for each of the epicyclic gear trains S3, PL3, PM3 and A3. These epicyclic gear trains are necessary to allow operation of the associated time manifesting contact mechanisms TTHC, TUHC, TTMC and TUMC by both the starting time shaft 110 and the associated annular gear A2 of the accumulator shaft hereinbefore described. As illustrated in the drawings the cruising speed motor CMS drives the various cruising speed worm gears 252 through the medium of bevel gears 253 and 254, worms 255 and a line shaft CSS. In practice these bevel gears are not used, they having been illustrated in the drawings only for the purpose of more clearly illustrating the mechanical interconnecting driving connection between the various cruising speed sun gears S4.

*Calculator normal position.*—Although the motor stop contact mechanisms illustrated in Figs. 4A, 5D, 7 and 12B are all shown in their zero positions, as are also the time contact mechanisms illustrated in Fig. 5A, it should be understood that the calculator as illustrated in Figs. 5A–5C and Figs. 6A–6E is shown in its 60 M. P. H. ground speed position which ground speed results from a cruising speed of 52 M. P. H., a wind velocity of 30 M. P. H. in a 60 degree direction. The triangle (Fig. 14A) formed by these values is a right angle triangle and $\sqrt{30^2+52^2}=$ 60 M. P. H. which is the ground speed position in which the calculator has been shown in Figs. 5A–5C and 6A–6E of the drawings. It is readily understood that for a zero starting time at fix CV (Fig. 5A) the arrival times for a 60 M. P. H. ground speed at fixes MC and BR will be 01:40 and 05:00 o'clock, respectively, as illustrated in Figs. 5B and 5C, respectively, and in Figs. 6C and 6E, respectively.

For the particular calculator as illustrated the useful length of the variable radius rack 193 is 1.9635 inches (equivalent to 100 M. P. H.) and the useful length of the ground speed rack 247 is 8.53 inches (equivalent to 500—60 or 440 M. P. H.) Also the length of the ground speed dotted line 246 (Fig. 6B) for the normal ground speed of 60 M. P. H. is 1.18 inches (equivalent to 60 M. P. H.). The length of the tape portion 245ª is normally such as to reflect 52 M. P. H. which length is 1.02 inches, and normally the effective length of the variable radius 193 is for like reason 0.59 inch.

*First operation of calculator*

*Calculation constants.*—We will now consider the operation of the calculator by assuming the same constants as are present in the perforated tape illustrated in Fig. 2A of the drawings and will, in addition thereto, assume a wind direction of 60 degrees with respect to a west wind or tail wind for the east-bound airplane travel under consideration, and a wind velocity of 100 M. P. H. All of the constants may therefore be enumerated as follows: wind direction 60°, wind velocity 100 M. P. H. in both sections CV—MC and MC—BR, cruising speed 173 M. P. H. (see triangle Fig. 14B), starting time at fix CV of 10:20, take-off at fix CV and climb to 14,000 feet before reaching fix MC and continue at 14,000 feet altitude through fix BR, the take-off wind direction at fix CV being southwest, that is, the wind is blowing in a northeast direction.

*Calculator operation for first set of constants*

It will be observed that the constants just assumed are each $^{10}/_3$ as large as the constants effective in the calculator as shown, that is, are 100, 173 and 200 (Fig. 14B) as compared with 30, 52 and 60 (Fig. 14A) insofar as the constants for the triangle are concerned the angles being the same.

Attention is again directed to the fact that the worm gear ratio from the worm 260 (Fig. 6B), driven by the wind direction motor WDM, to the spider worm wheel 257 is 8 to 1 whereas the worm gear ratio from the worm 261 driven by the wind velocity motor WVM to the pinion 192, driven by worm wheel 262, is 10 to 1. The spider worm wheel 257 should and will turn just as much as the pinion 192 when the direction dial DK (Fig. 12A) is turned since the velocity dial VK is latched thereto when dial DK is turned so that the variable radius effected by rack 193ª is not changed. This like extent of operation results in spite of the different gear ratios mentioned above by reason of the fact that eight revolutions of contact mechanism WDUC (Fig. 12B) are necessary to cause one revolution of contact mechanism WD8C whereas ten revolutions of contact mechanism WVUC are necessary to cause one revolution of contact mechanism WVTC. The pitch circumference of the pinion 192 is the same as the useful length of the rack 193ª namely 1.9635 inches. From these considerations it is readily seen that one revolution of contact mechanism WVTC causes one revolution of pinion 192 and that smaller extents of rotation will be proportional. Also, that one revolution of contact mechanism WD8C will cause one revolution of radius arm 193 and that smaller extents of rotation will be proportional. It is thus seen that when the wind direction dial DK (Fig. 12A) assumes the 60 degree position the radius rack arm 193 will assume a 60 degree position with respect to dotted line 246 and that with the wind velocity dial VK (Fig. 12A) in the 100 M. P. H. position the radius arm 193 will be fully extended to its full useful length of 1.9635 inches. During the extension of the length of the radius arm from its original length of 1.18 inches to its new length of 1.9635 inches a certain amount of slack was produced in the tape 245. This slack was, however, immediately taken up by the spring 249 and the rotation of the tape wheel PM4 caused ⅗ as much rotation of annulus A4. Since annulus A4, however, only has a diameter ⅔ that of tape wheel PM4 the rack 247 moved with the tape so that the length of the tape portion 245ª remained the same and still has its original length of 1.02 inches reflecting a cruising speed of 52 M. P. H. If, as just pointed out, a change in the position of the tape anchor 258 (Fig. 6B) does not change the length of the tape portion 245ª when sun gear S4 is held stationary, then conversely rotation of sun gear S4 when the tape anchor 258 is held stationary causes the length of the tape portion 245a to change directly in proportion to the extent of rotation of the sun gear S4. Consequently the application of the negative energy to brush 1 of contact mechanism CSHC, to brush 7 of contact mechanism CSTC and brush 3 of contact mechanism CSUC (Figs. 5D and 6B and reflecting 173 M. P. H.), instead of to brushes 000 of contact mechanisms CSHC, to brush 60 of contact mechanism CSTC, and to brush 0 of contact mechanism CSUC (reflecting 60 M. P. H.) will lengthen the tape portion 245a from 1.02 inches to 3.4 inches (ratio of 52 to 173). Since the length of the radius arm 193 is 1.9635 inches and it is projected at an angle of 60 degrees, its length projected on the dotted line 246 is 0.98 and the vertical distance from dotted line 246 to anchor 258 is $\sqrt{1.96^2 - 0.98^2}$ or 1.697. Also, since the length of the tape portion 245a is 3.4 inches the length of its projection on dotted line 246 is $\sqrt{3.4^2 - 1.70^2}$ or 2.947 inches. Adding the two portions 0.98 and 2.947 together we get 3.927 inches as the length of the dotted line 246. Subtracting now the original length of 1.18 inches we have now a net increase of 2.746 inches of movement of the ground speed rack 247 toward the right. Since the outside pitch circumference of annulus A4 is 8.836 inches the shaft 100 and cam gear CG1 are rotated $$\frac{2.746}{8.836} \times 360 \text{ or } 112°$$

From the hyperbolic curve shown in Fig. 13 of the drawings it will be seen that 112° of counter-clockwise rotation of the first cam gear CG1 will cause 280° of clockwise rotation of cam gear CG2 (Fig. 6C), causing 280° of clockwise rotation of planet mounting gear PM1, causing 280×3=840° clockwise rotation of sun gears S1 and S2 causing 420° counter-clockwise rotation of shaft 106C and annulus A2 causing 420° clockwise rotation of planet mounting gear PM3, causing 420×³⁄₂ of 630° clockwise rotation of annulus A3 causing 630×4 or 2520° backward rotation of units minutes contact mechanism TUMC. Also 2520° divided by 360 equals 7 revolution backwards rotation of the units of minutes shaft representing 70 minutes. Subtracting this 70 minutes from the original 60 M. P. H. ground speed setting of 1⅔ hour (100 minutes) position results in an actual indication at fix MC of 30 minutes. That is the time consumed is 30 minutes as it should be in that it takes 30 minutes for an airplane travelling at 200 M. P. H. to traverse a distance of 100 miles. This 200 M. P. H. may be verified by the fact that if 1.9635 represents 100 M. P. H. then 3.927 (length of dotted line 246) represents 200 M. P. H.

The foregoing observation of operation has, however, not yet considered the take-off time loss and climb time loss nor has it taken into consideration the starting time of 10:20 o'clock above mentioned.

Referring for a moment to Figs. 4A and 4B and remembering that the take-off wind direction above mentioned is south-west and that the dial TOK (block VDB Fig. 1 and Fig. 4A) for fix CV assumes the south-west position, this will cause energization of relay TO5 (Fig. 4A) and with the altitude repeater relays TU9 and TU14 energized two circuits are closed (1) from right terminal of transformer TR1, forward winding f, front contact 164 of relay ER, front contact 264 of relay TU0, front contact 265 of relay TU14, front contact 266 of relay TO5 to wire +1 of tens control column to brush +1 of the tens contact mechanism CLTC, and (2) through front contact 183 of relay TU0, front contact 267 of relay TU14 through front contact 268 of relay TO5 to wire +7 of units control column leading to brush 7 of units contact mechanism CLUC. These circuits will cause operation of the motor CM and shaft CMS (Figs. 1 and 4A) 1.7 revolutions, which in turn through the worm 113 and worm wheel PM2 will cause planet mounting gear PM2 (Fig. 6C) to be operated in a clockwise direction $$\frac{1.7}{9}$$

revolutions or 68° (the worm gear ratio is 9 to 1) which will cause 68×³⁄₂=153° counter-clockwise rotation of annulus A3, which will cause forward or clockwise rotation of contact mechanism TUMC for fix MC to an extent $$\frac{153 \times 4}{360}$$

or 1.7 turns or +17 minutes' worth. This is as it should be in that 3 minutes are lost due to unfavorable takeoff and an additional 14 minutes are required to make a 14,000 foot altitude climb. This causes the contact mechanisms for fix MC to electrically manifest 47 minutes instead of the original 30 minutes.

If the starting time motor STM (Figs. 5D and 6A) now operates until the contact mechanisms TUMC, TTMC, TUHC and TTHC for fix CV electrically manifest 10:20 the contact mechanisms for fix MC will manifest 10:20 plus 00:47 or 11:07 o'clock.

Let us now observe what electrical time manifestation will exist in the contact mechanisms for fix BR. Since the direction and velocity of the wind for section MC—BR is the same as that for section CV—MC and since the length of section MC—BR is twice that of section CV—MC or 200 miles the extent of rotation of contact mechanism for fix BR due to the cam gears is at fix BR twice the seventy minutes which was calculated for section CV—MC or a total of 140 minutes. That is, planet mounting gear PM1 for fix BR (Fig. 6E) causes the time contact mechanism of Fig. 6E to rotate backwards 2 hours 20 minutes from its original 05:00 o'clock position making an indication of 02:40 o'clock.

The climb motor CM for fix BR (see Fig. 4C) is, of course, not operated because no climb between fixes MC and BR took place. This operation of the time contact mechanisms for fix BR is supplemented however by an additional backward rotation equivalent to 70 minutes (01:10) of time due to the rotation of planet mounting gear PM1 for fix MC (Fig. 6C) and acting through sun gears S1 and S2 (Fig. 6C) and shaft 106C, and also supplemented by forward rotation due to climb motor CM for fix MC equivalent to 17 minutes acting through planets PL2 (Fig. 6C) and through shaft 106C. Summing up these rotations we have 02:40−01:10+00:17 or 01:47 o'clock. This reading is supplemented by the starting time of 10:20 transmitted through shaft 110 and sun gear S3 fix BR (Fig. 6E) results in an actual time indication of 10:20 plus 01:47 or 12:07 o'clock, as it should be in that the arrival time indicated at fix BR should be exactly one hour higher than at fix MC, which was 11:07 o'clock.

Second operation of calculator

Let us now assume the same constants as above except for cruising speed and wind direction which are assumed to be 185 M. P. H. and 135 degrees respectively, making the constant read as follows: wind direction 135°, wind velocity 100 M. P. H. (second layer atmosphere of sections CV—MC and MC—BR), cruising speed 185 M. P. H. starting time at fix CV 10:20, take-off at CV and climb to 14,000 feet to fix MC, take-off wind direction southwest. By examining the triangle illustrated in Fig. 14C it is readily seen that the ground speed will now be 100 M. P. H. instead of 200 M. P. H. as was the case hereinbefore.

Let us first assume that the variable radius crank 193 is operated to a zero length radius and that the cruising speed as manifested by the cruising speed relays of Fig. 3C of the drawings causes the cruising speed motor to operate the cruising speed sun gear S4 (Fig. 6B) to the 185 M. P. H. position, this will cause the ground speed rack (now reflecting cruising speed) to be moved to the right from its minimum 60 M. P. H. position to an extent presently to be explained. When this ground speed rack assumes said minimum 60 M. P. H. the cruising speed motor stop contact mechanisms CSHC, CSTC and CSUC assume the 60 M. P. H. or 000, 60 and 0 positions, respectively, and the rollers 248 are a distance of $6/10 \times 1.9635$ (length of rack of variable radius crank) or 1.178 inches from the center of pinion 192. The cruising speed motor shaft CSS will, however, be required to rotate another 12.5 (18.5—6) revolution to reach the 185 M. P. H. position, so that the stop contact mechanisms CSHC, CSTC and CSUC will operate from the 000, 60 and 0 to the 100, 80 and 5 position, respectively. This 12.5 revolutions of rotation of cruising speed shaft CSS causes sun gear S4 to rotate $$\frac{12.5 \times 2 \times 360}{45}$$

or 200 degrees in a clockwise direction causing annulus A4 to rotate 100 degrees in a counter-clockwise direction, the speed ratio of shaft CSS to sun gear S4 being 45 to 2.

Referring now to the hyperbolic curve shown in Fig. 13 it will be seen that when the miles per hour cam CG1 assumes the 100 degree position the hours cam CG2 assumes the 268 degree position. Rotation of 268° of cam gear CG2 causes 268 degrees of rotation of planet supporting gear PM1 (Fig. 6C) which causes $3 \times 268°$ or 804° rotation of sun gears S1 and S2 which 402° rotation of annulus A2 and gear PM3, which causes $402° \times 3/2$ or 603° rotation of annulus A3 which causes $603° \times 4$ or 2412° of rotation of contact mechanism TUMC for fix MC constituting $$\frac{2412}{360}$$

or 6.7 revolutions representing 67 minutes. Subtracting 67 minutes from the 60 M. P. H. time of 100 minutes leaves 33 minutes. This is approximately the time it requires an airplane travelling at a ground speed of 185 M. P. H. to fly over a 100 mile stretch.

We have, however, not yet considered the effect of a wind velocity of 100 M. P. H. at an angle of 135 degrees which has an opposing component. From the foregoing it should now be understood that operation of the wind velocity motor and the extension of the variable radius crank to its full length position and operation of the crank to the 135 degree position will cause the ground speed rack to be moved toward the left to a corresponding extent and without changing the relationship of the rollers 248 and the tape 245 between these rollers. That is, for each increment of movement of the tape toward the left the ground speed rack moves a corresponding increment toward the left. This is true because the outer pitch diameter of the annulus A4 is $2/3$ of the outside diameter of the tape wheel PM4 and with the sun gear S4 held stationary the gear ratio between these elements A4 and PM4 is $3/2$ so that these ratios cancel each other and the tape and rack move together.

It is readily seen from the triangle in Fig. 14C that the rack is moved to the left to an extent reflecting 85 M. P. H. because the ground speed is only 100 M. P. H., whereas the cruising speed is 185 M. P. H. The ground speed rack is therefore moved to the left to an extent reflecting 85 M. P. H. or a distance of $0.85 \times 1.9635$ (the crank rack length) or 1.67 inches equivalent to 68 degrees rotation of annulus A4. Referring now to the hyperbolic curve in Fig. 13 and remembering that the cam gear CG1 stood at the 100 degree position, it will be seen that it will now stand in the 32 degree position and from the curve the cam gear CG2 will now stand at the 160 degree position. Turning of the cam gear CG2 from its former 268 to its present 160 degree position amounts to 108 degrees turning of gears CG2 and PM1 (Fig. 6C), the step-down speed between gears 102 and 103A being equal to the step-up speed between gears 105A and PM1, which results in 324 degrees ($3 \times 108$) turning of sun gears S1 and S2, which results in 162 degrees' turning of annulus A2 and gear PM3, which results in 243 degrees' turning of annulus A3 which results equal 972 degrees' forward turning of contact mechanism TUMC reflecting 2.7 revolutions, equivalent to 27 minutes. This 27 minutes added to the 33 minutes heretofore indicated results in an indication of 1 hour. This is correct in that it takes an airplane flying at a ground speed of 100 M. P. H. one hour to fly 100 miles.

The correction for take-off and/or climb or descent will of course be taken into consideration automatically as above pointed out.

Wiring

Some of the circuits have already been touched upon in the description of the decoder and route expander disclosed more specifically in Figs. 3A–3H of the drawings. It is now proposed to describe the circuits illustrated in Fig. 5A–5D and their relation to the circuits in Figs. 3A–3H as well as all of the cables disclosed in this application (see Fig. 1).

*Buses and cables.*—By buses is meant a plurality of wires shown adjacent each other which perform substantially identical functions whereas the expressions "cables" is used to designate buses that have been combined in a cable shown by a single heavy line and which fans out at both ends. In some cases a plurality of cables are brought together into one large cable which may for convenience be called a main or compound cable. In each case where a compound cable is involved the reference character is such as to characterize the individual cables contained in the compound cable. A good example of a bus structure resides in the wires 0 to 9, inclusive, illustrated along the tops of Figs. 3A–3H, and shown vertically in Figs. 4A and 4B of the drawings. In Figs. 4A and 4B are shown —Tens, +Tens, —Units, +Units, tens control and units control buses, as well as a take-off bus TOWDCV.

Referring now to Figs. 1, 12A and 12B of the drawings it will be observed that the cable leading from the contact mechanisms VMHC, VMTC and VMUC has been designated WVC and that the cable leading from the contact mechanisms DMHC, DMSC and DMUC has been designated WDC. These two cables WVC and WDC lead to contacts such as 222 and 225 of relay PI controlled by tens altitude relay TI for fix MC (Figs. 12B and 3G), whereas similar cables from the velocity direction dial for altitudes 0 to 9,000 section CV—MC (Fig. 1, block VDB) lead to the contacts of the tens altitude relay P0 (Fig. 12B) similarly controlled by relay T0 of Fig. 3G. The heels of corresponding contacts of these altitude relays PI and P0 are connected together and pass through cables VCM and DCM, which cables are connected to the motor stop contact mechanisms for the wind velocity motor WVM and the wind direction motor WDM, respectively.

Referring now to the block diagram illustrated in Fig. 1 of the drawings it will be observed that the decoder apparatus shown in Figs. 3A–3H (see block D) of the drawings is connected to the electrical portion of the arrival time calculator (block AT) by compound cables IC123, CC123, CVA12, MCA12, BRA12 and SC1234 (see also Fig. 15); that the route expander portion (block RX) shown in the lower part of Figs. 3F, 3G and 3H of the drawings is connected (see Fig. 1) to the electrical portion of the arrival time calculator (block AT) by cables CVXC, MCXC, BRXC (see also Fig. 15) and that four auxiliary wires are combined into a cable YC also leading from Fig. 3G (block RX) to Fig. 5D (block AT) of the drawings (see also Figs. 1 and 15).

Referring again to Fig. 1 of the drawings, it will be observed that two altitude cable designated ALC—MC and ALC—BR extend from fixes MC and BR of the electrical portion of the arrival time calculator (Fig. 5) to the wind velocity and direction control circuits illustrated in Fig. 12B and that the wires contained therein control repeater relays such as TPI and TP0 (Fig. 12B). Also, the take-off direction knobs TOK illustrated (block BDB) in Fig. 1 of the drawings are connected to the take-off climb and descent apparatus of Fig. 4A (block TO) through the medium of cables such as cable TOWDCV illustrated in Fig. 4 of the drawings (see also Fig. 1).

It will also be observed that the electrical portion of the arrival time calculator (block AT of Fig. 1) and illustrated in Figs. 5A–5D of the drawings is connected to the flight check board FCB (Fig. 1) through the medium of compound cables CVIC123, CVCC123, CVP1234, CVA12, MCIC123, MCCC123, MCP1234, MCA12, BRIC123, BRCC123, BRP1234 and BRA12 (see also Figs. 5A, 5B and 5C). As shown in Figs. 5A–5D of the drawings, each of these cables just mentioned is a compound cable and fans out into a plurality of individual cables similarly designated. The dotted line connecting the teletype block TL and the taper perforator block T (Fig. 1) signifies a cable containing the necessary wires to control the tape perforator and not specifically disclosed in this application.

In addition to the various cables already mentioned and shown by dotted lines in Fig. 1 of the drawings, there is an additional dotted line which signifies climb motor shafts CMS. One of these climb motor shafts CMS is shown in Fig. 4A of the drawings, and another is shown in Fig. 4C.

Referring now to Figs. 5A–5D of the drawings in addition to the cables already mentioned and shown in Figs. 5A–5D there is a starting time bus STBB which is used for controlling the starting time motor STM shown in Fig. 5D of the drawings and is also at times used to apply posting energy to the segments and rings of the time contact mechanisms shown in Figs. 5A, 5B and 5C. It will be seen that each of the time posting cables CVP1234, MCP1234 and BRP1234 for the three fixes CV, MC and BR are at times connected directly to the contact mechanisms of the arrival time calculator time unit for that fix through front contact of a relay ER. At other times the time contact mechanisms of such fix are directly connected through front contacts of relays ER and SF directly to the starting time cable SC1234. The first connection is for controlling the starting time motor STM and the second connection is for posting purposes.

*Other interconnecting circuits and relays.*— Referring to Fig. 5A it will be observed that the portion of the flight check board shown at the top and associated with the fix CV is provided with an east direction indicating lamp EL controlled by a direction relay LER and a west direction indicating lamp WL controlled by a direction relay LWR. This feature of applicants' invention is of minor importance insofar as the simplified disclosure illustrated is concerned in that a calculator only capable of calculating eastbound airplane flights has been disclosed. In practice, however, the calculator is a double one and in that case the west lamp WL will at times be energized to indicate westbound calculation in the same flight check board FCB (Fig. 1).

It will also be observed that each of the posting units shown is provided with an operating magnet 280 and an individual illuminating light 281. These lights are all connected in multiple and are controlled through the front contact 182 of the master flight check repeater relay MPRCPP for the particular fix. It will also be observed that the entire group of operating magnets 280 for the posting units for each character of identity, cruising speed, time and altitude are connected to the same wire, which wires each lead to a series relay, these relays having been designated IPR, CPR, TPR and APR, respectively. The opposite terminal of each of these relays is connected to be energized through a wire 286 from the (—) terminal of a source of the posting battery PB when the associated master check posting repeater relay MPRCP is in its energized condition, as through its front contact 284, provided the master check posting relay MPRC is then also in its energized condition to hold its contact 285 closed. It will also be observed that this master check posting relay MPRC can be picked up only if all of the master posting check repeater-repeater relay MPRCPP (one for each fix), all of the wind velocity motor control relays (three for each fix), all of the wind direction motor control relays (three for each fix), and all of the climb motor control relays (one for each fix), and the three starting time motor control relays are in their deenergized condition and then only if the sign-off relay SO (see Fig. 3H) is in its energized condition. It will also be observed that a check posting terminating relay CPT (Fig. 5D) has been provided which remains energized until all of the posting relays have completed their operation and that this relay CPT is provided with a repeater relay CPTP which by its contact 290 in combination with contact 291 of relay CPT causes momentary opening of the stick circuits including wire 292 for the master check posting relay MPRC (Fig. 5D) and the sign-off relay SO and many other stick relays in Figs. 3A–3H.

SYSTEM OPERATION

Complete flight plan operation

Let us assume that a Teletype code is received over the wires 11 and 12 (Fig. 1) entering the teletype block TL. This code controls the tape perforator P in a manner to punch the tape as illustrated in Figs. 2A and 2B of the drawings. In this connection it should be understood that one or more of the five punch holes at each increment of the tape are received successively over the Teletype wires whereas the tape results in simultaneous picking up of one or more of the relays C1–C5 (Fig. 3A) simultaneously. These relays are also illustrated in dotted lines at the end of the tape in Figs. 2A and 2B. In other words, the tape perforator condenses the code, so to speak, from mere "on" and "off" characters into "letter," "figure" or "word" characters.

As the tape shown in Fig. 2A of the drawings enters the decoding apparatus shown conventionally by block D in Fig. 1 and shown in detail in Figs. 3A–3H of the drawings, the entrance of the first code element as shown by the tape in Fig. 2A will move under the five contact fingers one for each of the relays C1–C5, the contact 2 is energized by reason of the hole in the tape at this first code character on the tape and will pick up only the code relay C2 (Fig. 3A). This causes a circuit to be completed extending from the terminal (+) through the back contact 16 of relay C1, front contact 17 of relay C2, and back contacts 18, 19 and 20 of relays C3, C4 and C5 respectively, and through the upper winding of the flight plan relay FPR1, from which the circuit continues through the back contact 300 of over-report relay OPR1 from whence the circuit continues through wire 301 (Figs. 3B–3H) through back contact 302 of the sign-off relay SO to the other terminal (—) of the same source. This causes picking up of the relay FPR1 which then sticks up through a stick circuit including its stick relay 304 and the same two back contacts 300 and 302 just mentioned.

With this relay FPR1 now energized the negative terminal of a source of current is connected through front contact 305 of this relay FPR1 and back contact 306 of relay OPR1, wire 307, and through back contact 21 of the first stepping relay STP1, through rectifiers r, to the left-hand terminal of the upper windings of all of the hundreds digit relays 0, 1, 2, etc. in column H (Fig. 3B).

By this time the code tape shown in Fig. 2A will have advanced to a point where the code element relay C2 is again deenergized, and this deenergization of the code element relay C2 closes a circuit leading to the first stepping relay STP1 but this circuit is not closed at the minus side because none of the relays in the H column for identity (Fig. 3B) have been picked up. By this time the tape TA has advanced to its second position where wipe contacts 1, 2, 4 and 5 receive energy to pick up relays C1, C2, C4 and C5 respectively. This completes a circuit starting at the terminal (+) and passing through front contacts 16, 310, 312 and 313 of relays C1, C2, C4 and C5 and back contact 311 of relay C3, from whence the circuit passes through the upper winding of the figures relay FIGS to the other terminal (—). With this relay FIGS picked up it is stuck up through stick circuit including its stick contact 315 and back contact 316 of the letters relay LTRS, this letters relay LTRS being dropped by the opening of its stick circuit at back contact 316 of the figures relay FIGS if it were up.

By this time the tape has passed to a point where the code element relays C1, C2, C4 and C5 again drop to thereby apply energy to the stepping circuits passing through the back contacts 16, 17, 317, 318 and 319 of these code element relays and through wire 320, but no stepping relay picks up because the right-hand terminals of the various stepping relays are not connected to the negative terminal of said source. By this time the tape has advanced to the next position where the first figure of airplane identity is transmitted and where the code element relays C1, C2, C3 and C5 are picked up. Under this condition of the code element relays, a pick-up circuit for the relay 1 in the hundreds column H of identity (Fig. 3B) is closed. This circuit may be traced from the terminal (+) through the front contacts 16, 310 and 311 of the relays C1, C2 and C3 respectively, back contact 322 of relay C4, and front contact 323 of relay C5, and since the relay FIGS is now up the circuit continues through front contact 324 of relays FIGS, wire 1, upper winding of the hundreds relay 1 column H (Fig. 3B) for identity, through rectifier r, through back contact 21 of the stepping relay STP1, through wire 307, back contact 306 of relay OPR1, and front contact 305 of relay FPR1, to the other terminal (—) of this source. This relay 1 of column H of identity (Fig. 3B) will then pick up and be stuck up through a stick circuit beginning at the terminal (+), back contact 290 of relay CPTP (Fig. 5D), wire 292 in cable YC, front contact 50 of relay CP (Fig. 3E), wire 293 (Figs. 3E, 3D, 3C, 3B), through stick contact 326 of relay 1, column H (Fig. 3B) for identity through the lower winding of this relay to the terminal (—).

As the tape moves a little farther, namely, between its third and fourth step, the code element relays C1, C2, C3 and C5 will again be deenergized thereby completing the following stepping circuit for the stepping relay STP1; starting at the terminal (+), back contacts 16, 17, 317, 318 and 319 of the code element relays C1, C2, C3, C4 and C5, respectively, wire 320, upper winding of the stepping relay STP1 through front contact 327 of the relay 1 in column H of identity (Fig. 3B) to the other terminal (—) of this same source. This causes the stepping relay STP1 to be picked up and stuck up through a stick circuit including its stick contact 328 and the front contact 327 of relay 1, column H of identity (Fig. 3B). As the tape is now advanced a little farther the same group of code element relays will be picked up resulting in the picking up of the relay 1 in column T of identity (Fig. 3B). This relay T1 (Fig. 3B) will then be stuck up through a stick circuit contact 330 energized from stick wire 293. This will be followed by deenergization of all of these code element relays and the picking up of the stepping relay STP2 through a circuit including the front contact 331 of relay T1 (Fig. 3B). This stepping relay STP2 will then be stuck up through a stick circuit including its stick contact 332 and front contact 331 of relay T1 (Fig. 3B). In like manner the relay 2 in column U for identity (Fig. 3B) will be picked up through front contacts 16, 310 and 334 of relays C1, C2 and C5 and back contacts 311 and 312 of relays C3 and C4. This relay U2 (Fig. 3B) will then be stuck up through a stick circuit including its stick contact 335, and by closing its contact 336 will prepare a pick-up circuit for stepping relay STP3. This will be followed by picking up of the stepping relay STP3 which will then stick up through a stick circuit including its stick contact 337 and front contact 336 of relay U2. In the next step of the tape the code character "space" is transmitted. This code character performs no particular function and is used merely to set off the tape so as to render it more easily readable to some one experienced in the art of teletype tape reading.

The next three characters transmitted in succession are the characters 1, 7 and 3 and they result in the picking up of the relay 1 in column H of the relay 7 in column T, and the relay 3 in column U for cruising speed (Fig. 3C) all in a manner similar to what has already been described. The picking up of each of these relays is followed by the picking up of the associated stepping relay, these stepping relays being the relays STP4, STP5 and STP6. This results in closure of front contacts 340 and 341 of relay H1, front contacts 24 and 342 of relay STP4, in closure of front contacts 343 and 344 of tens relay T7, of front contacts 25 and 345 of stepping relay STP5, of front contacts 346 and 347 of units relay U3, and of closure of front contacts 26 and 348 of stepping relay STP6. This also involves contacts 350, 351 and 352 of code relays C3, C4 and C5 not heretofore mentioned. This is followed by the transmission of another space character which is followed by the transmission of the numerals 1, 0, 2 and 0 which results in the picking up of the relay 1 of column 10H, the relay STP7; the relay 0 of column H, the stepping relay STP8; the relay 2 of column 10M, the stepping relay STP9; and the relay 0 in the column M, and the stepping relay STP10 for starting time (Fig. 3D), all in a manner as readily understood from the preceding discussion. To set up the zero which occurs twice in the time 10:20 involves the contacts 354 and 355 of code element relays C4 and C5 not heretofore mentioned.

The picking up of the relays 10H1, H0, 10M2 and M0 and their associated stepping relays STP7, STP8, STP9 and STP10 will result in the closure of front contacts 360 and 361 of relay 10H1, front contacts 27 and 362 of stepping relay STP7, front contacts 363 and 364 of relay H0, of front contacts 28 and 365 of relay STP8, of front contacts 366 and 367 of relay 10M2, of front contacts 29 and 368 of stepping relay STP9, of front contacts 369 and 370 of relay M0, and of front contacts 30 and 371 of stepping relay STP10.

This will be followed by the transmission of a space character which performs no particular function except to advance the tape TA, which will then be followed by the transmission of a "letters" character. This letters character as readily seen from the tape TA will cause all of the five code element relays C1, C2, C3, C4 and C5 to be picked up simultaneously which results in the completion of a circuit including the front contacts 16, 310, 311, 322 and 373 of these relays C1, C2, C3, C4 and C5 respectively, and the upper winding of the relay LTRS from whence the circuit extends to the terminal (—) of the same source. The picking up of the relay LTRS will by the opening of its back contact 316 drop the relay FIGS. The letters relay is then stuck up through a circuit including contacts 375 and 376 of relays LTRS and FIGS respectively. This picking up of the relay LTRS and the dropping of the relay FIGS corresponds to the operation of the shift key on any typewriter, that is, the same code character transmitted will energize one particular wire if the "letters" relay LTRS is up and will energize a different particular wire when the "figures" relay FIGS is up. Deenergization of the five code element relays C1—C5 will produce no particular result in that the dropping of these relays will not close a stepping circuit.

The next character transmitted is the character C which causes the code element relays C2, C3 and C4 to be picked up simultaneously. The picking up of these relays closes a pick-up circuit for the relay C (Fig. 3E) which may be traced from the terminal (+) of a suitable source, back contact 16 of relay C1, and front contacts 17, 18 and 354 of relays C2, C3 and C4, back contact 378 of relay C5, and through front contact 379 of relay LTRS, wire C (Figs. 3A, 3B, 3C, 3D and 3E), upper winding of the relay C, through rectifier r, through back contact 31 of the stepping relay STP11, front contacts 30, 29, 28, 27, 26, 25, 24, 23, 22 and 21 of the stepping relays STP10, STP9, STP8, STP7, STP6, STP5, STP4, STP3, STP2 and STP1, wire 307, back contact 306 of relay OPR1, and front contact 305 of relay FPR1 to the other terminal (—) of said source.

The relay C (Fig. 3E) will now be stuck up through a stick circuit which may be traced from the terminal (+), through the front contact 380 of relay BRCR (Fig. 3H), wire 381, front contact 382 of relay MCCR (Fig. 3G), wire 383, front contact 384 of relay CVCR, wire 385, and stick contact 386 of relay C (Fig. 3E), through the lower winding of this relay to the other terminal (—) of the same source. Deenergization of these code element relays following the transmission of the character C will cause the stepping circuit including the upper winding of the stepping relay STP11 to be closed, this stepping circuit continuing through the front contact 388 of the relay C (first letter digit) to the other terminal (—). The picking up of the stepping relay STP11 will then result in the closure of the stick circuit for this relay STP11 including stick contact 389 and this same front contact 388 of the relay C.

The next character transmitted by the tape is the character V resulting in the picking up of the code element relays C2, C3, C4 and C5 and results in the closure of a circuit beginning at the terminal (+) of a suitable source, back contact 16 of the relay C1, front contacts 17, 18, 354 and 378 of the relays C2, C3, C4 and C5 respectively, front contact 391 of the relay LTRS, through wire V (Figs. 3A, 3B, 3C, 3D and 3E), upper winding of the relay V, rectifier r, back contact 32 of the stepping relay STP12, front contacts 13 to 21 of the stepping relays STP11 to STP1, inclusive, wire 307, through back contact 306 of relay OPR1, and front contact 305 of relay FPR1, to the other terminal (—) of said source. The relay V (Fig. 3E) will now be held energized through a stick circuit including its stick contact 392 and receiving energy from the wire 385, through a circuit heretofore traced. Deenergization of the code element relays C2, C3, C4 and C5 characterizing the letter V causes the stepping circuit to be reclosed resulting in the picking up of the stepping relay STP12 through a circuit including front contact 393 of relay V. Stepping relay STP12 then sticks up through a stick circuit including its own stick contact 394 and the front contact 393 of the relay V.

With the relays C and V now both energized, an energizing circuit is closed for the relay CVR (Fig. 3F) which starts at the terminal (+), and continues through front contact 400 of relay C (column 1, Fig. 3E), front contact 401 of relay V, wire 402, upper winding of the relay CVR, to the other terminal (—) of the same source. This fix relay CVR is then stuck up through a stick circuit including its stick contact 403, wire 293, front contact 50 of relay CP (Fig. 3E), and the wire 292 contained in the cable YC, and including the back contact 290 of the relay CPTP (Fig. 5D). The dropping of the code element relays C2, C3, C4 and C5 characterizing the relay V will pick up and stick the stepping relay STP12 as already explained. The picking up of the fix relay CVR, however, by the closing of its front contact 405 closes a return circuit portion for the tens altitude relays for the fix CV, so that after transmission of the space and figures characters as already explained, the transmission of the characters signifying the numbers zero and zero will cause the picking up of the zero relay in the tens and units columns for altitude CV (Fig. 3F).

As already pointed out the figure 0 is characterized by code element relays C2, C3 and C5 being picked up. Deenergization of these relays C2, C3 and C5 the first time will result in the stepping relay STP13 being picked up, and upon the second deenergization the stepping relay STP14 being picked up. With the relays 0 energized in both of the columns T and U for altitude CV (Fig. 3F) it is understood that zero is indicated meaning that the airplane is to take off at fix CV. These various relays will of course be stuck up in a manner as already fully described hereinbefore. This picking up and sticking up of these relays T0, STP13, U0 and STP14 will result in closure of front contacts 1, 2, 3, 4, 5, 6, 7, 8, 9, 406, 407 and 408 for relay T0, front contacts 33 and 409 of relay STP13, front contacts 1, 2, 3, 4, 5, 6, 7, 8, 9, 410, 411 and 412 of relay U0, and front contacts 34 and 413 of stepping relay STP 14. The front contacts 1—9 of each of altitude relays T0 and U0 for fix CV will of course also be closed. It will thus be seen that altitude relays T0 and U0 (Fig. 3F) will be stuck up through stick circuits including their respective stick contacts 406 and 410 and including the front contact 404 of the fix relay CVR.

The picking up of the fix relay CVR causes its back contact 415 to break an energizing circuit of one polarity for the relay CVCR and by closing its front point establish a circuit of reverse polarity thereby causing the magnetic polarity in the relay to be reversed which results in the momentary dropping of the front contact 384 of this relay CVCR. This causes the stick circuits for the relays C and V (Fig. 3E of the drawings) to be momentarily broken thereby causing these relays to drop.

The next character to be characterized by the tape shown in Fig. 2 is the "space" character which for reasons heretofore given performs no particular function insofar as the decoding apparatus is concerned. The next character transmitted is a "letters" character LTRS in which all of the code element relays C1, C2, C3, C4 and C5 are picked up. This causes the letters relay LTRS to be picked up, and the figures relay FIGS to be deenergized in a manner as hereinbefore described.

The next code to be characterized by the tape shown in Fig. 2A is a code which results in the picking up of the code element relays C3, C4 and C5 and by the closure of their front contacts 18, 417 and 418, the letters relay LTRS being energized, applies energy to the bus wire M which leads to the right-hand terminal of the upper winding of the relay M (Fig. 3E), rectifier r, back contact 31 of stepping relay STP11, and then through front contacts of the various stepping relays to the left thereof and through wire 307, back contact 306 of relay OPR1, front contact 305 of relay FPR1 to the other terminal (—) of the same source. As soon as the relay M is picked up it is stuck up through a stick circuit including its stick contact 419 which also includes the front contacts 384, 382 and 380 of relays CVCR (Fig. 3F), relay MCCR (Fig. 3G), and relay BRCR (Fig. 3H), respectively. Slight further advancing of the tape causes these code element relays C3, C4 and C5 to be deenergized thereby closing a circuit for the stepping relay STP11 which includes the front contact 421 of the relay M. The stepping relay STP11 upon picking up will of course remain up, through a stick circuit including its stick contact 389.

The next code character transmitted by the tape shown in Fig. 2A is the code character C which results in the picking up of the code element relays C2, C3 and C4 and with the letters relay LTRS in its energized condition applies current of positive potential to the bus wire C, through a circuit heretofore described, and which bus wire C is connected to the right-hand terminal of the upper winding of the relay C (second column Fig. 3E). This circuit for its completion required the picking up of the stepping relay STP11 and the closure of its front contact 31. With the relay C once picked up it is stuck up through its stick circuit including its stick circuit 423 and including the same front contacts that are included in the stick circuit for the relay M just traced. The picking up of relay C (second column) also at its front contact 424 completes a pick-up circuit for relay STP12 at one point which pick-up circuit is fully closed when the relays C2, C3 and C4 again drop.

With the relays M and C now both energized a pick-up circuit for the fix relay MCR (Fig. 3G) is closed, which circuit may be traced from the terminal (+), front contact 426 of the relay M, front contact 427 of relay C, wire 428 (Figs. 3E, 3F and 3G), to the upper winding of the fix relay MCR. With this fix relay MCR up it is stuck up through a stick circuit including its stick contact 429, wire 293, front contact 50 of the relay CP (Fig. 3E), from whence it leads through wire 292 in cable YC and receives energy of positive polarity of a source through the back contact 290 of the check posting repeater relay CPTP (Fig. 5D).

When the relay MCR picked up it moved its contact 430 from its retracted to its attracted position thereby changing the magnetic polarity in the relay MCCR which causes momentary dropping of its front contact 382 thereby causing the deenergization of the relays M and C (Fig. 3E) the dropping of which causes the dropping of the stepping relays STP11 and STP12. The tape shown in Fig. 2A will now advance to characterize a "space" code character which is followed by the characterization of the "figures" character which results in the picking up of the code element relays C1, C2, C3 and C5. This results in the picking up of the "figures" relay FIGS and in the deenergization of the "letters" relay LTRS all in a manner as already hereinbefore described.

The tape is then advanced to result in the picking up of the code element relays C2, C3 and C5 which results in the application of current of (+) polarity to the bus wire 1, through a front contact 324 of the relay FIGS. This results in the application of energy to the right-hand terminal of the middle winding of the relay 1 in the tens column for altitude for fix MC (Fig. 3G) from whence the circuit extends through the rectifier r, through back contact 35 of stepping relay STP15, through front contact 432 of fix relay MCR, and through front contacts 30 to 21 of the stepping relays STP10 to STP1, inclusive. It should be observed that this altitude relay T1 for fix MC is then stuck up through a stick circuit including its stick contact 431 and front contact 438 of fix relay MCR.

The picking up of any particular relay in the tens column of altitude relays for fix MC results in connection of the (—) terminal of the source to the right-hand terminal of the stepping relay STP15. In this case the connection is made through front contact 433 of the relay 1, and extends to the right-hand terminal of the stepping relay STP15, so that deenergization of the code element relays as the tape moves from the code character 1 to the code character 4 causes the stepping relay STP15 to pick up through such front contact 433. This stepping relay STP15 is then stuck up through a stick circuit including its stick contact 434 and the front contact 433 of the relay 1 in column T of altitude relays for fix MC. As the tape now advances to characterize the numeral 4, only the code element relays C2 and C4 are picked up, current is applied to the relay 4 in the units column U for altitude fix MC through a circuit including front contacts 17 and 19 of relays C2 and C4 respectively, and back contact 436 of relay C5, causing this relay U4 to pick up and then stick up through a stick circuit including its stick contact 437 and front contact 438 of the fix relay MCR. Deenergization of the code element relays C2 and C4 causes the stepping relay STP16 to pick up in a manner as already pointed out. In this case the stepping relay STP16 is picked up through a circuit including front contact 440 of relay U4 (Fig. 3G) and is then stuck up through a stick circuit including stick contact 441 and this same front contact 440.

The tape illustrated in Fig. 2A will now characterize a "space" character which will be followed by the characterization of a "letters" character, the latter of which results in picking up of the code element relays C1, C2, C3, C4 and C5 resulting in the picking up of the letters relay LTRS and dropping of the figures relay FIGS in a manner as already pointed out.

The next code character to be characterized by the tape shown in Fig. 2A is the character B, which results in the picking up of the code element relays C1, C4 and C5 and the closure of their front contacts 16, 354 and 444. With these three code element relays picked up and with the "letters" relay in its energized condition energy is applied through front contact 445 of this relay LTRS to the bus wire B, which bus wire B leads to the right-hand terminal of the upper winding of the relay B (Fig. 3E), from whence the circuit continues through the rectifier r, back contact 31 of the stepping relay STP11, and from whence through front contacts 30 to 21 of the various stepping relays STP10 to STP1, inclusive, through wire 307, back contact 306 of relay OPR1 and front contact 305 of relay FPR1, to the other terminal (—) of the same source. With the relay B energized its front contact 447 connects (—) terminal of the source to the right-hand terminal of the two windings of the stepping relay STP11 so that as the tape advances to deenergize the code element relays C1, C4 and C5 the stepping relay STP11 is picked up in a manner as already pointed out. With this stepping relay STP11 picked up it is stuck up through a stick circuit including its stick contact 389 and this front contact 447 of the relay B. The letter relay B is stuck up through a stick circuit similar to those heretofore traced and including its stick contact 448.

Slight additional advance of the tape causes the code character R to be characterized in the decoding apparatus which results in the picking up of the code element relays C2 and C4, and with these relays energized and with the letters relay LTRS energized current of positive polarity is applied through back contacts 16, 18 and 436 of relays C1, C3 and C5 and front contacts 17, 19 and 450 of relays C2, C4 and LTRS, to the bus wire R, which leads to the right-hand terminal of the upper winding of the relay R (Fig. 3E) from whence the circuit continues through the rectifier r, through back contact 32 of the stepping relay STP12, and through front contacts of all of the stepping relays to the left thereof, through wire 307 and back contact 306 of the relay OPR1, through front contact 305 of the relay FPR1, to the other terminal (—) of the same source. With the relay R once energized it is stuck up through a stick circuit including its stick contact 452, front contacts 384, 382 and 380 of relays CVCR, MCCR and BRCR (Figs. 3F, 3G and 3H). The front contact 453 of the relay R connects the (—) terminal of the source to the right-hand terminals of the two windings of the stepping relay STP12, so that deenergization of all of the code element relays in response to slight further advance of the tape causes the stepping relay STP12 to pick up in a manner as already pointed out after which it is stuck up through a stick circuit including its stick contact 394 and the front contact 453 of the relay R.

It may be pointed out at this time that the various rectifiers r heretofore mentioned are used to simplify the wiring of the apparatus and at the same time avoid run-around or sneak circuits which are undesirable and under certain conditions might result in the picking up of relays which are not intended to be picked up. In practice more complicated wiring employing additional contacts and not employing these sneak circuit preventing rectifiers may of course be employed if desired.

With the relays B and R now both energized, a pick-up circuit is closed which may be traced from the terminal (+) through the front contact 456 of relay B, front contact 457 of relay R, wire 458 (Figs. 3E, 3F, 3G and 3H), through upper winding of the fix relay BRR to the other terminal (—). The picking up of this relay BRR results in the closure of the stick circuit for this relay including the stick contact 460, wire 293, front contact 50 of relay CP (Fig. 3E), wire 292 of the cable YC, and receiving energy through the back contact 290 of the check posting repeater relay CPTP (Fig. 5D). The picking up of this fix relay BRR will by the operation of its contact 461 result in the pole changing of the magnetism in the relay BRCR which, for reasons heretofore given, results in the momentary opening of the front contact 380 of this relay BRCR, resulting in the deenergization and dropping of front contact 77 of the fix relay MCR, front contact 78 of the east relay MCER (Fig. 3G), wire 75 in cable MCXC. Similarly, wires 75 extend to all of the east relays ER shown in each of Figs. 5A, 5B and 5C through their respective cables. Each of these east relays ER will therefore pick up and will remain in its picked up condition so long as a fix relay is energized and its associated direction relay remains in its deenergized position. Another directional function that is accomplished by the expanding apparatus at the bottom of Figs. 3F, 3G and 3H resides in the control of the direction light relays LWR and LER. The pick-up circuit for relay LER for fix MC (Fig. 5B) may be traced from the terminal (+), front contact 65 of relay MPRC (Fig. 5D), wire 66 in cable YC through any one or more of contacts 67, 68 or 69 of relays MCR, MCXER or MCXWR and front contact 70 of relay MCER and through wire 72 (Figs. 3G and 5B).

Referring now to Fig. 5A of the drawings it will be observed that the front contacts 536, 537, 538 and 539 of relay ER are connected respectively in series with the front contacts 541, 542, 543 and 544 of the associated relay SF. This causes the contact mechanisms TTHC, TUHC, TTMC and TUMC for fix CV to be connected to the starting time buses SC1, SC2, SC3 and SC4 respectively which buses are contained in the main starting time bus SC1234, which bus extends directly to the starting time manifesting relays in columns 10H, H, 10M and M of Fig. 3D of the drawings.

Since the starting time that has been characterized is 10:20 the starting time motor shown in Fig. 6A of the drawings, the control circuits of which are shown in Fig. 5D of the drawings, will now be operated until the contact mechanisms for fix CV electrically manifest the starting time of 10:20, after which this starting time motor STM will be stopped by dropping of all of the associated relays STB, STF and STFF (Fig. 5D) all in a manner already described hereinbefore.

In a similar manner, the cruising speed that is manifested by the cruising speed relays picked up in columns H, T and U of Fig. 3C of the drawings will apply energy to the proper wires in the cruising speed cables CC1, CC2 and CC3, which cables are contained in the compound bus CC123, will cause the cruising speed motor CSM shown in Fig. 6B of the drawings, the electrical circuits of which are shown in Fig. 5D of the drawings, to be operated until the cruising speed motor shown in Fig. 6B of the drawings has been operated to a position where it characterizes a cruising speed of 173 miles per hour. When the cruising motor CSM has reached this position the control relays CSB, CSF and CSFF for the cruising speed motor CSM (Fig. 5D) will all assume their deenergized position and stop this cruising speed motor CSM, all for reasons hereinbefore described.

In a similar manner the climb motor CM will be operated in accordance with the take-off wind direction at fix CV and in accordance with the climb from 0 altitude to 14,000 feet altitude manifested by the altitude relays TU0 and TU14 at fixes CV and MC, respectively. Also, the wind velocity motors WVM shown in Figs. 6B and 6D and the wind direction motors WDM shown in Figs. 6B and 6D will be operated in accordance with the wind velocity and wind direction characterized by the dial VD for altitudes 10,000 feet to 19,000 feet and in the stretch CV—MC and designated VD(10—19) illustrated in block VDB of Fig. 1 of the drawings. It is again pointed out that the climb and descent circuits and apparatus shown conventionally in Figs. 4A, 4B, 4C, and 4D is provided for each fix and that each apparatus adds or subtracts a certain time into the calculator shown in Figs. 6A–6E. Referring to Figs. 6A–6E it will be seen that whatever time is added to the time units of Fig. 6A by the climb shaft CMF of fix CV is also added to the time units of Fig. 6C through the medium of shaft 106A and to the time units of Fig. 6E through the medium of accumulator shafts 106A and 106C.

*Posting.*—As soon as these operations of the starting time motor, the cruising speed motors, the climb motors, the wind velocity motors, and wind direction motors have been completed and the back contacts of their control relays have been reclosed, an energizing circuit for the check posting relay MPRC (Fig. 5D) is closed which circuit may be traced from the terminal (+), front contact 550 of the sign-off relay SO (Fig. 3H), wire 551 contained in cable YC and extending from Fig. 3H to Fig. 5D from whence the circuit continues through back contacts 552, 553, 554, 555, 556 and 557, wire 558, back contacts 559, 561, 562, 563, 564, 565, 566, wire 567, back contacts 568, 569, 570, 571, 572, 573, 574, 575, wire 576, back contact 577, wire 578, back contact 579, and wire 580 to the upper winding of relay MPRC. These back contacts are on relays STFF, STF, STB, CSFF, CSF, CSB (Fig. 5D), CLR, WDFF, WDF, WDB, WVFF, WVF, WVB (Fig. 5B), CLR, WDFF, WDF, WDB, WVFF, WVF, WVB, MPRCPP (Fig. 5A), MPRCPP (Fig. 5B), and MPRCPP (Fig. 5C). The circuit then continues through the upper winding of the relay MPRC to the other terminal (—) of the same source. This circuit will not be completed until each of the above motors has had time to start and complete its operation because the relay SO (Fig. 3H) is slow to pick up.

The picking up of the master posting relay MPRC by closure of its front contacts 65 applies energy to the posting repeater relay MPRCP for each fix in the proposed flight (see Figs. 5A, 5B and 5C) through circuits including wire 66 in cable YC, one or more of the front contacts 67, 68 or 69 of the associated fix relay or auxiliary fix relays and wire 74. Picking up of these posting repeating relays, one for each fix, through their respective front contacts 284 each connect the return wires for all of the posting units for such fix to the return wire 286 and through front contact 285 of the master posting relay MPRC to the negative terminal of the posting battery PB. Each of the posting repeater relays MPRCP will through its contact 283 pick up its associated light control relay MPRCPP which will then stick up through a stick circuit including its stick contact 53, stick wire 52, and back contact 55 of the relay SMPRP (Fig. 5D) and cancel push button contact CPB. Each light control relay MPRCPP will through its front contact 182 light the lamps of the associated posting units as soon as all of the associated series relays IPR, CPR, TPR and APR at all fixes have been deenergized and caused dropping of relay CPT. The posting units are of the type that operate when their different digit or position busses are energized. The contact arm of each indicator causes successive energization of its operating windings until it reaches that digit wire or bus which is deenergized, as disclosed in the above mentioned application Ser. No. 500,672.

More specifically, the digit wires leading from the different positions of the indicator APT of the relays B and R (Fig. 3E). This in turn results in the dropping of the stepping relays STP11 and STP12.

The next character to be characterized by the tape shown in Fig. 2A is the "space" character which is followed by the "figures" character. This figures character results in the picking up of the code element relays C1, C2, C3 and C5 resulting in the picking up of the relay FIGS and in the dropping of the relay LTRS.

The next character that is transmitted is the character 1 resulting in the picking up of the code element relays C2, C3 and C5 and with the figures relay FIGS now energized, energy is applied to the number 1 bus wire which extends to the right-hand terminal of the middle winding of the relay 1 in the tens column T for altitude at fix BR (Fig. 3H), from whence the circuit continues through the rectifier r, through the back contact 37 of the stepping relay STP17, through front contact 463 of the fix relay BRR, through front contacts of all of the stepping relays to the left of stepping relay STP11 and through wire 307, back contact 306 of the relay OPR1, front contact 305 of relay FPR1, to the other terminal (—). The picking up of the tens relay 1, column T (Fig. 3H), results in the (—) terminal of the source being connected through front contact 464 of this relay 1 to the right-hand terminals of the stepping relay STP17 so that the deenergization of the code element relays as the tape is shifted from the character 1 to the character 4 causes this stepping relay STP17 to be picked up. This stepping relay STP17 is then stuck up through a stick circuit including its stick contact 465 and the front contact 464 of the relay 1 in the column T (Fig. 3H). This relay T1 (Fig. 3H) is held energized through a stick circuit including its stick contact 467 and front contact 468 of fix relay BRR. The characterization of the code character 4 then results in the picking up of the code element relays C2 and C4 which with the figures relay FIGS energized causes current of positive potential to be applied to the bus wire 4 leading to the right-hand terminal of the middle winding of the units relay 4 in column U for altitude of fix BR (Fig. 3H). With this relay 4 in column U (Fig. 3H) now energized, the negative terminal of the source is connected through a front contact 470 of this relay to the right-hand terminals of the windings of stepping relay STP18 so that deenergization of the code element relays C2 and C4 causes this stepping relay STP18 to be picked up in a manner as already hereinbefore described. This stepping relay STP18 is then stuck up through a stick circuit including its stick contact 471 and the front contact 470 of the units relay 4 column U for altitude at fix BR (Fig. 3H). This units relay U4 (Fig. 3H) is stuck up by a holding circuit including its stick contact 472 and front contact 468 of fix relay BRR.

The next character to be transmitted is a "space" character which performs no particular function. This is followed by the transmission of the "sign-off" character which is such as to pick up the code element relays C3 and C5. This closes a circuit which may be traced from the terminal (+), back contacts 16 and 17 of relays C1 and C2, front contacts 317 of relay C3, back contact 417 of relay C4, front contact 474 of relay C5, and with the figures relay FIGS now energized this circuit extends through the front contact 475 of this figures relay to the sign-off wire SO (Figs. 3B–3H) which extends to the right-hand terminal of the upper winding of the sign-off relay SO (Fig. 3H) to the other terminal (—) of the same source. With this sign-off relay SO once energized it is stuck up through a stick circuit including its stick contact 476, wire 293, front contact 50 of relay CP (Fig. 3E) through wire 292 in cable YC, which through back contact 290 of the relay CPTP (Fig. 5D) is connected to the positive terminal of said source.

With the sign-off relay SO (Fig. 3H) now picked up and stuck up the opening of its back contact 302 will open the stick circuit for the flight plan relay FPR1 (Fig. 3A) thereby causing this flight plan relay to assume its deenergized position and open its front contact 305 which removes energy from all of the pick-up circuits of the code character relays shown in Figs. 3B–3H and also from the pick-up and stick circuits of over-and-under detection relay CR (Fig. 3E). The left-hand terminal of all of the code characterizing relays shown in Figs. 3A–3H are therefore disconnected from the minus terminal of the source so that no more of these relays can be picked up until either the flight plan relay FPR1, some other flight plan relay (not shown) or the over-report relay OPR1 is picked up by some other portion of the code characterizing tape.

*Directional function performed by route expander*

Referring now to Fig. 3F, the picking up of the fix relay CVR results in the closure of its front contact 58 which applies energy of positive potential through back contacts 59 and 60 of the relays CVER and CVWR, and wire 61 in cable CVXC (leading from block diagram RX to block diagram AT (Fig. 1)) through the winding of starting point determining relay SF (Fig. 5A) to the other terminal (—). This relay when up determines that the fix CV is the starting fix and that the starting time is to be displayed at this fix. That is, only one of the various starting fix relays SF (Figs. 5A, 5B and 5C) will be up at one time, because at every other fix one of the relays ER or WR will be picked up to open its back contact 59 or 60. It will be noted that the picking up of any first fix relay, such as CVR, causes a tumble-up circuit of east relays ER toward the east and west relays WR toward the west to take place.

This relay SF (Fig. 5A) since it is associated with an east relay ER manifests that the flight is an eastbound one and that the flight route starts at fix CV. Another function performed by these expanding relays other than a route expansion function resides in the picking up of the posting relay MPRCP at every fix through which a set-up flight route extends. This is accomplished for fix MC through the medium of front contacts 67, 68 and 69 of relays MCR, MCXER and MCXWR and wire 74. The purely route expanding functions will be pointed out hereinafter. It may be pointed out here that this relay determines that the contact mechanisms of the calculator for fix CV will be used as stopping contacts for determining at what time the starting time motor shall stop, namely, the starting motor shall operate until the time indicated for fix CV is the starting time. It is also readily observed from Figs. 3F and 3G that the directional relay MCER (Fig. 3G) is picked up through the front contact 480 of the fix relay CVR, and the back contact 481 of the west relay CVWR. It is also readily seen that with the relays MCR energized current may flow to the east bus, from the terminal (+) of a suitable source of current, Fig. 5B extend through the cable MCA12 and branch out to MCA1 in Fig. 3G. This cable includes ten wires which extend from the different positions of the indicator to all of the relays, such as relays, T0, T1, T2, etc. Each of these relays is provided with nine contacts for energizing all of the bus wires except the one for the position to which that relay is assigned. In other words, there are ten bus wires but each relay is provided with only nine contacts for this purpose. For example, the relay T0 leaves the bus 0 deenergized; while the relay T1 leaves the bus 1 deenergized.

The different indicators for each group have their operating windings connected together on the negative side. This common negative connection or wire is passed through a series relay, such as the relay APR or TPR, and these relays in turn are connected with a master bus 286 when the posting relay MPRCP is picked up closing front contact 284 as above described. This master bus 286 is connected through certain calculator contacts 171 for the different fixes and contact 285 of the master posting relay MPRC to the negative terminal of the source PB. Thus, as long as an indicator for the fix MC is operating to a new position, one of the relays IPR, CPR and APR is picked up, but when the operation is completed these relays are all deenergized. In this way, it can be determined when the indicators for any fix have assumed their new positions.

Dropping of relay CPT by the closing of its back contact 187 applies the plus terminal of a source of current to bus wire 188 connected through these front contacts 182 of relays MPRCPP to the lights 281 in the posting units.

The picking up of the master check posting relay MPRC (Fig. 5D) also by the opening of its back contact 584 removes the negative terminal of the control battery CB from the wire 585 in cable YC thereby removing the energy from the starting time contacts of the starting time storage relays (Fig. 3D) so that the contact mechanisms of the calculator for the starting fix CV are no longer energized from the control source CB. The picking up of this posting relay MPRC (Fig. 5D), however, through the medium of its front contacts 586, 587, 588 and 589 applies energy from the positive terminal of the posting battery PB to the starting time bus STBB from which this energy flows to the contact mechanisms TTHC, TUHC, TTMC and TUMC of each of the three fixes CV, MC and BR so that these contact mechanisms may post the starting time at fix CV and two different arrival times at fixes MC and BR respectively through circuits which may be readily traced in the drawing and for which only the circuits for posting the starting time will be traced. It should be remembered that the starting time is 10:20 and that the contact mechanism TTHC (Fig. 5A) of the calculator stands in a position where segment 242 engages contact brush 2 and segment 243 engages contact brush 0. The two circuits for the tens of hours contact mechanism TTHC for fix CV may be traced from the terminal (+) of the battery PB, front contacts 586 and 587 of relay MPRC (Fig. 5D), the first and second wire in time bus STBB, segments 243 and 242 respectively of the contact mechanism TTHC (Fig. 5A), stationary contact brushes 2 and 0, wires 2 and 0 in the cable 590, two of the front contacts, such as 536, of relay ER (Fig. 5A), wires 2 and 0 in the cable CVP1 included in the compound cable CVP1234, through the contacts of the posting unit TPTH for fix CV (Fig. 5A), the clutch magnet 280 of this same posting unit TPTH, wire 592, winding of the series relay TPR, front contact 284 of the master check posting repeater relay MPRCP (Fig. 5A), wire 286, contacts 171 of the centering mechanisms (Figs. 4A and 7), front contact 285 of the master posting relay MPRC (Fig. 5D) to the other terminal (—) of the posting battery PB. Energization of clutch magnet 280 clutches the contact arm to a continuously rotating shaft and rotates this arm so long as the clutch engagement continues as clearly disclosed in said Ser. No. 500,672. This will cause the posting mechanism TPTH for fix CV to operate until the rotating contact arm of this posting mechanism engages only deenergized fixed contact 1 at which time this posting mechanism TPTH stops and assumes the 1 position signifying the first digit of the starting time 10:20. These posting units have been described in detail in the prior application Ser. No. 500,672 above referred to. In a similar manner circuits may be traced for each of the other posting units for starting time at fix CV and for arrival times at fixes MC and BR (Figs. 5B and 5C) so that these circuits since they are all similar will not be traced specifically. The five circuits for the posting unit TPTM (fix CV, Fig. 5A) will however be traced as follows: starting at the same plus terminal PB (Fig. 5D) of the posting battery, front contact 589 of relay MPRC, the fourth wire of the time bus STBB, segment of the contact mechanism TTMC (Fig. 5A) which now assumes a position where contact brush 2 lies in the gap, contact brushes 0, 1, 3, 4, 5 and 6 of this contact mechanism in multiple, five front contacts such as 538 of relay ER, the third portion of the cable CVP1234, fixed contacts 0, 1, 3, 4, 5 and 6 in multiple and the contact arm of posting unit TPTH and its clutch magnet 280, wire 592, winding of the relay TPR, front contact 284 of relay MPRCP, wire 286 including centering contacts 171, front contact 285 of the relay MPRC to the other terminal (—) of the posting battery PB. The posting unit TPTM (Fig. 5A) will operate until its rotatable contact arm engages stationary contact 2, the only dead contact, and will then stop to thereby indicate the tens digit of twenty minutes, posting units TPUH and TPUM will remain in their zero position as a result of which the time 10:20 is indicated. Upon completion of operation of the time posting units for all three fixes CV, MC and BR they will respectively indicate 10:20, 11:07 and 12:07 for reasons above given.

In a similar manner as just described the posting units CPH, CPT and CPU for each of the fixes CV, MC and BR will be operated to indicate the cruising speed in accordance with the positions assumed by the contact mechanisms CSHC, CSTC and CSUC (Fig. 5D). For convenience only the circuits for energizing and controlling the posting units CPH for fix CV (Fig. 5A) will be traced. Since the cruising speed is 173 M. P. H. the relay 1 in column H, relay 7 in column T and relay 3 in column U for cruising speed (Fig. 3C) are energized. For reasons already pointed out this condition of the cruising speed relays (Fig. 3C) caused the cruising speed motor CSM (Figs. 6B and 5D) to operate until the contact mechanisms CSHC, CSTC and CSUC assumed respectively the 1, 7 and 3 positions in which positions the brushes 1, 7 and 3 of the respective mechanisms are in the large gaps between segments 112—113 and 110—111 and of the ring 109. The circuit for so controlling the motor CSM (Fig. 5D)

through the medium of its control relays CSB, CSF and CSFF for contact mechanism CSHC may be traced from the terminal (—) of the control source CB, back contact 584 of relay MPRC, wire 585 in cable YC, front contact 595 of relay 1 column H (Fig. 3C), cable CCI, contained in cable CC123, brush 1 of contact mechanism CSHC (Fig. 5D) to one of the relays CSB or CSF depending on the position assumed by this contact mechanism when the current was applied. We may now assume that these contact mechanisms CSHC, CSTC and CSUC assume the 1, 7 and 3 positions respectively.

The circuit for controlling the hundreds digit posting unit CPH for cruising speed fix CV (Fig. 5A) may now be traced, it being assumed that the relay MPRC has picked up in the meantime, from the terminal (+) of the posting source PB, front contacts 596 and 597 of relay MPRC (contacts 598 and 599 performing similar functions) the upper two wires of bus CTB, segments 113 and 112 of contact mechanism CSHC, brushes 0, 2, 3 and 4, wires 0, 2, 3 and 4 in cable CCI (Fig. 5D), wires 0, 2, 3 and 4 in cable CVCCI contained in cable CVCC123 (Fig. 5A) to contacts 0, 2, 3 and 4 of posting unit CPH, clutch coil 280 of this unit, winding of the relay CPR, front contact 284 of relay MPRCP, contact 171 (Figs. 4A and 7), return wire 286, front contact 285 of relay MPRC (Fig. 5D) to the other terminal (—) of the posting source PB. This will cause posting unit CPH (Fig. 5A) to operate until the rotatable contact arm 600 engages only the dead fixed contact 1. All the other cruising speed posting units are similarly operated and when this operation has been completed a cruising speed of 173 M. P. H. is indicated for each of fixes CV, MC and BR.

The identity posting units are directly controlled from the identity relays (Fig. 3B). The circuits for posting unit IPH (Fig. 5A) to indicate the hundreds digit of 112 may be traced by starting at the terminal (+) of the posting battery PB, through front contacts 0, 2, 3, 4, 5, 6, 7, 8 and 9, of relay 1 column H (Fig. 3B), through correspondingly numbered wires in cable ICI contained within compound cable IC123 and extending from the storage relays in the block D (Fig. 3B) to the identity bus IC123 illustrated in Figs. 5A-5C, from whence they continue through similarly numbered wires in cable CVICI included in compound cable CVIC123 through the contact mechanism of the posting unit IPH and one at a time through rotary arm 602 and the clutch magnet 280 of this same posting unit IPH through the winding of the series relay IPR through front contact 284 of the relay MCRCP (Fig. 5A), wire 286 (Figs. 5A, 5B and 5C), contacts 171 of centering mechanisms for fixes MC and BR, front contact 285 of the master checking posting relay MPRC (Fig. 5D) to the other terminal (—) of the posting battery PB. Since all of the wires leading to the posting unit IPH for fix CV (Fig. 5A), except the wire 1, have energy applied thereto this posting unit IPH will operate until it reaches the deenergized wire 1 at which point the posting mechanism for the posting unit will stop for reasons pointed out in the prior application of Wight, Field and Dicke, Ser. No. 500,672, filed August 31, 1943. In like manner all of the remaining identity posting units for fixes CV, MC and BR will be operated so as to indicate the identity number 112.

In a similar manner as just described for the identity posting units the two posting units for altitude at each of fixes CV, MC and BR (Figs. 5A, 5B and 5C) will be operated to positions to indicate the altitude the airplane is to fly over that particular fix which is altitude 0 for fix CV in that the airplane is to take off at fix CV and is 14,000 feet for each of fixes MC and BR.

As soon as the posting operation was started, namely, when posting relays MPRC and MPRCP picked up, one or more of the series relays IPR, CPR, TPR and APR (Figs. 5A, 5B and 5C) were energized and these series relays supplied energy through their front contacts to the wire 604, which resulted in the picking up of the series repeater relay CPT. The picking up of this relay CPT resulted in the closure of a stick circuit for the master posting relay MPRC which includes a front contact 291 of this relay CPT and the stick contact 294 for the relay MPRC. Also, the picking up of this relay CPT resulted through its contact 295 in the picking up of its repeater relay CPTP, which is both slow in picking up and slow in dropping. Since the front contact 291 of the relay CPT closes before the back contact 290 of the relay CPTP opens no particular function is accomplished at this time by the repeater relay CPTP. However, upon dropping of the relay CPT the slow dropping repeater relay CPTP will hold its back contact 290 open for a time after the front contact 291 of the relay CPT has opened so that momentarily energy is removed from the wire 292 in the cable YC to cause deenergization of numerous storage relays shown in Figs. 3A–3H of the drawings.

The picking up of the series repeater relay CPT by the opening of its back contact 187, however, removes energy from a circuit which would otherwise feed energy to the various lamps 281 contained one in each of the posting units illustrated in Figs. 5A, 5B and 5C of the drawings, so that in spite of closure of front contact 182 of each of the master check posting repeater relays MCRCPP none of the lamps of the various posting units will be lighted until all of the posting units have reached their ultimate at-rest and proper indicating position at which time their respective series relays IPR, CPR, TPR and APR are all deenergized resulting in deenergization of the series repeater relay CPT which through the medium of closure of its back contact 187 applies energy to these various lamps 281.

It may now be assumed that all of the posting units have now reached their ultimate position and that the series repeater relay CPT (Fig. 5D) is deenergized resulting in deenergization of its repeater relay CPTP. The sequential dropping of these relays CPT and CPTP by the opening of contact 295 of relay CPT before contact 290 of relay CPTP closes causes momentary removal of energy from the wire 292 in cable YC thereby resulting in the deenergization of all of the stick relays which were heretofore picked up by the teletype apparatus in Figs. 3B, 3C, 3D, 3E, 3F, 3G and 3H of the drawings, exclusive of stick relay FPRI (Fig. 3A) which was dropped earlier, so that all of the apparatus except the posting units shown in Figs. 5A, 5B and 5C of the drawings are returned to an inactive or deenergized condition. By referring to Figs. 3B to 3H it will be observed that wire 292 after passing through contact 50 of relay CP (Fig. 3E) becomes wire 293 which is the stick wire for all function relays in Figs. 3B to 3H.

The various relays MPRCPP one in each of Figs. 5A, 5B and 5C of the drawings, and at other fixes if there are more fixes in the system, will remain in their energized stuck-up condition to hold their respective lamps 281 located one in each of the posting units energized and lighted. In this connection it should be noted that each of the relays MPRCPP (Figs. 5A, 5B and 5C) is stuck up through a stick circuit including the stick contact 53 for such relay and including in multiple a front contact 54 of a super-master posting relay SMPR and a back contact 55 of its repeater relay SMPRP, so that these relays MCRCPP will only drop after the calculated route displayed on the check display board (Figs. 5A, 5B and 5C) has been transferred to the flight progress board FPAF (Fig. 5D) such as disclosed in the patent to Wight and Field, No. 2,344,761, dated March 21, 1944. It should be understood that although the picking up of the supermaster posting relay SMPR does not remove energy from the wire 52 because this front contact closes before the back contact 55 of the relay SMPRP opens but that the dropping of this super-master posting relay SMPR will cause momentary opening of this circuit because its front contact 54 will open before the back contact 55 of the relay SMPRP closes. These relays SPRCPP are dropped only in response to dropping of relay SMPR. Also, if desired, the lamps for illuminating the various posting units in Figs. 5A, 5B and 5C of the drawings may be extinguished, by dropping the relays MPRCPP, by momentarily pushing the cancelling button CPB illustrated in Fig. 5D of the drawings.

Abbreviated flight plan operation

The operation of the system for a complete flight plan, the tape for which has been illustrated in Fig. 2A, has just been considered. Let us now observe the operation of the system for an abbreviated flight plan such, for instance, as is illustrated by the tape shown in Fig. 2B. This tape of Fig. 2B directly manifests the fixes CV and BR, as well as their respective altitudes, but does not manifest fix MC nor its altitude and the present operation is considered for the purpose of observing how such an abbreviated flight plan may be expanded into a complete flight plan insofar as the picking up of auxiliary fix relays and associated altitude relays for unnamed fixes, and the functions they perform, is concerned.

The first seven code characters illustrated by the tape shown in Fig. 2B of the drawings are identical to those of the tape shown in Fig. 2A so that it will be unnecessary to consider the operation resulting from these first seven characters on the tape (Fig. 2B). The next code character is the code character 8 in the cruising speed of 185 M. P. H. and will result in picking up of the relay 8, column T, for cruising speed (Fig. 3C) through a circuit starting at the terminal (+) of the system source, back contact 16 of code element relay C1, front contacts 17 and 18 of the code element relays C2 and C3, respectively, back contacts 354 and 355 of code element relays C4 and C5, respectively, front contact 606 of the relay FIGS, bus wire 8, winding of the relay 8 of column T for cruising speed (Fig. 3C), rectifier r, back contact 25 of the stepping relay STP5, front contacts 24, 23, 22 and 21 of the stepping relays STP4, STP3, STP2 and STP1, wire 307, back contact 306 of relay OPR1, front contact 305 of relay FPR1 to the other terminal (—) of said source. This relay T8 is then stuck up by a stick circuit including its stick contact 607. Dropping of these code element relays C2 and C3 as the tape gradually advances results in the picking up of the stepping relay STP5 which is then stuck up by a stick circuit similar to one already hereinbefore traced and including front contact 605 of said relay T8.

A slight further advance of the tape shown in Fig. 2B results in the characterization of the numeral 5 which causes the code element relay C5 to be picked up. This results in the completion of a circuit for the relay 5 in column U for cruising speed (Fig. 3C) through a circuit which may be traced from the terminal (+), back contacts 16, 17, 317 and 318 of the relays C1, C2, C3 and C4, front contact 319 of the relay C5, front contact 608 of the relay FIGS, bus wire 5, upper winding of the relay 5 in column U for cruising speed (Fig. 3C) from whence the circuit continues through the back contact 26 of the stepping relay STP6, and through front contacts 25—21 of stepping relays STP5—STP1, through wire 307, and contacts 306 and 305 of relays OPR1 and FPR1, respectively. This relay 5 when once picked up is stuck up through a stick circuit including its stick contact 609. The code element relay C5 is then deenergized and this causes the stepping relay STP6 to pick up. This stepping relay STP6 is then stuck up through a stick circuit including the front contact 610 of relay U5.

The next twelve characters characterized by the tape shown in Fig. 2B are identical to corresponding characters of the tape shown in Fig. 2A for which reason the operation of the system for this portion of the tape need not be considered. The next character transmitted by the tape shown in Fig. 2B characterizes the numeral 2 signifying an altitude of 2000 feet for fix CV instead of the zero altitude characterized for the fix CV on the tape shown in Fig. 2A. This code character 2 results in the picking up of the relay 2 in column U for altitude and fix CV (Fig. 3F) and causes this relay U2 to pick up and then stick up through its stick contact 611. The stepping relay STP14 (Fig. 3F) is then picked up and stuck up through a stick circuit including the front contact 612 of this relay U2.

The next ten characters characterized by the tape shown in Fig. 2B are exactly the same as are the last ten characters characterized by the tape shown in Fig. 2A so that the operation of the system insofar as the picking up and sticking up of the code character relays controlled thereby is concerned need not be further discussed. In this connection it should be noted that eight characters were omitted from the tape of Fig. 2A, namely, the "space," "letters," "M," "C," "space," "figures," "altitude tens" and "altitude units" characters, and the corresponding relays were left deenergized.

*Route expanding function of route expander.* The route expanding function of the route expander relays shown in the lower portion of Figs. 3F, 3G and 3H, will now be discussed and it will be brought out how these route expander relays will not only energize the auxiliary fix relay MCXER, but will also energize its associated altitude relays T1 and U4 (Fig. 3G).

We have just observed how the relays in Figs. 3A–3H are picked up in succession in accordance with corresponding successive code character manifestations on the tape (Fig. 2B), it of course being understood from earlier considerations that the picking up of relays C and V (Fig. 3E) resulted in the picking up of relay CVR (Fig. 3F) and that subsequent picking up of the relays B and R resulted in the picking up of the relay BRR. The picking up of relay CVR through its front contact 480 for obvious reasons results in the picking up of relays MCER (see contact 484) and BRER in that order. Then when fix relay BRR is picked up through the medium of the tape (Fig. 2B) the closure of its front contacts 516 causes the auxiliary relay MCXER to be picked up, through a circuit also including front contact 517 of relay BRER. The picking up of relay MCXER then closes a circuit from the terminal (+), through front contact 613 of relay MCXER, wire 614, front contact 408 of relay 0 column T (Fig. 3F), wire 615, upper winding of relay 0 column T (Fig. 3G) to the other terminal (—); and also closes a circuit from (+), front contact 613 of relay MCXER, wire 614, front contact 616 of relay 2, column U (Fig. 3F), through wire 617, upper winding of relay 2 column U (Fig. 3G) to the other terminal (—). These relays T0 and U2 for manifesting altitude for fix MC (Fig. 3G) will then be stuck up by stick circuits including stick contacts 620 and 621 respectively. It is thus seen that if a fix is not identified, which for convenience is called an unnamed fix, it will be assigned the same altitude as was assigned to the next preceding named fix. The relays MCER and MCXER are now both energized for location fix MC (Fig. 3G). This in itself is a manifestation that this is an unnamed fix. At fix CV the wire 61 (Figs. 3F and 5A) has plus energy applied thereto through front contact 58 of relay CVR, and back contacts 59 and 60 of relays CVER and CVWR to pick up the relay SF (Fig. 5A) to identify fix CV as the starting time fix. The picking up of relay SF (Fig. 5A) will of course cause the time contact mechanisms TTHC, TUHC, TTMC and TUMC to determine at what point the starting time motor STM (Fig. 5D) shall stop. At each of the three fixes at least one of the contacts 67 at the fix relay or 68 of the auxiliary fix relay is closed, so that the posting relay MPRCP for that fix will be energized when it is time to post the information on the calculator into the posting units. The first named fix after a named or an unnamed fix, fix BR in this case, determines the direction of the flight route, which is east in the present instance. This is accomplished through a circuit portion including front contact 77 of relay BRR and front contact 78 of the relay BRER. These front contacts in series apply the plus terminal of the source to the east bus 75 as a result of which all of the east relays ER (Figs. 5A, 5B and 5C) are picked up. It is thus seen that the fix to be first identified determines where the starting time shall be posted and at what time unit in the calculator (Figs. 6A–6E) the starting time shall be made manifest, and that it also by the altitude made manifest, determines what the altitudes shall be at each of the fixes in a first series of unnamed fixes after a named fix; that the unnamed fixes will be made manifest by the identification of the first named fix after one or more unnamed fixes and that the first named fix after one or more unnamed fixes determines the direction of airplane travel for arrival time calculation purposes unless there were a plurality of named fixes before an unnamed fix. It will also be observed that the east direction light EL for fix CV will not be lighted because no relay CVER is energized to close a contact 70 to energize relay LER through wire 72. This is also true if fix MC or BR had been the first fix in an east-bound route.

From the foregoing it is therefore seen that proper calculation and proper posting will take place irrespective of whether a complete flight route or an abbreviated flight route has been transmitted by the teletype system or has been set up by local push button operation or local teletype tape hand punching. In this connection it is readily seen that each of the code responsive stick relays in Figs. 3B–3H may have the righthand terminal of their upper winding connected to the positive terminal of the system source through a push button contact for manual operation purposes. Such push buttons PB have been illustrated for the various code character bus wires in Fig. 3A. It should be noted that push button PB10 may be used to perform the "off" or stepping function.

In the description of the operation of the calculator above it has already been described how the calculator calculates the arrival times for fixes MC and BR for a starting time of 10:20 at fix CV, a wind velocity of 100 M. P. H. in a direction 135° from normal (see triangle, Fig. 14B). It will be observed from the tape portion illustrated in Fig. 2B that no climb or descent between fixes CV and MC is involved but that a climb of 12,000 feet takes place between fixes MC and BR. From Figs. 4A and 4B it is readily seen that the climb motor CM for fix BR (see Fig. 4C) would add 12 minutes to the arrival time for fix BR. This is readily understood by tracing the two circuits through contacts 166 and 176 of altitude relay TU2 (Fig. 4A) and through contacts 175 and 177 of altitude relay TU14 (Fig. 4D) which energize the wire 1 of the tens control bus and the 2 wire of the units control bus, signifying 12 minutes. The times manifested by the calculator before operation of the starting time motor and the climb motor, the ground speed being 100 miles per hour, would for reasons heretofore given be 00:00, 01:00 and 03:00, after operation of the starting time motor is completed the time readings would be 10:20, 11:20 and 13:20 and after operation of the climb motor CM for fix BR (the climb motor for fix MC not being operated) would be 10:20, 11:20 and 13:32. These arrival time indications as well as the indications of identity cruising speed and altitude for each fix would then be displayed on the flight check board FCB (Figs. 1, 5A, 5B and 5C) in a manner as already explained.

In practice the various motors for the calculator, nine having been shown in the drawings, are operated sequentially, each one being operated as soon as the information in accordance with which it is to be operated is available. For instance, the cruising speed motor CSM (Fig. 5D) is operated as soon as cruising speed is made manifest by the cruising speed relays in Fig. 3C.

The starting time motor STM is operated (Fig. 5D) as soon as the starting time electrical manifestation can reach the time contact mechanisms of the starting fix and this cannot happen until both of the relays ER and SF (Fig. 5A for fix CV) assume their energized position. Although the starting fix relay SF picks up as soon as the starting fix has been selected the east relay ER does not pick up until at least another fix has been identified. The wind direction motor WDM and wind velocity motor WVM start operating as soon as a tens altitude relay at the exit end of the section involved has been picked up (Fig. 12B) and the climb motor CM to operate requires an east relay ER and the altitude repeating relays for that and the next preceding fix in an energized condition (Fig. 4A). From this consideration it will be seen that most of the nine calculator motors illustrated will have completed their operation before the sign-off relay SO (Fig. 3H) has been picked up. The probability is then that the climb motor for the last fix of the flight route is the only one that would not yet have completed its operation. Posting of the arrival times calculated and other information may then be required to wait until climb or descent correction at the last fix has been completed. This completion will be made manifest by closure of back contact 559 of the series climb relay CLR (Fig. 5B assuming fix BR to be the last fix). In this connection it should be observed that an auxiliary circuit for each climb motor CM (Fig. 4A and 4C) has been provided including contact 172 of the associated centering mechanism CEC. If all of the main circuits for the climb motor CM have opened, and the contact 172 is still closed due to that link of the calculator assuming a fraction position, the climb motor will continue to operate until contact 172 opens and contact 171 closes. Contact 171 is included in the common posting wire 286 (Fig. 5D) and posting will not start until proper centering of all centering mechanisms has taken place.

It has already been mentioned that all time units of the calculator are interchangeable and that all speed units of the calculator are interchangeable (Figs. 6A–6E and 9). It will be observed from Fig. 6A that certain parts of the first time unit must be held in locked position, as by a stop 250. This stop 250 is fixedly mounted so that as the first time unit, after having been set to the proper position, is moved into place on the table CT the parts will be locked as required. Similarly the other time units must also be set to the proper indicating position before they are connected into the calculator combination, as is also true of the speed units, it being remembered that for a ground speed of 60 M. P. H., without any take-off or climb correction, and with zero starting time, the times that must be indicated at fixes CV, MC and BR are 00:00, 01:40 and 05:00 o'clock for distances of 100 miles from fix CV to MC and 200 miles from fix MC to BR.

It will be remembered that variable ratio gears CG1 and CG2 are used to convert speed readings into time readings. Obviously cams shaped to the pitch lines of these gears could be used if these cams were held into engagement with each other by suitable resilient means. The gears shown are, however, preferably used in that they afford a positive driving connection for both forward and backward driving by either gear.

It should also be understood that although motors, posting units and relays of specific constructions and operated by electrical energy specifically designated have been disclosed, equivalent devices and energies may be substituted therefor if desired.

The flight progress board FPAF hereinbefore mentioned and specifically disclosed in the Wight and Field Patent No. 2,344,761 has been conventionally shown in Fig. 5D of the drawings of this application. The manner in which posting information may be transferred from one board to another is also fully described in said patent and in copending application Ser. No. 500,672 above referred to, and for convenience this structure has been conventionally shown by wires including contacts 623, 624, 625 and 626 for transferring the cruising speed from the cruising speed posting units on the check display board (Figs. 5A, 5B or 5C) to cruising speed posting units on the flight progress board (Fig. 5D).

The applicants have disclosed one specific embodiment of their invention for the purpose of disclosing the underlying principles of their invention and to disclose at least one structure whereby these principles may be carried out. At least several modifications could have been illustrated but if this had been done the disclosure would have become burdensome. It should therefore be understood that the particular embodiment selected is illustrative of the nature of the invention and does not exhaust all forms that the invention may take, and that various changes, modifications and additions may be made without departing from the spirit or scope of the invention except as demanded by the scope of the following claims.

What we claim as new is:

1. In a flight route expanding, calculating and displaying system; the combination of posting units for displaying the starting time or arrival time and the altitude at which an airplane is to fly at each of a plurality of fixes along a route; means for communicating to the location of such posting units at least information as to the starting time at the first identified fix, the cruising speed of the airplane which is to fly over the route, the altitude the airplane is to fly at the first fix or at the second identified fix if the airplane is to take off at the first fix and the altitude the airplane is to fly at the last fix of the flight route; means for expanding that information into information including the identification of all the intervening fixes and the altitude at which the airplane is to fly at each of such fixes; calculating means for automatically calculating the arrival time at all fixes beyond the first identified fix; and means effective only when said calculating means has performed its calculating function to control said posting units so as to display for each fix of the flight route, the altitude at which the airplane is to fly over that fix and the starting time at the first fix as originally communicated and the arrival time at each subsequent fix as calculated by said calculating means.

2. In a flight route expanding, calculating and displaying system; the combination of posting units for displaying the starting time or arrival time and the altitude at which an airplane is to fly at each of a plurality of fixes along a route; means for communicating to the location of such posting units at least information as to the starting time at the first identified fix, the cruising speed of the airplane which is to fly over the route, the altitude the airplane is to fly at the second identified fix and the altitude the airplane is to fly at the last fix of the flight route; means for expanding that information into information including the identification of all the intervening fixes and the altitude at which the airplane is to fly at each of such fixes; wind direction and wind velocity dials; calculating means for automatically calculating the arrival time at all fixes beyond the first identified fix in accordance with the cruising speed, the positions assumed by said wind direction and wind velocity dials and the distances between fixes; and means effective only when said calculating means has performed its calculating function to control said posting units so as to display for each fix of the flight route, the altitude at which the airplane is to fly over that fix and the starting time at the first fix as originally communicated and the arrival time at each subsequent fix as calculated by said calculating means.

3. In a flight route expanding, calculating and displaying system; the combination of posting units for displaying the starting time or arrival time and the altitude at which an airplane is to fly at each of a plurality of fixes along a route; means for communicating to the location of such posting units at least information as to the starting time at the first identified fix, the cruising speed of the airplane which is to fly over that route, the altitude the airplane is to fly at the second identified fix and the altitude the airplane is to fly at the last fix of the flight route; means for expanding that information into information including the identification of all the intervening fixes and the altitude at which the airplane is to fly at each of such fixes; wind direction and wind velocity dials; calculating means for automatically calculating the arrival time at all fixes beyond the first identified fix in accordance with the cruising speed, the positions assumed by said wind direction and wind velocity dials, the time lost or gained by ascent and descent as determined from the altitudes at various fixes and in accordance with the distances between fixes; and means effective only when said calculating means has performed its calculating function to control said posting units so as to display for each fix of the flight route, the altitude at which the airplane is to fly over that fix and the starting time at the first fix as originally communicated and the arrival time at each subsequent fix as calculated by said calculating means.

4. In a flight route expanding, calculating and displaying system; the combination of posting units for displaying the airplane identity, the starting time or arrival time and the altitude at which an airplane is to fly at each of a plurality of fixes along a route; means for communicating to the location of such posting units the identity of an airplane, and at least information as to the starting time at the first named fix, the cruising speed of the airplane that is to fly over the route, the altitude the airplane is to fly at the second named fix and the altitude the airplane is to fly at the last named fix of the flight route; means for expanding that flight information into information including the identification of all the unnamed fixes and the altitude at which the airplane is to fly over each of such fixes; a wind direction and wind velocity dial for each section between adjacent fixes; calculating means for automatically calculating the arrival time at all fixes beyond the first identified fix in accordance with the cruising speed, the positions assumed by said wind direction and wind velocity dials, the time lost or gained by ascent or descent from fix to fix as determined from altitudes the airplane is to fly over such fixes and in accordance with the distances between fixes; and means effective only when said calculating means has performed its calculating function to control said posting units so as to display for each fix of the flight route, the identity of the airplane, the altitude at which the airplane is to fly over that fix and the starting time at the first fix as originally communicated and the arrival time at each subsequent fix as calculated by said calculating means.

5. In a flight route expanding, calculating and displaying system; the combination of posting units for displaying the starting time or arrival time and the altitude at which an airplane is to fly over each of a plurality of fixes along a route, of means for communicating to the location of such posting units at least information as to the starting time at the first named fix, the cruising speed of the airplane that is to fly over the route, the altitude the airplane is to fly over the second named fix and the altitude the airplane is to fly over the last named fix of the flight route, means for expanding that information into information including the identification of all unnamed intervening fixes and the altitude at which the airplane is to fly over each of such unnamed fixes; a wind direction dial and a wind velocity dial for each section between adjacent fixes; calculating means, including a calculating device for each section for calculating the ground speed dependent on the cruising speed of the airplane and the velocity and direction of the wind in such section as manifested by said wind direction and wind velocity dials of such section, for automatically calculating depending on the length of the sections the arrival time at all fixes beyond the first named fix; and means effective only when said calculating means has performed its calculating function to control said posting units so as to display for each fix of the flight route, the altitude at which the airplane is to fly over that fix and the starting time at the first fix as originally communicated and the arrival time at each subsequent fix as calculated by said calculating means.

6. In a flight route expanding, calculating and displaying system; the combination of posting units for displaying the starting time or arrival time and the altitude at which an airplane is to fly at each of a plurality of fixes along a route; of means for communicating to the location of such posting units at least information as to the starting time at the first named fix, the cruising speed of the airplane that is to fly over the route, the altitude the airplane is to fly over the first or the second named fix and the altitude the airplane is to fly over the last fix of the flight route; means for expanding such flight information into information including the identification of all the intervening unnamed fixes and the altitude at which the airplane is to fly over each of such fixes; wind direction and wind velocity dials for each section between adjacent fixes; calculating means for automatically calculating the arrival time at all fixes beyond the first identified fix; said calculating means including a calculating device for each section between fixes for calculating the ground speed for that section dependent on the length of such section, the cruising speed of the airplane and the velocity and the direction of the wind in such section as manifested by said dials for such section and also including means for determining the time lost or gained by ascent or descent as determined by the altitude of flight at the entrance and exit fix of such section; and means effective only when said calculating means has performed its calculating function to control said posting units so as to display for each fix of the flight route, the altitude at which the airplane is to fly over that fix and the starting time at the first fix as originally communicated and the arrival time at each subsequent fix as calculated by said calculating means.

7. In a multiple unit calculator, a plurality of similar time calculating units, a speed calculating unit for each junction between two time calculating units all supported on the same support, a starting time shaft common to all time units, a cruising speed shaft common to all speed units, and a stop member to engage and hold at stop part of the mechanism of the first time calculating unit of a plurality of such units, whereby interchangeability of said time units is afforded and in each case part of the mechanism of the first time unit may be held in a locked position.

8. In a multiple unit calculator, a series of identical time calculating units, a plurality of similar speed calculating units one for each junction between two time calculating units all supported on the same support, a starting time shaft common to all time units, a cruising speed shaft common to all speed units, a stop member to engage and hold at stop part of the mechanism of the first time calculating unit of a plurality of such units, whereby interchangeability of said time units and interchangeability of speed units is afforded and in each case part of the mechanism of the first time unit is held in a locked position.

9. In a calculator of the type described, a plurality of similar time calculating units, each having shafts operatively connected to the shafts of the next succeeding time unit, and each having a shaft projecting therefrom provided with a variable ratio gear, a plurality of similar speed calculating units, one for each junction between successive time units, each having shafts operatively connected to the shafts of the next succeeding speed unit, and each provided with a variable ratio gear meshing with the variable ratio gear of the next succeeding time unit, decoupling collars included between the connecting shafts of said different time and speed units, and a support for supporting all of said units, whereby interchangeability of said time units and of said speed units is afforded.

10. A central office located flight route expander for an air route having a plurality of successive fixes, electro-responsive means associated with each fix for manifesting when that fix is identified as being included in a proposed route and at what altitude an airplane is to fly over that fix in the proposed route, means for communicating to such central office information identifying at least the first and the last fix of a proposed route as well as the altitude at which an airplane is to fly over such fixes, and means for expanding that information into information including the identification of all of the named and unnamed fixes in the route and the altitudes at which the airplane is to fly over each of such named and unnamed fixes.

11. A central office located flight route expander for an air route having a plurality of successive fixes; electro-responsive means associated with each fix for manifesting when that fix is identified as being included in a proposed route and at what altitude an airplane is to fly over that fix in the proposed route; means for communicating to such central office information identifying at least the first, one intermediate and the last fix of a proposed route as well as the altitude at which an airplane is to fly over such fixes; and means for expanding that information into information including the identification of all of the named and unnamed fixes in the route and the altitudes at which the airplane is to fly over each of such named and unnamed fixes.

12. A central office located combined direction of route traffic informer and flight route expander for an air route having a plurality of successive fixes, electro-responsive means associated with each fix for manifesting when that fix is identified as being included in a proposed route and at what altitude an airplane is to fly over that fix in the proposed route, communicating means for communicating to such central office information identifying at least the first and the last fix of a proposed route as well as the altitude at which an airplane is to fly over such first and last fixes, means for expanding that information into information including the identification of all of the named and unnamed fixes and the altitudes at which the airplane is to fly over each of such named and unnamed fixes, and means controlled by said communicating means and in accordance with the sequence of communication of fix identification for manifesting the direction of airplane travel over a proposed route.

13. A time calculating device comprising; a crank arm of variable length, a mechanical element movable to positions a variable distance from the axis of rotation of said crank arm, means for turning said crank arm about said axis to an angular position with respect to a line passing through said axis and said element dependent on the direction of the wind with respect to the direction of a section of air route and for adjusting the length of such crank arm in accordance with the velocity of such wind, means for moving said mechanical element along said line to a position such that the distance from such mechanical element to the free end of said crank arm represents the cruising speed of an airplane, as a result of which the distance from such mechanical element to said axis represents the actual ground speed of such airplane, a first shaft rotated by movement of said mechanical element, to an extent proportional to said ground speed, a second shaft, a variable ratio means operatively connecting said first shaft and said second shaft to cause said second shaft to rotate to a position representing the time required to fly a unit of distance at the speed indicated as said actual ground speed, and fixed ratio means for driving a third shaft by said second shaft in accordance with the length of said section, whereby said third shaft indicates the time consumed by an airplane flying under said wind conditions over a section of that length and direction.

14. A time calculating device comprising; a crank arm of variable length, a mechanical element movable to positions a variable distance from the axis of rotation of said crank arm, means for turning said crank arm about said axis to an angular position with respect to a line passing through said axis and said element dependent on the direction of the wind with respect to the direction of a section of air route and for adjusting the length of such crank arm in accordance with the velocity of such wind, means for moving said mechanical element along said line to a position such that the distance from such mechanical element to the free end of said crank arm represents the cruising speed of an airplane, as a result of which the distance from such mechanical element to said axis of said crank arm represents the actual ground speed of such airplane, and means controlled by movement of said mechanical element for manifesting by a uniform time scale the time required to fly a unit of distance at the speed indicated as said actual ground speed, whereby the time consumed by an airplane flying at said cruising speed in air of said velocity and direction over the unity length of such route is manifested.

15. Time calculating apparatus comprising, a radius arm of variable length proportional to the velocity of the wind and extending at an angle from a pivot dependent upon the direction of the wind, a rack supported for movement along a straight line passing adjacent said pivot, means connecting said rack and the free end of said radius arm and of a variable length determined in accordance with the cruising speed of an airplane in free air as a result of which the position of said rack with respect to said pivot manifests the ground speed of an airplane flying over a section of an air route under said wind conditions, a gear engaging said rack, a time shaft, and variable ratio means operatively connecting said gear and said time shaft to cause said time shaft by a uniform inverse scale to indicate the time required for an airplane to fly over a predetermined distance under said wind conditions.

16. An arrival time calculator for calculating the arrival time of an airplane at successive fixes along an air route beyond the starting fix; a ground speed calculator for each section joining two fixes comprising, a crank of variable length, a mechanical element movable to positions a variable distance from the axis of rotation of said crank arm, means for turning said crank arm about said axis to an angular position with respect to a line passing through said axis and said mechanical element dependent on the direction of the wind with respect to the direction of that section of air route and for adjusting the length of such crank arm in accordance with the velocity of the wind for that section, and means for moving said mechanical element along said line to a position such that the distance from such mechanical element to the free end of said crank arm represents the cruising speed of the airplane which is to fly over that section of the route, as a result of which the distance from such mechanical element to said axis represents the actual ground speed for such airplane for such section; calculating means for each section including means functioning in accordance with the length of such section and the ground speed for such section as manifested by the position assumed by said mechanical element for calculating the time required by the airplane to fly over such section; and time manifesting means for each fix, including an accumulator means for each fix beyond the starting fix, for manifesting for that fix the sum of the times calculated for all of the sections in the rear of such fix.

17. An arrival time calculator for calculating the arrival time of an airplane at successive fixes along an air route beyond the starting fix; a ground speed calculator for each section joining two fixes comprising, a crank of variable length, a mechanical element movable to positions a variable distance along a straight line from the axis of rotation of said crank arm, means for turning said crank arm about said axis to an angular position with respect to a line passing through said axis and said element dependent on the direction of the wind with respect to the direction of that section of air route and for adjusting the length of such crank arm in accordance with the velocity of the wind for that section, and means for moving said mechanical element along said straight line to a position such that the distance from such mechanical element to the free end of said crank arm represents the cruising speed of the airplane which is to fly over that and other sections of the route, as a result of which the distance from such mechanical element to said axis represents the actual ground speed for such airplane for such section; calculating means for each section including means functioning in accordance with the length of such section and the ground speed for such section as manifested by the position assumed by said element, and also including means controlled in accordance with the altitude of the airplane when it enters the section and the altitude of such airplane when it leaves such section for calculating the traveling time required by the airplane to fly over such section; and time manifesting means for each fix, including an accumulator means for each fix beyond the starting fix, for manifesting for that fix the sum of the traveling times calculated for all of the sections in the rear of such fix.

18. An arrival time calculator for calculating the arrival time of an airplane at successive fixes along an air route beyond the starting fix; a ground speed calculator for each section joining two fixes comprising, a crank of variable length, a mechanical element movable to positions a variable distance from the axis of rotation of said crank arm, means for turning said crank arm about said axis to an angular position with respect to a line passing through said axis and said element dependent on the direction of the wind with respect to the direction of that section of air route and for adjusting the length of such crank arm in accordance with the velocity of the wind for that section, and means for moving said mechanical element along said line to a position such that the distance from such mechanical element to the free end of said crank arm represents the cruising speed of the airplane which is to fly over that and other sections of the route, as a result of which the distance from such mechanical element to said axis represents the actual ground speed for such airplane for such section; calculating means for each section including means functioning in accordance with the length of such section and the ground speed for such section as manifested by the position assumed by said element, including means controlled in accordance with the altitude of the airplane when it enters the section and the altitude of such airplane when it leaves such section and also including means for the first section only controlled in accordance with the direction of take-off for calculating the time elapsed by the airplane flying over such section; and calculating means including time manifesting means for each fix, an accumulator means for each fix beyond the starting fix for manifesting by said time manifesting means for that fix the sum of the times calculated for all of the sections in the rear of such fix.

19. In an arrival time calculator divided into sections, one section for each fix of a plurality of spaced fixes constituting an airway route, time manifesting means for each section of said calculator, each section of said calculator including means for calculating the time required to travel to the corresponding fix from the preceding fix of the airway route including multiplying gears constructed in accordance with the length of said section and time increment elements adjusted in accordance with the speed at which a flight is to travel over such route, accumulator means interrelating adjacent sections of said calculator to cause the time displayed by the time manifesting means for one section to be added to the time to be displayed by the time manifesting means for the next section in advance, a starting time shaft associated with the time manifesting means for all sections of the calculator, other accumulator means associated with each time manifesting means to add the starting time setting of said starting time shaft to the time to be manifested by that means, a starting time motor for operating said time shaft to any desired starting time, and control means for said motor for causing its operation of said shaft for a selected starting time until that time is displayed by any selected one of said time manifesting means.

20. In a system of the type described; a teletype system for transmitting to an air traffic office a message identifying the starting fix, the finish fix and possibly one or more intermediate fixes, the altitude at which an airplane is proposed to fly over these named fixes, the cruising speed of the airplane to fly over the route, and the starting time at the starting fix; means for expanding incomplete information into complete information including the identification of all named and unnamed fixes between the starting fix and the finishing fix and the altitude for each fix and contacts for storing this information by their contacting positions; a calculator controlled by said contacts to calculate and manifest the arrival time for each fix beyond the starting fix and to manifest the starting time for the starting fix; a check display board including posting units for displaying time and altitude for each fix; and means for controlling said posting units in accordance with said contacts and the manifestations of said calculator.

21. In a system of the type described; a teletype system for transmitting to an air traffic office a message identifying the starting fix, the finish fix and possibly one or more intermediate fixes, the identity of the airplane, the various altitudes at which an airplane is proposed to fly over these named fixes, the cruising speed of the airplane to fly over the route including said fixes, and the starting time at the starting fix; means for expanding incomplete information into complete information including the identification of all named and unnamed fixes between the starting fix and the finishing fix and the altitude for each fix and contacts for storing this information by their contacting positions; a calculator controlled by said contacts to calculate and manifest the arrival time for each fix beyond the starting fix and to manifest the starting time for the starting fix; a check display board including posting units for displaying time, airplane identity and altitude for each fix; and means for controlling said posting units in accordance with said contacts and the manifestations of said calculator.

22. In a system of the type described; a teletype system for transmitting to an air traffic office a message identifying the starting fix, the finish fix and possibly one or more intermediate fixes, the altitudes at which an airplane is proposed to fly over these named fixes, the cruising speed of the airplane which is to fly over said fixes, and the starting time at the starting fix; means for expanding incomplete information into complete information including the identification of all named and unnamed fixes between the starting fix and the finishing fix and the altitude for each fix at which the airplane is to fly thereover and contacts for storing this information by their contacting positions; a calculator controlled by said contacts to calculate and manifest the arrival time for each fix beyond the starting fix and to manifest the starting time for the starting fix; a check display board including posting units for displaying time and altitude for each fix; means for controlling said posting units in accordance with said contacts and the manifestations of said calculator; a flight progress board similar to said check display board but capable of displaying a plurality of airplane flights at the same time; and means for transferring the information displayed on said check display board to said flight progress board and for then cancelling the information from said check display board.

23. In a system of the type described; a teletype system for transmitting to an air traffic office a message identifying the starting fix, the finish fix and one or more intermediate fixes, the altitudes at which an airplane is proposed to fly over these fixes, the cruising speed of the airplane which is to fly over said fixes, and the starting time at the starting fix; contacts for storing this information by their contacting positions; calculating means controlled by said contacts to calculate and manifest the arrival time for each fix beyond the starting fix and to manifest the starting time for the starting fix; a check display board including posting units for displaying time and altitude for each fix; and means for controlling said posting units in accordance with said contacts and the manifestations of said calculating means.

24. In a system of the type described; a teletype system for transmitting to an air traffic office a message identifying the starting fix, the finish fix and one or more intermediate fixes, the altitudes at which an airplane is proposed to fly over these fixes, the cruising speed of the airplane which is to fly over said fixes, and the starting time at the starting fix; contacts for storing this information by their contacting positions; other contacts manifesting the direction and velocity of the wind; calculating means controlled by said contacts to calculate and manifest the arrival time for each fix beyond the starting fix and to manifest the starting time for the starting fix; a check display board including posting units for displaying time and altitude for each fix; and means for controlling said posting units in accordance with said contacts and the manifestations of said calculating means.

25. In an arrival time calculator for determining the time required to travel between two spaced points, a time indicating mechanism, a speed calibrated element moveable through equal increments for equal increments of change in speed, a time calibrated element moveable to different positions for different values of time required for traveling a unit of distance at different speeds, a variable ratio mechanical means operatively connecting said speed calibrated element with said time calibrated element to move it to positions giving the proper time required to travel a unit of distance at the speed for which said speed calibrated element is then set, and multiplying means including a multiplying factor dependent upon the distance between said two spaced points and operatively connecting said time calibrated element with said time indicating mechanism to cause it to assume a position to indicate the time required to travel between said two spaced points at the speed for which said speed calibrated element is then set.

26. In an arrival time calculator for determining the time required to travel between two spaced points, a time indicating mechanism, a speed calibrated element movable equal increments for equal increments in change of speed, a time device having equally spaced positions alotted to the successive values of time that may be required for traveling a particular distance at the different speeds to which said speed calibrated element may be moved, a variable ratio motion transmitting element operated by said speed calibrated element as it is moved to its different calibrations for moving said time device to positions representing the time required to travel said particular distance which corresponds to the different speed calibrations, and multiplying means including a multiplying factor dependent upon the distance between said two spaced points and operated by said time device for causing said time indicating mechanisms to indicate the time required to travel between said two spaced points at the speed for which said speed calibrated element is then set.

27. In an arrival time calculator for determining the time required to travel between two spaced points, a time indicating device, a speed element operable through equal increments of movement for equal changes in speed values, one control means for operating said speed element in accordance with the cruising speed of an airplane, another control means for operating said speed element in accordance with prevailing wind velocity to give the net ground speed for the airplane, a time element movable through equal increments of movement for equal changes in time values required to travel a unit of distance at the different speeds of said speed element, a variable ratio mechanical connection between said speed element and said time element to move it to that position which represents the time value for the speed at which said speed element is then set, and multiplying means including a multiplying factor dependent upon the distance between said two spaced points and operatively connecting said time element with said time indicating device to cause it to be operated in accordance with the time required to travel between said two spaced points at the speed value for which said speed element is then set.

28. In an arrival time calculator for determining the time at which an airplane will arrive at a distant point when leaving a starting point at a selected starting time and travelling at a selected speed, a time indicating device, a speed element operable through equal increments of movement for equal changes in speed values, one control means for operating said speed element in accordance with any selected cruising speed, another control means for adding or subtracting speed values from said speed element dependent upon the direction and velocity of the prevailing wind, a time element, a variable ratio mechanical connection between said speed element and said time element to move it to that position which represents the time that is required to travel a unit of distance at the speed for which said speed element is then set, a multiplying connection between said time element and said time indicating device which multiplies the time setting of said time element in accordance with the distance between said two points to give the time required to travel between said points, and a starting time element operable through equal increments of movement for the different times of a 24-hour day and jointly acting on said time indicating device with said multiplying connection to cause it to indicate the time of arrival of an airplane at said distant point in accordance with the starting time at which it is set.

29. In an arrival time calculator for determining the time required to travel between two spaced points, a speed shaft rotatable through equal increments for equal increments of change in speed values, a time shaft rotatable to different positions for the different values of time required to travel a unit of distance at the different possible speeds indicated by said speed shaft, a hyperbolic speed gear attached to said speed shaft, a hyperbolic time gear attached to said time shaft and meshing with said speed gear, said speed and time gears being so constructed as to have variable length radii whose sum is constant to produce a rectangular hyperbolic function where said time shaft is operated to different time values corresponding to the speeds indicated by said speed shaft, a time device initially set to indicate the time required to travel between said two points at the speed for which said speed shaft is then set, and a gear connection between said time shaft and said time device having a gear ratio dependent upon the number of said units of distance between said two spaced points, whereby said time device is caused to indicate the traveling time between said two spaced points for any selected speed to which said speed shaft may be set.

30. In an arrival time calculator for calculating arrival times at a plurality of points along a route, the combination with a plurality of time shafts for indicating by uniform scales travel times for a plurality of sections for a conveyance moving over a route, a speed shaft for each time shaft which by its turned position manifests by uniform calibration the speed of a conveyance moving over that section of such route, variable ratio means operatively connecting each speed shaft with its respective time shaft including two meshing hyperbolic gears, one of which is connected to its speed shaft and the other of which is connected to its associated time shaft through a gear connection having a ratio dependent upon the distance between its point and the preceding point along the route, said variable ratio means for each point acting when its speed shaft is turned to any selected speed value to rotate the corresponding time shaft to a position indicating the time required to travel to that point from the preceding point in the route at that selected speed, and accumulator means operated by said plurality of time shafts for indicating for each point along the route the sums of the times required to travel all of the sections in the route up to that point.

31. In an arrival time calculator for determining the time required to travel between two spaced locations, a speed setting element operable through equal calibrations for the different cruising speeds of airplanes, a wind velocity element operable through equal calibrations for the different air speeds, a wind direction setting element operable to indicate the direction of the existing wind, a starting time setting means operable to indicate the starting time for a proposed flight at one of said locations, ground speed calculating means responsive to said speed setting element and said wind velocity and direction elements to give the resultant ground speed of an airplane traveling from said one location to the other, traveling time calculating means constructed in accordance with the distance between said locations and governed in accordance with said ground speed calculating means for calculating the time required to travel between said locations, and accumulator means governed by said starting time setting means and said travel time calculating means to give the calculated arrival time of the airplane at the other of said two locations.

32. In an air traffic control system, a communication system for transmitting flight data to an air traffic office, such flight data with respect to each proposed flight including flight identification, designation of the fixes in the route, cruising speed of the airplane, the altitudes at which the airplane is to fly and the proposed starting time for leaving the starting fix of the route; message receiving apparatus at the air traffic office for receiving and storing a plurality of such messages; a check display board having a plurality of posting units for displaying flight data; a calculator organization capable of being set in accordance with the cruising speed, starting time and fix of a route for calculating the arrival times or the remaining fixes of the route; control circuit means for causing said calculator to be governed by said message receiving apparatus in succession in accordance with the successive messages stored therein; and means for causing said posting units to be jointly governed by said calculator and said message receiving apparatus when a calculating operation is completed to cause the cruising speed, the flight identification, the altitudes and arrival times to be displayed in said check display for the respective fixes included in the route.

33. In an air traffic control system, message receiving means associated with a teletype communication system for storing on a tape coded flight data messages including flight identification, cruising speed of the flight, designation of the fixes over which the flight proposes to travel, designation of the altitudes at which the flight is to travel over the fixes, and the starting time at which the flight proposes to leave the first designated fix; a decoding circuit organization governed by said message receiving means in accordance with each flight data message in turn one at a time, to position contact means in accordance with the different data elements of a complete flight data message; a calculator apparatus controlled by said decoding circuit organization in accordance with the contact means positioned in accordance with the cruising speed, starting time and designated fixes to calculate the arrival times for all fixes beyond the first; a posting panel having a plurality of changeable indicators for each fix of a control area; and circuit control means acted upon by certain of said contact means of said decoding circuit organization and by said calculator apparatus at the completion of a calculating operation to position the changeable indicators of the posting panel for the fixes designated in the flight data message then decoded to display the different data elements of the message and also the calculated arrival times for the appropriate fixes.

34. In an arrival time calculating organization; calculator mechanism operable in accordance with cruising speed, distance and starting time to give the arrival time of a proposed flight at a second fix if it leaves a first fix at said starting time, said calculator mechanism including accumulator means by which different time values can be added to or subtracted from its calculations to give an adjusted arrival time; altitude contacts set in accordance with the altitude assigned to the flight at each of said fixes; and circuit elements controlled by said altitude contacts for the two fixes when they represent a difference in altitude between the fixes to control said accumulator means rendering it effective to add or subtract time values dependent upon the degree of difference between altitudes and dependent upon whether said difference represents ascent or descent for the proposed flight.

35. In an arrival time calculating organization; calculator mechanism operable in accordance with cruising speed, distance and starting time to give the arrival time of a proposed flight at a second fix if it leaves a first fix at said starting time, said calculator mechanism including accumulator means by which different time values can be added to or subtracted from its calculations to give an adjusted arrival time; altitude contacts associated with each fix and set in accordance with the altitude assigned to the flight for that fix; a plurality of circuit elements representing different positive and negative time values; circuit means selected by said altitude contacts for the two fixes to selectively energize said circuit elements in accordance with the difference in the altitudes for the two fixes and dependent upon whether such difference represents an ascent or descent; and operating means controlled by the energized circuit elements to set said accumulator to a proper time value to give an arrival time adjusted in accordance with the proposed altitude change.

36. In an arrival time calculating organization; a calculator mechanism operable in accordance with cruising speed, distance and starting time settings to give the arrival time of a proposed flight at the next fix following the fix at which it is to take off, said calculator mechanism including accumulator means by which different time values can be subtracted from its calculations to give an adjusted arrival time; wind direction contacts set in accordance with the then prevailing direction of the wind at the take-off fix; and circuit elements selected by said wind contacts depending upon the then existing direction of the wind relative to the direction the flight must travel to reach said next fix to control said accumulator means to subtract a predetermined time value for such relative direction of the wind.

37. In an arrival time calculating organization; a calculator mechanism operable in accordance with cruising speed, distance and starting time to give the arrival time of a proposed flight at the next fix following the fix at which it is to take off; wind direction contacts set dependent upon the then prevailing direction of the wind at the take-off fix; altitude contacts set in accordance with the altitude at which the flight is to pass over said next fix; circuit elements selected by said wind direction contacts and said altitude contacts to jointly select an estimated value of time lost in reaching said next fix due to adverse direction of the wind for taking off and due to the amount of climb involved; and a compensating mechanism associated with said calculator and controlled by said circuit elements to subtract said time loss from the calculations performed by said calculator mechanism to thereby cause it to give compensated arrival times.

OSCAR S. FIELD.
SEDGWICK N. WIGHT.
RALPH W. HEWES.

(References on following page)

REFERENCES CITED

The following references are of record in the file of this patent:

UNITED STATES PATENTS

| Number | Name | Date |
|---|---|---|
| 241,519 | Turner | May 17, 1881 |
| 1,428,449 | Prall | Sept. 5, 1922 |
| 1,482,152 | Ross | Jan. 29, 1924 |
| 1,572,520 | Fagerholm | Feb. 9, 1926 |
| 1,751,649 | Nieman | Mar. 25, 1930 |
| 1,910,093 | Colvin | May 23, 1933 |
| 1,985,265 | Smith | Dec. 25, 1934 |
| 2,027,368 | Bockius | Jan. 14, 1936 |
| 2,145,895 | Samuelson | Feb. 7, 1939 |
| 2,187,851 | Foss | Jan. 23, 1940 |
| 2,247,531 | Thurston | July 1, 1941 |
| 2,296,692 | Thurston | Sept. 22, 1942 |
| 2,344,885 | Kozma et al. | Mar. 21, 1944 |
| 2,351,814 | Holzner | June 20, 1944 |

FOREIGN PATENTS

| Number | Country | Date |
|---|---|---|
| 335,512 | Italy | Feb. 6, 1936 |